US010746891B2

(12) United States Patent
Campbell et al.

(10) Patent No.: US 10,746,891 B2
(45) Date of Patent: Aug. 18, 2020

(54) BACK DECK AUTOMATION

(71) Applicant: Bright Technologies, LLC, Havana, FL (US)

(72) Inventors: Richard V. Campbell, Havana, FL (US); Kristopher Wortham, Havana, FL (US)

(73) Assignee: Bright Technologies, LLC, Havana, FL (US)

( * ) Notice: Subject to any disclaimer, the term of this patent is extended or adjusted under 35 U.S.C. 154(b) by 0 days.

(21) Appl. No.: 16/522,726

(22) Filed: Jul. 26, 2019

(65) Prior Publication Data

US 2019/0346582 A1 Nov. 14, 2019

Related U.S. Application Data

(63) Continuation of application No. 15/353,439, filed on Nov. 16, 2016, now abandoned.

(51) Int. Cl.

| | |
|---|---|
| ***G01V 1/00*** | (2006.01) |
| ***G01V 1/24*** | (2006.01) |
| ***B63B 35/04*** | (2006.01) |
| ***F16G 11/02*** | (2006.01) |
| ***H02G 1/10*** | (2006.01) |
| ***H02G 1/08*** | (2006.01) |
| ***G01V 1/38*** | (2006.01) |
| ***G01V 1/20*** | (2006.01) |
| ***B63B 21/66*** | (2006.01) |
| *F16B 7/04* | (2006.01) |

(52) U.S. Cl.
CPC ............ *G01V 1/3843* (2013.01); *B63B 21/66* (2013.01); *G01V 1/202* (2013.01); *G01V 1/3852* (2013.01); *F16B 7/0486* (2013.01)

(58) Field of Classification Search
CPC .... G01V 1/3843; G01V 1/202; G01V 1/3852; B63B 21/66; B63B 35/04; F16G 11/025
USPC ....... 367/15, 21, 76; 181/110, 112; 405/158, 405/162
See application file for complete search history.

(56) References Cited

U.S. PATENT DOCUMENTS 2,166,916 A * 7/1939 Lombard .................. F16L 3/13 248/222.12
2,622,691 A * 12/1952 Ording ................. G01V 1/3808 367/49
3,219,968 A * 11/1965 Loper .................. G01V 1/3808 367/21
3,744,021 A * 7/1973 Todd .................... G01V 1/3808 367/23
3,993,859 A * 11/1976 McNeel ................... G01V 1/16 174/565
4,234,938 A * 11/1980 Allen ..................... G01V 1/006 181/111

(Continued)

*Primary Examiner* — Benjamin F Fiorello
*Assistant Examiner* — Edwin J Toledo-Duran
(74) *Attorney, Agent, or Firm* — J. Wiley Horton

(57) ABSTRACT

Systems and methods of deploying seismic data acquisition units from a marine vessel are disclosed. The system can include a spindle coupled to a tether. A robotic arm can couple the spindle to a tether via one or more tumblers. The tether can connect to a seismic data acquisition unit via a connection block having a mechanical force device. The assembled spindle, tether and seismic data acquisition unit can be deployed from the deck via a deployment block.

18 Claims, 59 Drawing Sheets

(56) References Cited

U.S. PATENT DOCUMENTS 4,467,459 A * 8/1984 Currie .................. G01V 1/3808 367/21
4,500,980 A * 2/1985 Copeland ............... H02G 15/14 367/154
4,520,467 A * 5/1985 Berni ..................... G01V 1/364 367/21
4,711,194 A * 12/1987 Fowler .................... B63B 21/66 114/245
4,752,916 A * 6/1988 Loewenthal ........... G01V 1/366 367/24
4,835,744 A * 5/1989 Todd ........................ G01V 1/22 367/20
4,879,719 A * 11/1989 Dumestre, III ......... F16B 21/02 367/20
4,942,557 A * 7/1990 Seriff ................... G01V 1/3808 181/110
5,070,805 A * 12/1991 Plante ..................... B63B 21/08 114/199
5,130,954 A * 7/1992 Fussell ..................... G01V 1/16 181/122
5,214,612 A * 5/1993 Olivier .................... B63B 21/66 114/245
5,265,066 A * 11/1993 Svenning ............. G01V 1/3808 367/154
5,384,751 A * 1/1995 Blier .................... G01V 1/3843 114/244
5,507,243 A * 4/1996 Williams, Jr. ........ F16L 37/002 114/245
5,709,497 A * 1/1998 Zoch ....................... B63B 21/66 114/245
5,937,782 A * 8/1999 Rau ......................... B63B 21/66 114/245
6,024,344 A * 2/2000 Buckley ............... G01V 1/3852 181/110
6,091,670 A * 7/2000 Oliver .................... G01V 1/201 367/20
6,483,775 B1 * 11/2002 Spackman ............. G01V 1/201 367/17
6,498,768 B1 * 12/2002 Gjestrum ............... G01V 1/201 367/16
6,525,991 B2 * 2/2003 Greiger .................. G01V 1/201 367/16
6,622,976 B1 * 9/2003 Ianello ...................... F16L 3/13 248/71
6,854,916 B2 * 2/2005 Hsieh ...................... F16B 7/105 403/109.1
7,092,315 B2 * 8/2006 Olivier ................. G01V 1/3826 114/246
7,184,365 B2 * 2/2007 George ................. B63B 21/663 367/154
7,260,024 B2 * 8/2007 Goujon .................... G01V 1/16 367/188
7,933,165 B2 * 4/2011 Thompson ............. G01V 1/201 114/249
8,149,647 B2 * 4/2012 Borgen .................... G01V 1/38 367/15
8,226,328 B2 * 7/2012 Thompson ............. G01V 1/201 367/15
8,348,543 B2 * 1/2013 Olivier .................. B63B 21/663 114/245
9,291,730 B2 * 3/2016 Pichot ...................... G01V 1/18
2002/0126576 A1 * 9/2002 Douma .................. G01V 1/362 367/21
2003/0159877 A1 * 8/2003 Martin ..................... G01V 1/38 181/110
2004/0013036 A1 * 1/2004 Fageras .................. G01V 1/201 367/15
2005/0052951 A1 * 3/2005 Ray ........................ G01V 1/166 367/188
2006/0209633 A1 * 9/2006 George .................. G01V 1/201 367/20
2006/0285435 A1 * 12/2006 Robertsson ............ G01V 1/364 367/24
2007/0263489 A1 * 11/2007 Vaage .................... G01V 1/137 367/144
2007/0297287 A1 * 12/2007 Robertsson ............ G01V 1/201 367/24
2008/0008038 A1 * 1/2008 Robertsson .......... G01V 1/3808 367/21
2009/0290453 A1 * 11/2009 Ray ........................ G01V 1/181 367/188
2010/0039888 A1 * 2/2010 Ozdemir .................. G01V 1/36 367/13
2011/0051550 A1 * 3/2011 Lindberg ................. G01V 1/16 367/20
2011/0103179 A1 * 5/2011 Vageskar ............. G01V 1/3808 367/17
2012/0222709 A1 * 9/2012 Karlsen ................ G01V 1/3808 134/141
2012/0314535 A1 * 12/2012 Martinez .................. G01V 1/20 367/20
2013/0028046 A1 * 1/2013 Stenzel .................... G01V 1/38 367/18
2013/0058192 A1 * 3/2013 Gateman ................ G01V 1/201 367/20
2013/0238249 A1 * 9/2013 Xu ......................... G01V 1/303 702/18
2013/0266366 A1 * 10/2013 Woodard ............... G01V 1/202 403/300
2014/0211589 A1 * 7/2014 Maxwell .................. G01V 1/18 367/15
2014/0254313 A1 * 9/2014 Dowle ................... G01V 1/137 367/15
2015/0331126 A1 * 11/2015 Lambert .............. G01V 1/3808 367/15
2015/0362606 A1 * 12/2015 Henman ................. B63B 21/66 367/15
2016/0056645 A1 * 2/2016 Henman .................. G01V 1/18 320/112
2016/0097872 A1 * 4/2016 Fernihough ............. G01P 15/18 367/15
2016/0121973 A1 * 5/2016 Sandvik .................. B63B 21/66 114/244
2016/0223696 A1 * 8/2016 Josse .................... G01V 1/3808
2016/0349387 A1 * 12/2016 Rokkan .................. G01V 1/166
2017/0059725 A1 * 3/2017 Kaufman ............... G01V 1/145
2017/0123088 A1 * 5/2017 Faber .................. G01P 15/0802
2017/0123091 A1 * 5/2017 Stewart ............... G01P 15/0802
2018/0106921 A1 * 4/2018 Rokkan ................ G01V 1/3852

* cited by examiner

FIG. 57
5700
5702
TRANSPORTING A TETHER
5704
TRANSPORTING A SEISMIC DATA AQUISITION UNIT
5706
CONTROLLING A SPEED OF DEPLOYMENT OF A CABLE
5708
DISENGAGING A CONNECTOR
5710
INSERTING THE CONNECTOR
5712
ALIGNING THE CONNECTOR WITH THE CABLE
5714
DEPLOYING THE CABLE
5716
POSITIONING A TUMBLER TO ENGAGE THE SPINDLE

BACK DECK AUTOMATION

CROSS-REFERENCES TO RELATED APPLICATIONS

This application is a continuation of U.S. patent application Ser. No. 15/353,439, filed on Nov. 16, 2016, and which remains pending as of the filing date of the present application.

BACKGROUND

A seismic data acquisition system can acquire seismic data relating to subsurface features, such as lithological formations or fluid layers that may indicate the presence of hydrocarbons, minerals or other elements. An acoustic signal can penetrate the surface of the earth. The acoustic signal can reflect or refract off of subsurface lithological formations. The reflected or refracted acoustic signals can be acquired, analyzed, and interpreted to indicate physical characteristics of, for example, the lithological formations such as the presence of hydrocarbons.

SUMMARY

At least one aspect is directed to a system to deploy seismic data acquisition units from a marine vessel. The system can include a spindle and a connector. The spindle can include a first protrusion extending from the spindle. The spindle can include a second protrusion extending from the spindle. The first protrusion and the second protrusion can form at least a portion of an opening between the first protrusion and the second protrusion. Tire connector can include a tumbler. The tumbler can be disposed in a first position at least in part in a cavity of the connector. The tumbler can be constructed to extend at least partially from the cavity in a second position to enter the opening formed by the first protrusion and the second protrusion and to contest the spindle. The tumbler can include a mechanical force device in contact with the tumbler. The mechanical force device can bias the tumbler from the first position to the second position. The spindle can be coupled a seismic data acquisition unit deployment cable.

At least one aspect is directed to a method of deploying seismic data acquisition units from a marine vessel. The method can include providing a spindle. The spindle can include a first protrusion extending from the spindle and a second protrusion extending from the spindle. The first protrusion and the second protrusion can form at least a portion of an opening between the first protrusion and the second protrusion. The method can include providing a connector comprising a tumbler disposed in a cavity of the connector in a first position. The method can include a mechanical force device in contact with the tumbler extending the tumbler from the first position to a second position to enter the opening and contact the spindle. The method can include conveying, by a seismic data acquisition unit deployment cable extending through the spindle, the spindle engaged with the connector via the tumbler in the second position.

At least one aspect is directed to a system to mount seismic data acquisition units for deployment from a marine vessel. The system can include a spindle, a connector, a tether, a pin, and a connection block. The spindle can include a first protrusion and a second protrusion. The first protrusion and the second protrusion can form at least a portion of an opening between the first protrusion and the second protrusion. The connector can include a tumbler disposed in a cavity of the connector. The tumbler can be constructed to extend at least partially from the cavity to enter the opening formed by the first protrusion and the second protrusion. The connector can include an and region of the connector forming an opening. The tether can include an end region forming an opening. The pin can be disposed in the opening formed by the end region of the connector and the opening formed by the end of the tether. The pin can define a pivot point abort which the tether pivots. The connection block can be attached to n second end of the tether via a cable. The connection block can include a protrusion to engage a seismic data acquisition unit.

At least one aspect is directed to a system to mount seismic data acquisition units for deployment from a marine vessel. The system can include a spindle. The spindle can include a first protrusion extending from the spindle and a second protrusion extending front the spindle. The first protrusion and the second protrusion can form at least a portion of an opening between the first protrusion and the second protrusion. The system can include a tether comprising an end forming an opening. The system can include a first connection means for coupling the tether to the spindle. The system can include a pin disposed in the opening formed by the end of the connector and the opening formed by the end of the tether. The pin can define a pivot point about which the tether pivots. The system can include a second connection means that coupler a seismic data acquisition unit to the tether.

At least one aspect is directed to method of mounting seismic data acquisition units for deployment from a marine vessel. The method can include providing a spindle having a first protrusion extending front the spindle and a second protrusion extending from the spindle. The first protrusion and the second protrusion can form at least a portion of an opening between the first protrusion and the second protrusion. The method can include providing a connector. The connector can include a tumbler disposed in a cavity of the connector in a first position. The tumbler can be disposed in a second position to extend at least partially from the cavity to enter the opening formed by the first protrusion and the second protrusion and contact the spindle. The connector can include an end of the connector forming an opening. The method can include providing a tether comprising an end forming an opening. The method can include providing a pin disposed in the opening formed by the end of the connector and the opening formed by the end of the tether. The pin can define a pivot point about which the tether pivots. The method can include providing a connection block attached to a second end of the tether via a cable. The connection block can include a protrusion to engage a seismic data acquisition unit.

At least one aspect is directed to a system to deploy seismic data acquisition unite from a marine vessel. The system can include a tether comprising a cavity and a tether cap. The tether cap can be coupled to a connector having a pivot point external to the cavity. The system can include a cord disposed at least partially within the cavity of the tether. The cord can be fastened within the cavity of the tether cap. The system can include a connection block coupled to a portion of the cord external to the cavity of the tether. The system can include a transponder coupled to at least one of the connector and the tether. The transponder can include a transmitter that wirelessly transmits an indication of at least one of a location of the transponder and a status of the transponder.

At least one aspect is directed to a method of deploying seismic data acquisition units from a marine vessel. The method can include providing a tether comprising cavity and a tether cap. The method can include coupling the base to a connector having a pivot point external to the cavity of the tether. The method can include disposing a cord at least partially within the cavity of the tether. The method can include fastening the cord to the tether cap. The method can include coupling a connection block to a portion of the cord external to the cavity of the tether. The method can include coupling a transponder to at least one of the connector and the tether. The method can include the transponder wirelessly transmitting an indication of at least one of a location of the transponder and a status of the transponder.

At least one aspect is directed to a system to mount seismic data acquisition units for deployment from a marine vessel. The system can include a first conveyor having a conveyor arm to transport a tether. The tether can be coupled to the conveyor arm via a connector having a tumbler disposed in a cavity of the connector. The system can include a connection block at an end of the tether. The system can include a seismic data acquisition unit disposed on a second conveyor. The seismic data acquisition unit can include a tether receiver. The second conveyor can transport the seismic data acquisition unit towards the tether to align the tether receiver of the seismic data acquisition unit with the connection block of the tether to couple the seismic date acquisition unit to the tether. The system can include a deployment regulator device to control a speed of deployment of a cable. The system can include a spindle. The spindle can include a first protrusion and a second protrusion to form at least part of an opening. The spindle can include a first end of the spindle forming a first aperture. The spindle can include a second end of the spindle forming a second aperture. The cable can extend through the first aperture at the first end and the second aperture at the second end. The system can include a table comprising a deployment block. The cable can extend through the deployment block. The system can include a robotic arm. The system can include a processor to control the robotic arm to disengage the connector of the tether from the conveyor arm and insert the connector into the deployment block on the table. The processor can control the robotic arm to align the connector of the tether with the cable that extends through the deployment block. The deployment regulator device can deploy the cable to direct the spindle towards the connector of the tether. The system can include a mechanical force device in contact with the tumbler that disposes the tumbler in a position to at least partially extend from the cavity and enter the opening to engage the spindle.

At least one aspect is directed to a method of mounting seismic data acquisition units for deployment from a marine vessel. The method can include transporting, by a first conveyor comprising a conveyor arm, tether coupled to the conveyor arm via a connector having a tumbler disposed in a cavity of the connector. The method can include transporting, by a second conveyor, a seismic data acquisition unit to align a tether receiver of the seismic data acquisition unit with a connection block of the tether to couple the seismic data acquisition unit to the tether. The method can include controlling, by a deployment regulator device, a speed of deployment of a cable having a spindle. The spindle can include a first protrusion extending from the spindle and a second protrusion extending from the spindle to form an opening. The spindle can include a first end of the spindle forming a first aperture. The spindle can include a second end of the spindle forming a second aperture, wherein the cable extends through the first aperture at the first end and the second aperture at the second end. The method can include disengaging, by a robotic arm, the connector of the tether from the conveyor arm. The method can include inserting, by the robotic arm, the connector into a deployment block on a table. The method can include aligning, by the robotic arm, the connector of the tether with the cable that extends through the deployment block. The method can include deploying, by the deployment regulator device deploys, the cable to direct the spindle towards the connector of the tether. The method can include positioning, by a mechanical fence device responsive to an interaction between the spindle and the connector, the tumbler of the connector in the opening to engage the spindle.

At least one aspect a directed to a system to retrieve seismic date acquisition units from an aqueous medium. The system can include a retrieval block disposed in a retrieval position on a deck of a marine vessel. The retrieval block can be disposed in the retrieval position adjacent to a cable used for deployment of seismic date acquisition unite from the marine vessel into the aqueous medium. The system can include retrieval guide rails disposed in the retrieval block to guide a spindle coupled to the cable into the retrieval block. The spindle can be coupled to a connector. The connector can be coupled to a tether. The tether can be coupled to a seismic data acquisition unit. The system can include a decoupler to disengage the spindle from the connector. The cable and spindle can be reeled in through the guide rails of the retrieval block. The system can include a robotic arm to remove the connector from the guide rails on the retrieval block. The connector can be coupled to the tether and the seismic data acquisition unit.

At least one aspect is directed to a method of retrieving seismic data acquisition units from an aqueous medium. The method can include disposing a retrieval block in a retrieval position on a deck of a marine vessel. The retrieval block can be disposed in the retrieval position adjacent to a cable used for deploying seismic date acquisition units from the marine vessel into the aqueous medium. The method can include guiding, via retrieval guide rails disposed in the retrieval block, a spindle coupled to the cable into the retrieval block. The spindle can be coupled to a connector. The connector can be coupled to a tether, and the tether can be coupled to a seismic data acquisition unit. The method can include disengaging, by a decoupler of the retrieval block, the spindle from the connector. The cable and spindle can be reeled in through the guide rails of the retrieval block. The method can include removing, by a robotic arm, the connector from the guide rails on the retrieval block. The connector can be coupled to the tether and the seismic data acquisition unit.

At least one aspect is directed to a system to perform a seismic survey in an aqueous medium via a marine vessel. The system can include a table on a deck of a marine vessel. The system can include a deployment block disposed on the table. The deployment block can be disposed in a deployment position to receive a cable responsive to initiation of a deployment operation. The deployment block on facilitate deploying seismic data acquisition units from the marine vessel into the aqueous medium. The deployment block can be constructed to move to a stowed position. The system can include a retrieval block disposed on the table. The retrieval block can be disposed in a retrieval position to receive the cable responsive to initiation of the retrieval operation. The retrieval block can facilitate retrieving seismic data acquisition units from the aqueous medium. The retrieved block can be constructed to move to the stowed position. The system can include a robotic arm to insert a connector into the deployment block to couple the connector to a spindle coupled to the cable in the deployment operation. The robotic arm can disengage the connector from the spindle in the retrieval operation. The connector can be coupled to a tether coupled to a seismic data acquisition unit.

At least one aspect is directed to a method of performing a seismic survey in an aqueous medium via a marine vessel. The method can include providing a table on a deck of a marine vessel. The method can include disposing a deployment block on the table in a deployment position to receive a cable. The method can include disposing a retrieval block on the table in a stowed position a predetermined distance from the cable. The method can include receiving, by the deployment block, a spindle coupled to the cable. The method can include inserting, by a robotic arm, a connector into the deployment block to couple the connector to the spindle coupled to the cable. The connector can be coupled to a tether coupled to a seismic data acquisition unit. The method can include disposing the deployment block to the stowed position. The method can include disposing the retrieval block in a retrieval position to receive the cable. The method can include receiving, by the retrieval block, the spindle coupled to the connector, the connector coupled to the tether coupled to the seismic data acquisition unit. The method can include disengaging, by the retrieval block, the connector from the spindle to separate the seismic data acquisition unit from the cable.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
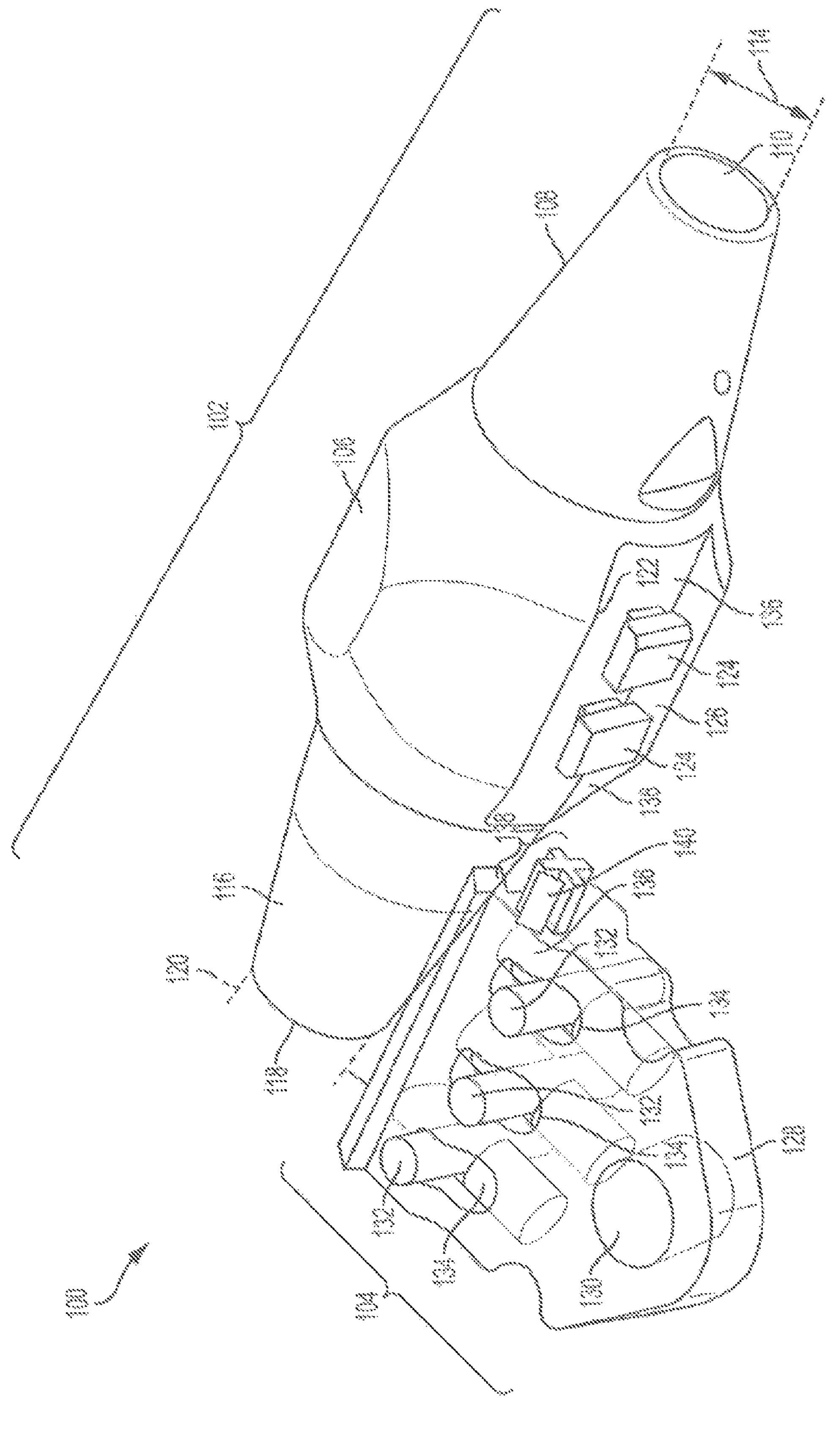
FIGS. 1-21 depict a spindle and a connector used to deploy seismic data acquisition units from a marine vessel, in accordance with some implementations.

Following below are more detailed descriptions of various concepts related to, and implementations of, methods, apparatuses, and systems of automating back deck operations to deploy seismic data acquisition units from a marine vessel. The seismic data acquisition unite, for example, can attach to a connection block. The connection block can attach to a tether. The tether can attach to a spindle. The spindle can be coupled to a deployment cable. The spindle, along with the tether, connection block and seismic data acquisition unit, can be deployed from the marine vessel and into an aqueous medium. The various concepts introduced above and discussed in greater detail below may be implemented in any of numerous ways, as the described concepts are not limited to any particular manner of implementation.

In a sub-marine seismic data acquisition system a series of seismic data acquisition units (e.g., nodes) can be deployed from a marine vessel onto a seabed or lakebed. An acoustic signal can be propagated from a source through the water column and can pass the seabed and enter (e.g., "down") into the earth. The acoustic signal can reflect or refract off of various lithological formations back (e.g., "up") toward the surface of the earth. The seismic date acquisition units deployed on the seabed can acquire the reflected or refracted acoustic signals.

An extraction vehicle, such as on autonomous or remote underwater vehicle, or other entity such as a vessel on the surface of the body of water can wirelessly or optically communicate with the seismic data acquisition units deployed on a seabed or other surface of the earth to extract the acquired seismic data. The systems and methods described herein relate to techniques used to deploy the seismic data acquisition units from the marine vessel and into the aqueous medium. For example, there can be hundreds or thousands of seismic date acquisition units stored on a marine vessel. It can be challenging to timely deploy the hundreds or thousands of seismic date acquisition units and position them on a seabed. For example, it can be challenging due to the size or weight of the seismic data acquisition units, the manner in which the seismic data acquisition units are to be handled to mitigate the risk of damaging sensitive components in the seismic data acquisition units, the limited space on the deck of the marine vessel, or the limited resources available to deploy the seismic data acquisition units.

The systems and methods of the present technical solution can facilitate deploying the seismic data acquisition units from tee marine vessel into the aqueous medium so they can be positioned on a seabed, in a symmetrical array pattern, other pattern, or random deployment. For example, systems and methods of the present technical solution can automate certain back deck operations to deploy seismic data acquisition units from a marine vessel. The present solution can include a spindle coupled to a deployment cable. The spindle can attach to a connector that includes tumblers configured to secure the connector to the spindle. A tether can attach to the connector via a pin. A connection block can attach to the tether. The connection block can include a protrusion to engage the seismic data acquisition unit.

Thus, systems and methods of the present disclosure can partially or fully automate one or more aspect, component or function on a back deck of a marine vessel to deploy seismic data acquisition units into an aqueous medium, or retrieve seismic data acquisition units from the aqueous medium.

FIG. 1 depicts a system to deploy seismic data acquisition units from a marine vessel. The system 100 can include a spindle 102 and a connector 104. The spindle 102 can include a first protrusion 124 extending from the spindle 102. The spindle 102 can include a second protrusion 124 extending from the spindle. The first protrusion 124 and the second protrusion 124 can form at least a portion of an opening 126 (or groove 126) between the first protrusion 124 and the second protrusion 124. The connector 104 can include a tumbler 132. The tumbler 132 can be disposed in a first position at least in part in a cavity 138 of the connector 104. The tumbler 132 can be constructed to extend at least partially from the cavity 138 in a second position to enter the opening 126 formed by the first protrusion 124 and the second protrusion 124 and to contact the spindle 102. The tumbler 132 can include a mechanical force device 134 in contact with the tumbler 132. The mechanical force device 134 can bias the tumbler 132 from the first position to the second position. The spindle 102 can be coupled to a seismic date acquisition unit deployment cable (e.g., cable 1802 depicted in FIG. 18) that extends through the spindle 102 via openings 118 and 110.

The spindle 162 can include a first opening 118 at a first end 116 of the spindle 102. The first opening 118 can be referred to as a first aperture. The spindle 102 can include a second opening 110 at a second end 108 of the spindle 102. The second opening can be referred to as a second aperture. In some cases, a seismic data acquisition unit deployment cable (e.g., cable 1802 depicted in FIG. 18) can extend through the first opening 118 at the first end 116 of the spindle 102 and the second opening 110 at the second end 108 of the spindle 102. The seismic data acquisition unit deployment cable can extend from a spool that stores the cable on the marine vessel.

The spindle 102 and its components, such as the first end 116, second end 108, middle portion 106, or protrusions 124 can be formed of one or more material. The one or more materials can be suitable for use in an aqueous environment. For example, material can include one or more of plastics, metals, fiberglass, PolyVinyl Chloride, steel, iron, composite materials, steel-reinforced cement, or aluminum. The spindle 102 can include an exterior surface that is a continuous sheet of material, closed or non-porous. The surface of the spindle 102 can include a porous structure. For example, the spindle 102 can include perforations, holes, a mesh, a skeleton type structure, or a lattice structure. The spindle 102 can be constructed to hold onto the cable 1802. The spindle 302 can be constructed with an internal surface that connects the cable 1802.

The spindle 102 can include an internal surface with a coefficient of friction that couples the spindle 102 to a portion of the cable 1802. The spindle 102 can be fixed to the portion of the cable 1862 such that the spindle 102 does not slide or move relative to the cable 1802. The spindle 162 can include an internal surface with protrusions or teeth that hold or grab onto the cable. The first end 116 of the spindle 102 can taper towards the first opening 118 such that a diameter 120 (or other cross distance) of the first opening 118 is sufficient to allow the cable 1802 to traverse the opening 118. The diameter 120 of the first opening 118 can be set or established such that the spindle 102 grips onto the cable 1802 and prevents the spindle 102 from sliding or moving relative to the cable 1802. Similarly, the second end 108 of the spindle 102 can taper towards the second opening 110 such that a diameter 114 of the second opening 110 is sufficient to allow the cable 1802 to traverse the second opening 110. The diameter 114 of the second opening 110 can be set or established such that the spindle 102 grips onto the cable 1802 and prevents the spindle 102 from sliding or moving relative to the cable 1802. The diameter 110 or diameter 120 can be determined based on the diameter of the cable 1802. For example, the diameter 110 or diameter 120 can be the same as the diameter of the cable 1802, less than the diameter of the cable 1802 (e.g., at least 1% less, 2% less, 3% less, 4% less, 5% less, or 10% less than the diameter of the cable 1802), or greater than the diameter of the cable 1802 (e.g., at least 1% more, 2% more, 3% more, 4% more, 5% more, or 10% more than the diameter of the cable 1802). The diameter 120 or diameter 110 can be less than an uncompressed diameter of the cable 1802. For example, the cable 1802 can be capable of being compressed. The cable 1802 can be deformable by a certain degree (e.g., 1%, 2%, 3%, or more). By setting the diameter of the first or second ends of the spindle to be less than the uncompressed diameter of the cable, the spindle can grip onto the cable such that the spindle may not move relative to the portion of the cable.

The spindle 102 can include one or more protrusions 124 that form at least a portion of one or more openings 126. A protrusion 124 can be formed of the same or different material than the spindle 102. The protrusion 124 can be any shape or size. The protrusion 124 can have a rectangular shape, square shape, triangular shape or other polygonal shape. The pretension 124 can haw a similar shape, elliptical shape, or rounded or circular portion. The protrusion 124 can extend from the spindle by a distance to facilitate allowing the connector 104 to attach to the spindle. For example, the protrusion 124 can extend from the spindle by at least 0.1 inch, 0.2 inches, 0.25 inches, 0.3 inches, 0.4 inches, 0.5 inches, 0.6 inches, 1 inch, 1.25 inches, 1.5 inches, 1.75 inches, 2 inches, 2.5 inches, 3 inches, 4 inches, 5 inches, 6 inches or more. The surface of the protrusion 124 can have diameter or length that facilitates engaging with the connector 104. For example, an edge of the protrusion can have a length that is at least 0.1 inch, 0.2 inches, 0.25 inches, 0.3 inches, 0.4 inches, 0.5 inches, 0.6 inches, 1 inch, 1.25 inches, 1.5 inches, 1.75 inches, 2 inches, 2.5 inches, 3 inches, 4 inches, 5 inches, 6 inches or more.

The protrusions 124 can form an opening 126. The dimensions of the protrusion can define at least a portion of the dimensions of the opening 126. For example, a length of an edge of the protrusions 124 adjacent the opening 126 can be 1 inch, which can form the cavity with a portion that is 1 inch. The protrusions 124 can be separate from one another by a distance that forms the width of the opening 126. For example, the distance between the protrusions can be at least 0.1 inch, 0.2 inches, 0.25 inches, 0.3 inches, 0.4 inches, 0.5 inches, 0.6 inches, 1 inch, 1.25 inches, 1.5 inches, 1.75 inches, 2 inches, 2.5 inches, 3 inches, 4 inches, 5 inches, 6 inches or more. Thus, the width of the opening 126 can be at least 0.1 inch, 0.2 inches, 0.25 inches, 0.3 inches, 0.4 inches, 0.5 inches, 0.6 inches, 1 inch, 1.25 inches, 1.5 inches, 1.75 inches, 2 inches, 2.5 inches, 3 inches, 4 inches, 5 inches, 6 inches or more based on the distance between the protrusions 124. The opening 126 can have walls formed by the protrusions 124. Use opening 126 cars have an open end, such m an open end due to the absence of a protrusion 124. The opening 126 can have one or more open ends, or all ends can be closed. For example, a longitudinal protrusion 122 can extend along an end of the opening 126 and close the end of the opening 126. One or more longitudinal protrusions 122 can extend along the ends of the opening 126 to close one or of the opening 126.

The protrusions 324 can form or define additional openings 136 (or groove 136) or portions of openings 136. The opening 136 can be on a side of the protrusion 124 that in not adjacent to another protrusion 124. The opening 136 can be on a side of the protrusion that is opposite the opening 126. The opening 136 can be different from the opening 126. For example, the opening 136 can have an open end that is not defined or closed by a protrusion 124 or other wall or enclosure.

The connector 104 can include a cavity 138 containing one or more tumblers 132. For example, the connector 104 can include at least one tumbler 132, at least two tumblers 132, at least three tumblers 132, or at least four tumblers 132. The tumblers 132 can be disposed in a first positioned at least partially within the cavity 138 of the connector 104. The tumbler 132 can be configured to extend at least partially from the cavity 138 in a second position to enter the opening 136 or opening 126 formed or defined by the protrusions 124 on the spindle 102. For example, the spindle 102 can include at least one opening 126, at least two openings 126 or 136, at least three openings 126 or 136, or at least four openings 126 or 136. The number of openings 126 or 136 can be based on the number of protrusions 124. The number of openings 126 or 136 can be set based on the number of tumblers 132. For example, if the connector 104 includes three tumblers 132, the spindle 102 can be configured with one opening 126 and two openings 136.

The tumbler 132 can be formed of one or more materials suitable for use in an aqueous environment. For example, the one or more materials can include one or more of plastics, metals, fiberglass, PolyVinyl Chloride, steel, iron, composite materials, steel-reinforced cement, or aluminum. The tumblers 132 can have a shape. For example, at least a portion of the tumbler 132 can be cylindrical, rectangular, square portion, rounded, or polygonal. The tumbler 132 can have one or more portions that extend in one or more directions. The tumbler 132 can include a portion that extends vertically end a portion that extends horizontally or orthogonally. The tumbler 132 can be formed of one or more components. The tumbler 132 can be formed from an extrusion process.

The connector 104 can include a mechanical force device 134 that is in contact with the temblor 132. The mechanical force device 134 can bias the tumbler 132 from the first position in the cavity 138 to the second position extending at least partially from the cavity 138 to enter the opening 136 or opening 126 formed by protrusions 124 on the spindle. The mechanical force device 134 can include a spring, foam, a resilient flexible plastic, or other material or device that can exert mechanical force on the tumbler 132 to direct the tumbler 132 towards the spindle 102.

The connector 104 can include a locking mechanism 140. The locking mechanism 140 can lock the tumbler 132 in a certain position. The locking mechanism 140 can lock the tumbles 132 such that the tumbler 132 is disposed in the first position or the second position. The locking mechanism 140 can be disposed in a first state to lock the tumbler 132 such that the tumbler is disposed in the second position to contact the spindle 102. The tumbler 132, when disposed in the second position, can at least partially enter the opening 126 or opening 136 of the spindle 102. The locking mechanism 140 can be disposed in a second state to release the tumbler 132 and disengage the connector 104 from the spindle 102. For example, the locking mechanism can release to allow the tumbler 132 to be disposed in the first position and within the cavity 138, thereby disengaging the spindle 102.

The locking mechanism 140 can include a median seal lock, latch, honk, adhesive, pin, fastener, magnetic lock, or electromagnetic lock. The locking mechanism 140 can be controlled by a robotic arm (e.g., robotic arm 4202 illustrated in FIG. 42). The locking mechanism 140 can be enabled or disabled by a robotic arm. The locking mechanism 140 can be electronically or magnetically controlled. The locking mechanism 140 can be mechanically controlled. The locking mechanism 140 can engage or disengage responsive to contacting the spindle 102 or a protrusion 124. For example, the locking mechanism 140 can contact the protrusion 124 and, responsive to contacting the protrusion 124, release the tumbler 132 to cause the mechanical force device 134 to dispose the tumbler 132 in the second position to enter the opening 136 or 126 and contact the spindle 102. Thus, the connector 104 can be configured for on-the-fly coupling with the spindle 102 by releasing the tumbler 132 in response to the locking mechanism 140 contacting a portion of the spindle 102.

Each tumbler 132 can have a separate locking mechanism 140. The locking mechanism 140 can release responsive to a specific protrusion 124 or a specific type of contact. For example, the spindle 102 can include multiple protrusions 124 and multiple openings 126 and 136. The locking mechanism 140 can be designed and constructed to release to allow the corresponding tumbler 132 to enter a predetermined opening 126 or 136. For example, the locking mechanism 140 can be positioned at a height that corresponds to a predetermined protrusion 124 in order to contact the predetermined protrusion 124 and release in response to contacting the predetermined protrusion 124. By releasing responsive to contacting a predetermined protrusion 124 having a height that corresponds to the locking mechanism 140 disposed on the connector 104, the tumbler 132 can release into a designated opening 126 or 136.

The connector 104 can include an end region 158 that forms or defines an opening 130. The end region 128 can have a shape. The end region 128 can have a rounded portion, triangular portion or polygonal portion. The end region 128 can be formed of the same or different material as the connector 104. The opening 130 of the and region can be have a rounded portion, triangular portion, rectangular portion, or polygonal portion. The opening 130 can be configured to receive a pin.

Figure 2:
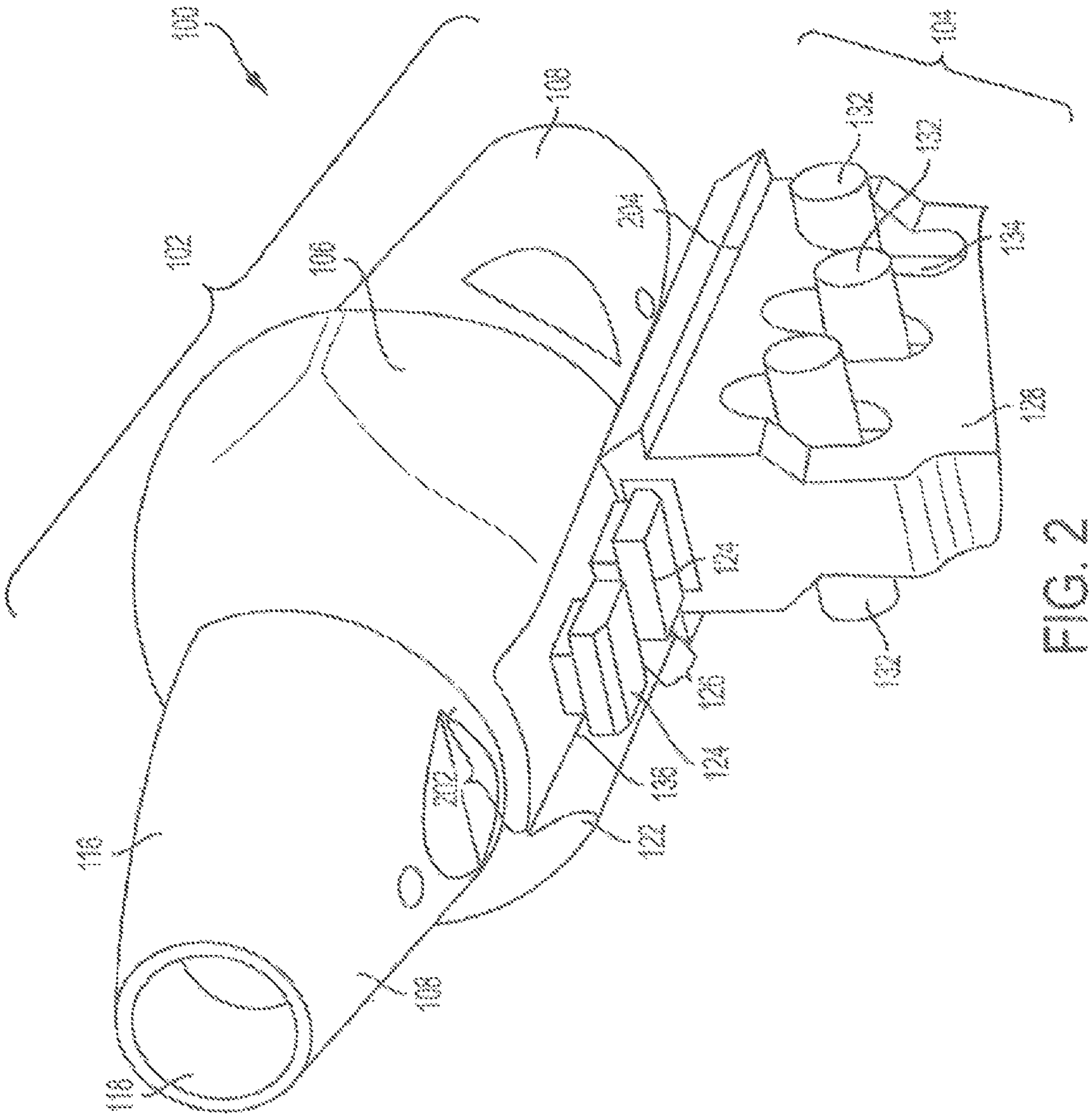

FIG. 2 depicts a system to deploy seismic data acquisition units from a marine vessel. The system 100 includes the spindle 102 and the connector 104 illustrated in FIG. 1. The system 100 depicted in FIG. 2 illustrates the connector 104 engaged with the spindle 102.

The connector 104 can slide onto the spindle 102 as illustrated in FIG. 2. As the connector 104 move relative to the spindle 102, the tumblers 132 can engage the spindle 102 and lock the connector 104 to the spindle 102. The spindle 102 can include a width 202 that corresponds to a width of the portion 204 of the connector 104 that engages with the spindle 102.

Figure 3:
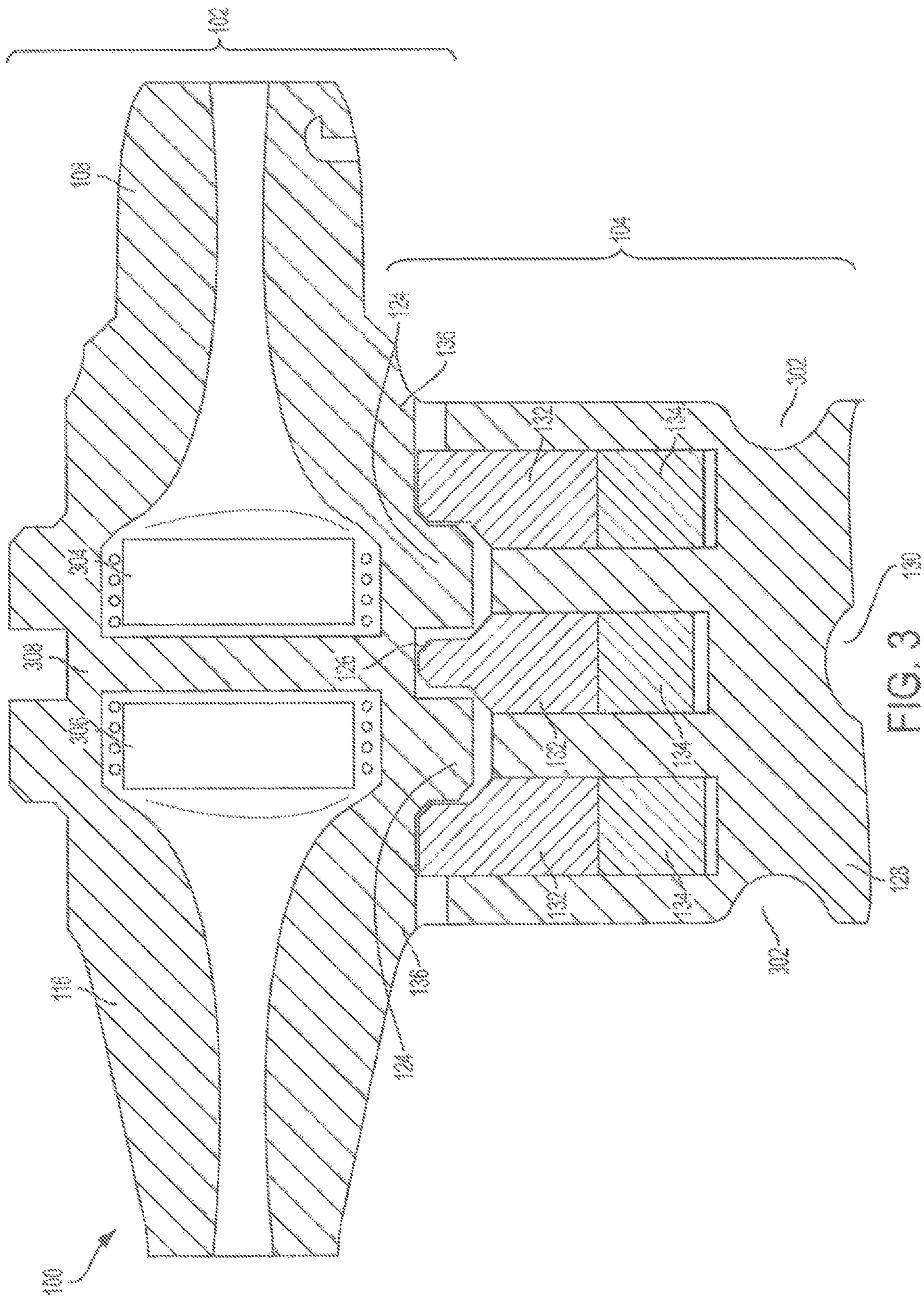

FIG. 3 depicts the system 100 including the connector 104 engaged with the spindle 102. As illustrated in FIG. 3, the connector 104 includes three tumblers 132 that are each disposed in a second position to contact the spindle 102. The mechanical force devices 132 are in their extended position and push or exert force on the tumblers 132 to keep them disposed in the second position to contact the spindle 102. The tumblers 132 can have a same shape or different shape based on the opening 125 or opening 136 in which they are configured to enter. For example, the shape of the middle tumbler 132 that enters opening 126 formed by protrusions 124 can be narrower at for end that contacts the spindle 102, as compared to the tumblers 132 that enter openings 136. The first end 116 and the second end 108 can be separate portions that are coupled to a middle portion 308 via 306 and 304. For example, the first end 116 can include a coupling end 306 that can be screwed, attached, or otherwise fastened so the middle portion 303. The second end 108 can include a coupling end 304 that can be screwed, attached, or otherwise fastened to the middle portion 308. The first end 116 and the second end 108 can be coupled via respective coupling end 306 and 304 to form the spindle 102.

Figure 4:
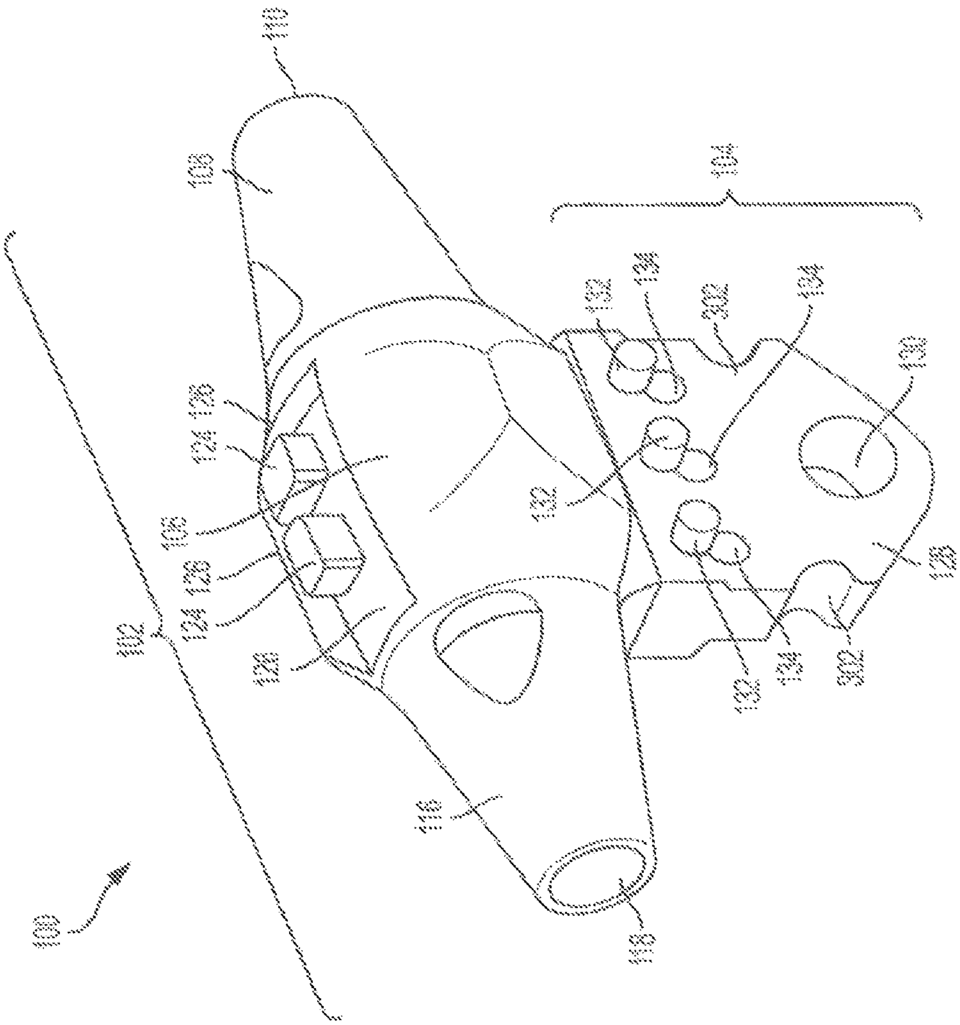

FIG. 4 depicts the system 100 including the connector 104 engaged with the spindle 102. The end portion 128 can include portions 302 that are cutouts or carve outs in foe end portion 128. These cutout portions 302 can facilitate engagement with a seismic data acquisition device. The spindle 102 can include protrusions 124 on a top portion of the spindle, in addition to, of instead of, including the protrusions 124 on a bottom portion of the spindle 102. The spindle 102 can include the groove or openings 126 formed, at least in part, by the protrusions 124 on the top portion of the spindle 102. For example, the spindle 102 can include a first set of protrusions 124 on the top portion of the spindle 102, and the spindle 102 can include a second set of protrusions 124 on the bottom portion of the spindle 102.

Figure 5:
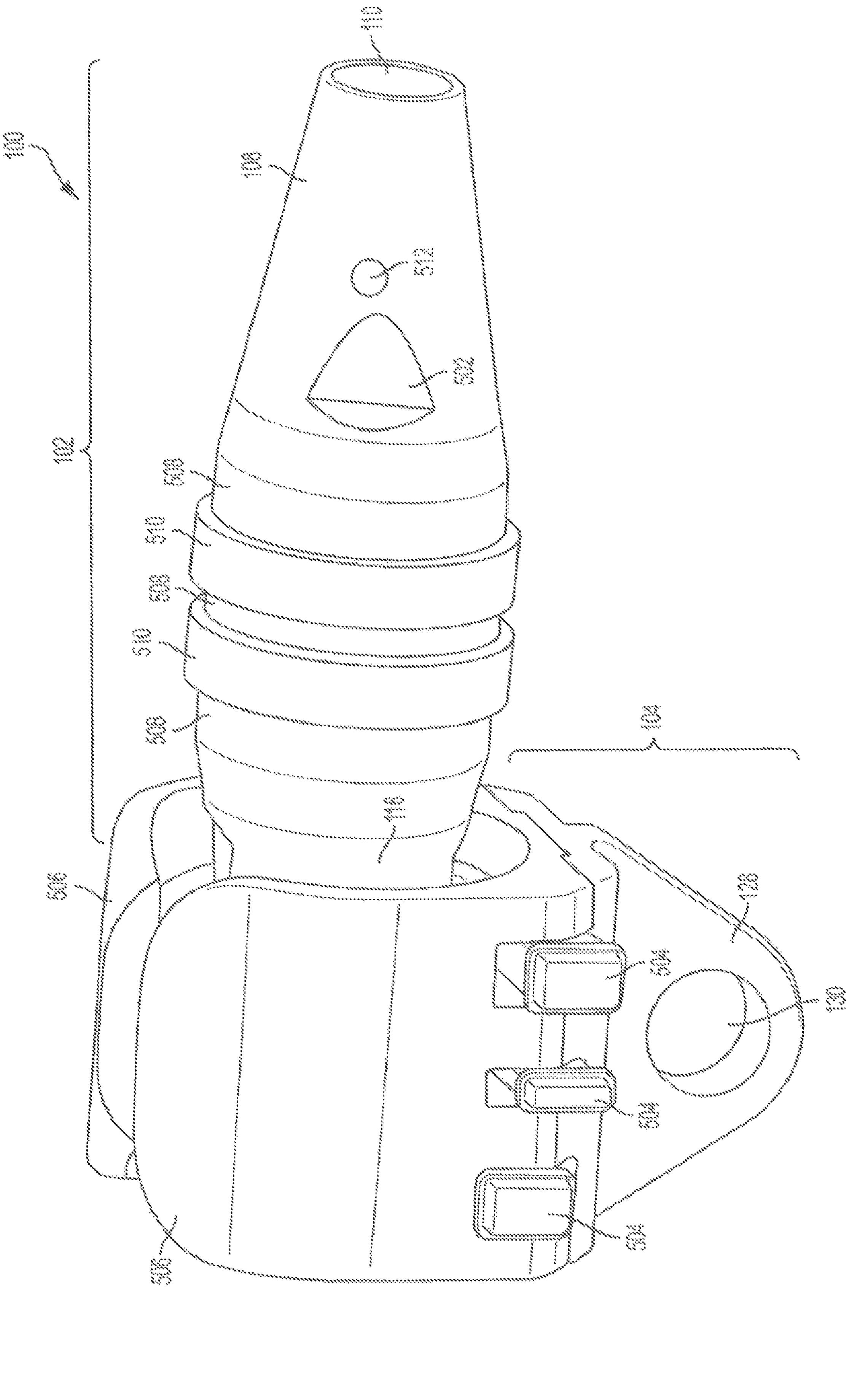

FIG. 5 depicts the system 100 including a spindle 102 and connector 104, in accordance with an implementation. The spindle 102 depicted in FIG. 5 can include protrusions 510 that extend radially from the spindle. For example, a first protrusion 510 and a second protrusion 510 can encircle the spindle 102. Each protrusion 510 can form a band around the spindle 102. The protrusion 510 can include one or more component or functionality of protrusion 124. The protrusion 510 can be interchangeable with protrusion 124, or the same as tumbler 124. Each protrusion 510 can form a ring around the spindle 102. The protrusions 510 can form or defining one or more openings 508 that also encircle the spindle 102. By forming a band or ring around the spindle 102, the protrusions 510 extending radially from the spindle 102 can facilitate the tumblers 504 entering the opening 508 or groove 508 because the tumblers 504 can more easily align with the opening 508.

The connector 104 can include one or more tumblers 504. The tumblers 504 can be a same type of tumbler or different type of tumbler 504. The tumbler 504 can include one or more component or functionality of tumbler 132. The tumbler 504 can be interchangeable with tumbler 132, or the same as tumbler 132. The tumbler 504 can include a square or rectangular portion that extends from the connector 104.

The connector 104 can include a collar 506. The collar 506 can be formed of a same or similar material as the connector 104. The collar 504 can at least partially wrap around the spindle 502. The cellar 504 can partially wrap around the spindle 102, or completely wrap around the spindle 102. The collar 504 can have an open portion. The collar 506 can be formed of two separate cellar portions 506. The collar 506 can be coupled to the connector 104. The collar 506 can facilitate engagement between the connector 104, the tumblers 504 and the spindle 102. The collar 506 can facilitate secure engagement between the connector 104 and the spindle 102 by preventing the connector 104 from moving, vibrating, or otherwise disengaging from the spindle 102.

The spindle 102 can include a cavity 502. The cavity 502 can facilitate locking the spindle 102 in the collar 506. The spindle 102 can include a transponder 512 or beacon 512. The transponder 512 can provide location information, acoustic signals, status information, light pulses, or other indications. The transponder 512 can indicate location information, or status information of the spindle 102. The transponder 512 can be used to engage or disengage the locking mechanism 140 of the connector 104 in order to release the tumblers 132 or tumbler 504 to contact the spindle 102.

Figure 6:
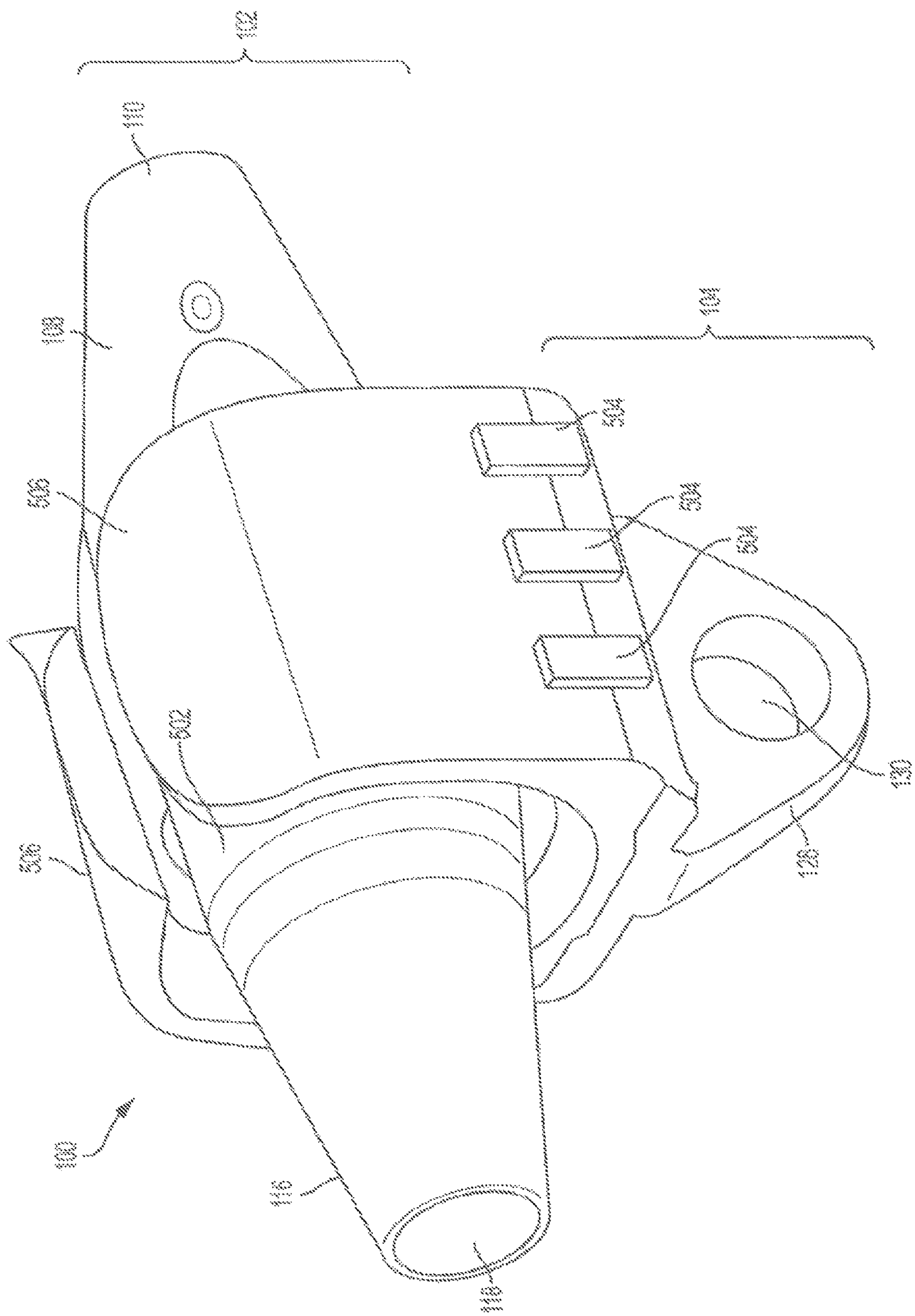

FIG. 6 depicts the system 100 including a spindle 102 and connector 104, in accordance with an implementation. FIG. 6 depute the collar 506 engaging the middle portion 106 of the spindle 102. The collar 506 can facilitate fixedly securing the connector 104 to the spindle 102 when the tumblers 504 are in the engaged position and disposed within the openings 508 of the spindle 102.

Figure 7:
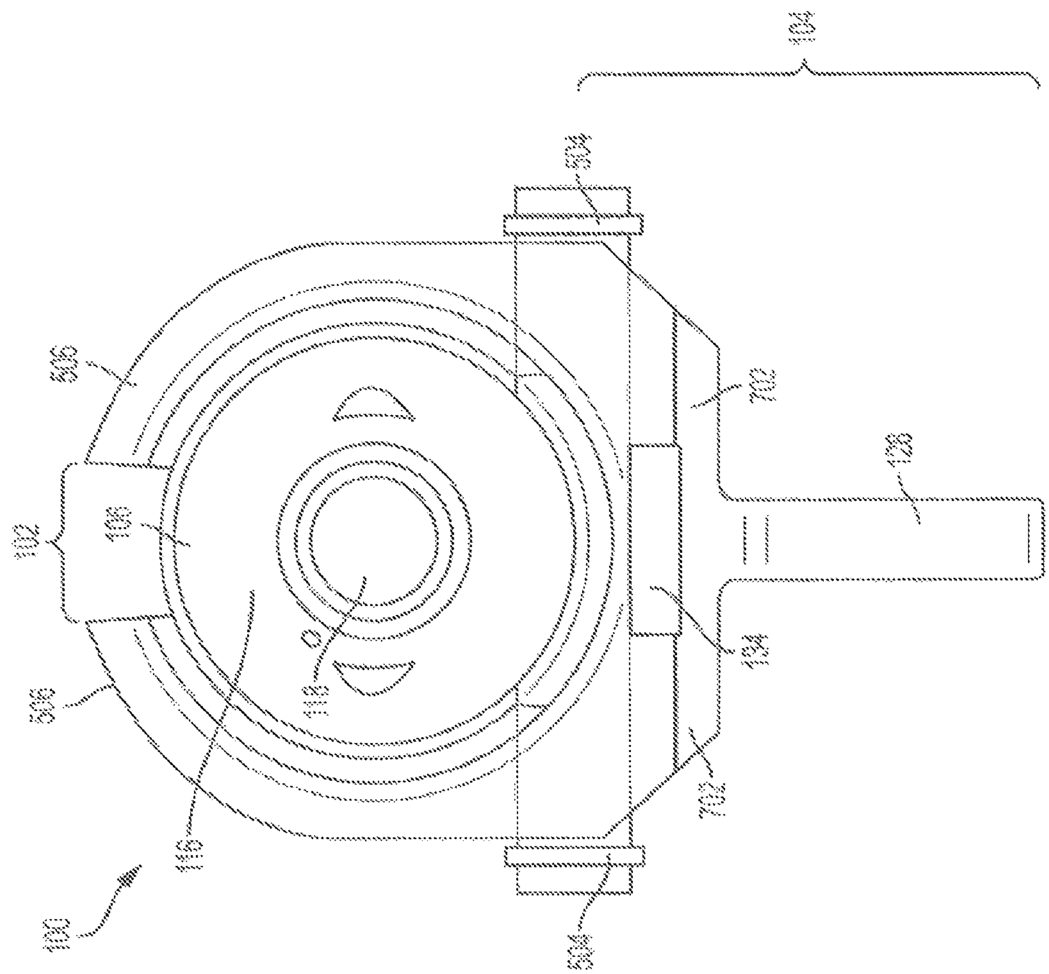

FIG. 7 depicts the system 100 including a spindle 102 and connector 104, in accordance with an implementation. The tumbler 504 as depicted in FIG. 7 can be a rectangular tumbler 504 with a concave portion in the middle of the tumbler 504 that is configured to engage with the opening 508 of the spindle 102. The connector 104 can include a portion 702 that extends on either side of the spindle 102 to facilitate securing the connector 104 to the spindle 102 and minimizing movement of the connector 104 relative to the spindle 102. The portion 702 can act as a stabilizer or support structure for the connector 104, spindle 102, or tumblers 504.

Figure 8:
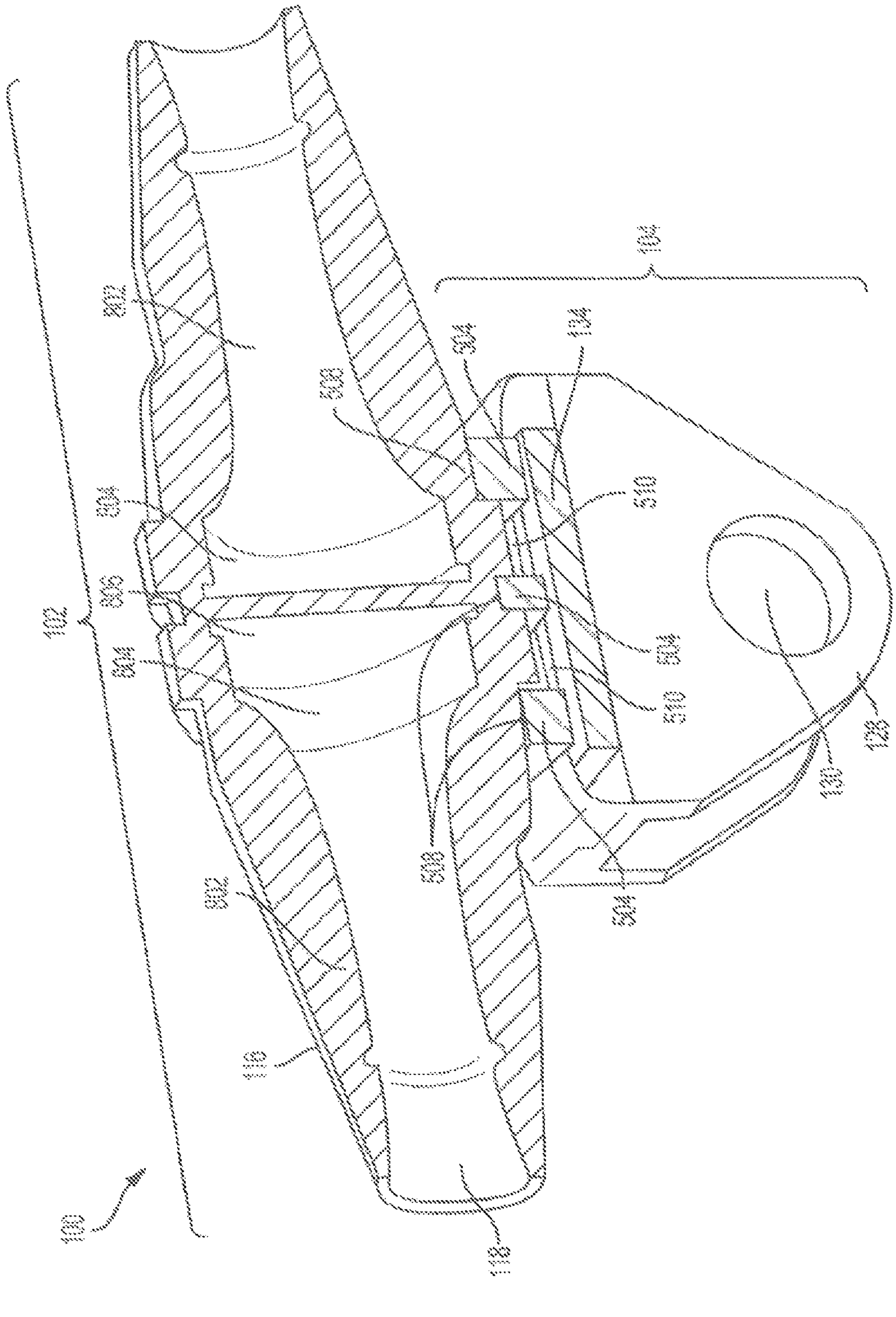

FIG. 8 depicts the system 100 including a spindle 102 and connector 104, in accordance with an implementation. The first end 116 of the spindle 102 can include a first internal wall 802. The second end 110 of the spindle 102 can include a second internal wall 802. The internal walls 802 can have a coefficient of friction that secures the spindle to the deployment cable. The extent protrusions 510 on the spindle 102 can have a corresponding internal protrusion 804 that secures the spindle 102 to the deployment cable. Between the internal protrusion 804, the spindle 102 can include an internal opening 806 that corresponds to the external opening 508 or the spindle 102.

Figure 9:
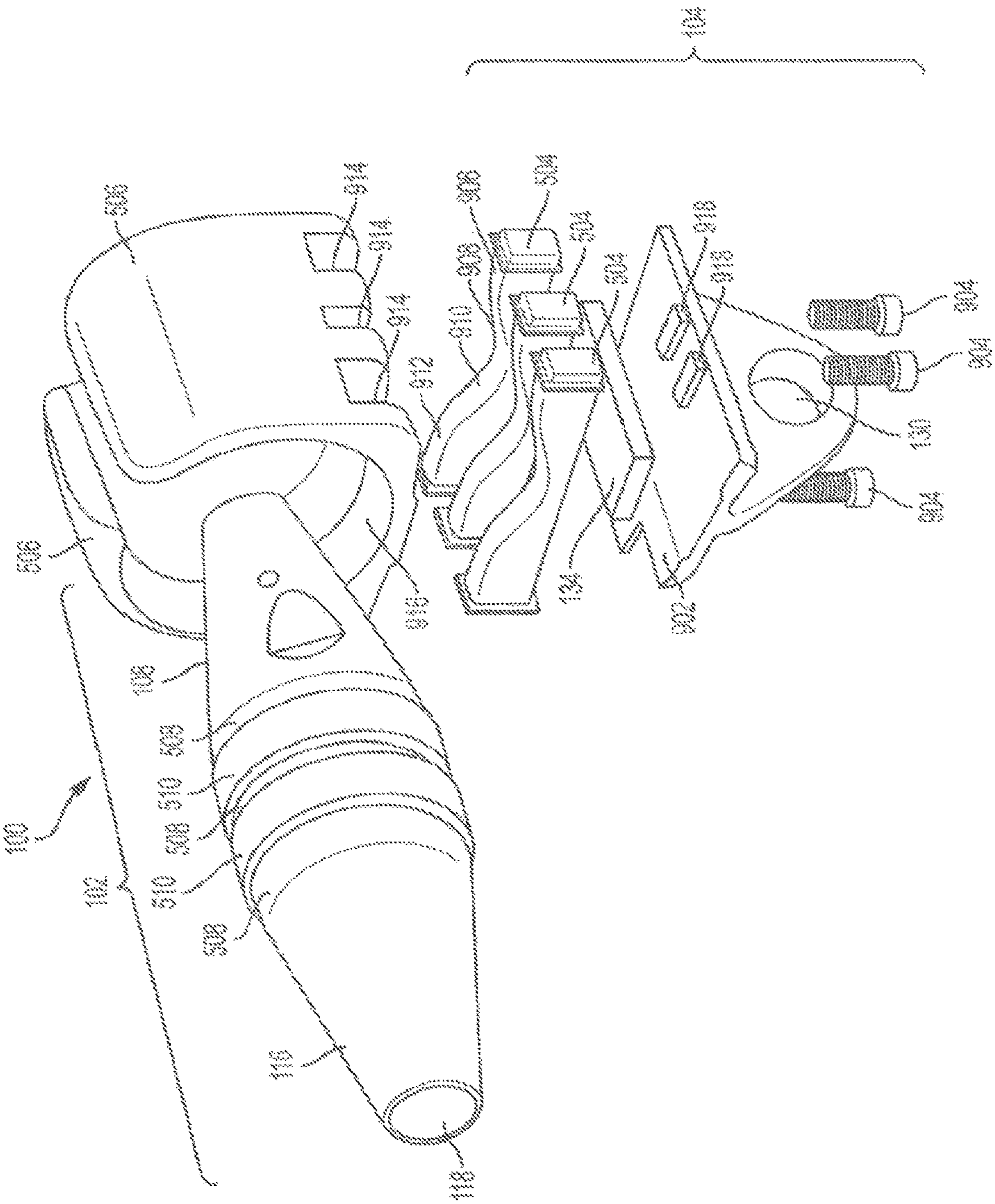

FIG. 9 depicts the system 100 including a spindle 102 and connector 104, in accordance with an implementation. The spindle 102 can be inserted into collar 506. The collar 506 can be secured to spindle 102 via tumblers 504, mechanical force devices 134 and the connector 104. Further, the connector 104 can be secured to the collar 506 via screws (or other fasteners) 904. The connector 104 can include a planar portion 902 on which the mechanical force device 134 can be placed. The planar portion 902 can be referred to as a surface of the connector 104. The planar portion 902 can include protrusions 918 that facilitate securing, aligning, coupling, or otherwise holding tumblers 504 in place as they are inserted into openings 914.

As illustrated in FIG. 9, the tumblers 504 can include a concave portion 908. The tumbler can include a portion 912, 910 and 908 that form the concave portion. For example, the tumbler 504 can include a flat portion 906. The flat portion 906 can extend into an angled portion 908 that extends towards a bottom of the tumbler 504 to reduce the width of the tumbler 504. The angled portion 908 can extend into a second flat portion 910. The flat portion 910 can form the narrowest part of the tumbler 504. The flat portion 910 can extend into a second angled portion 912. The angled portions 908 and 912 can be linear, curved or polygonal. The flat portion 910 can be linear, curved or polygonal. The dimensions of the portions 908, 910 and 912 can be established to facilitate entering an opening 508 on the spindle 102.

The collar 506 can include openings 914. The tumbler 504 can enter through the opening 914 of the collar 506 to enter opening 508 and contact the spindle 102. The collar 506 can include one or more openings 914. The number of openings 914 of the collar 506 can be based on the number of tumblers 504 of the connector 104 or the number of openings 508 of the spindle 102. For example, the collar 506 can include three openings 914. The dimensions of the openings 914 can be based on the dimensions of the tumblers 504. The tumblers 504 can each have the same or differing dimensions, in which the case the collar 506 can include openings 914 with the same dimensions or differing dimension that correspond to the tumblers 504. As illustrated in FIG. 9, a second tumbler 504 can have a different dimension as compared to the first tumbler 504 and the third tumbler 504. Similarly, a second opening 914 can have a different dimension as compared to the first opening 914 and the third opening 914. The dimensions of the second opening 914 can be set to allow the second tumbler 504 to pass through the opening 914. However, the dimensions of the second opening 914 may not allow the first tumbler 504 or the third tumbler 504 to pass through. Thus, by various the dimensions of the tumblers 504 and openings 914, the system 100 can direct predetermined tumblers 504 to predetermined openings 914 on the collar 506 to predetermine openings 508 on the spindle 102.

The collar 506 can include an internal wall 916 that is configured to engage with spindle 102. The internal wall 916 can have a coefficient friction that allows the collar 506 to slide over spindle 102.

Figure 10:
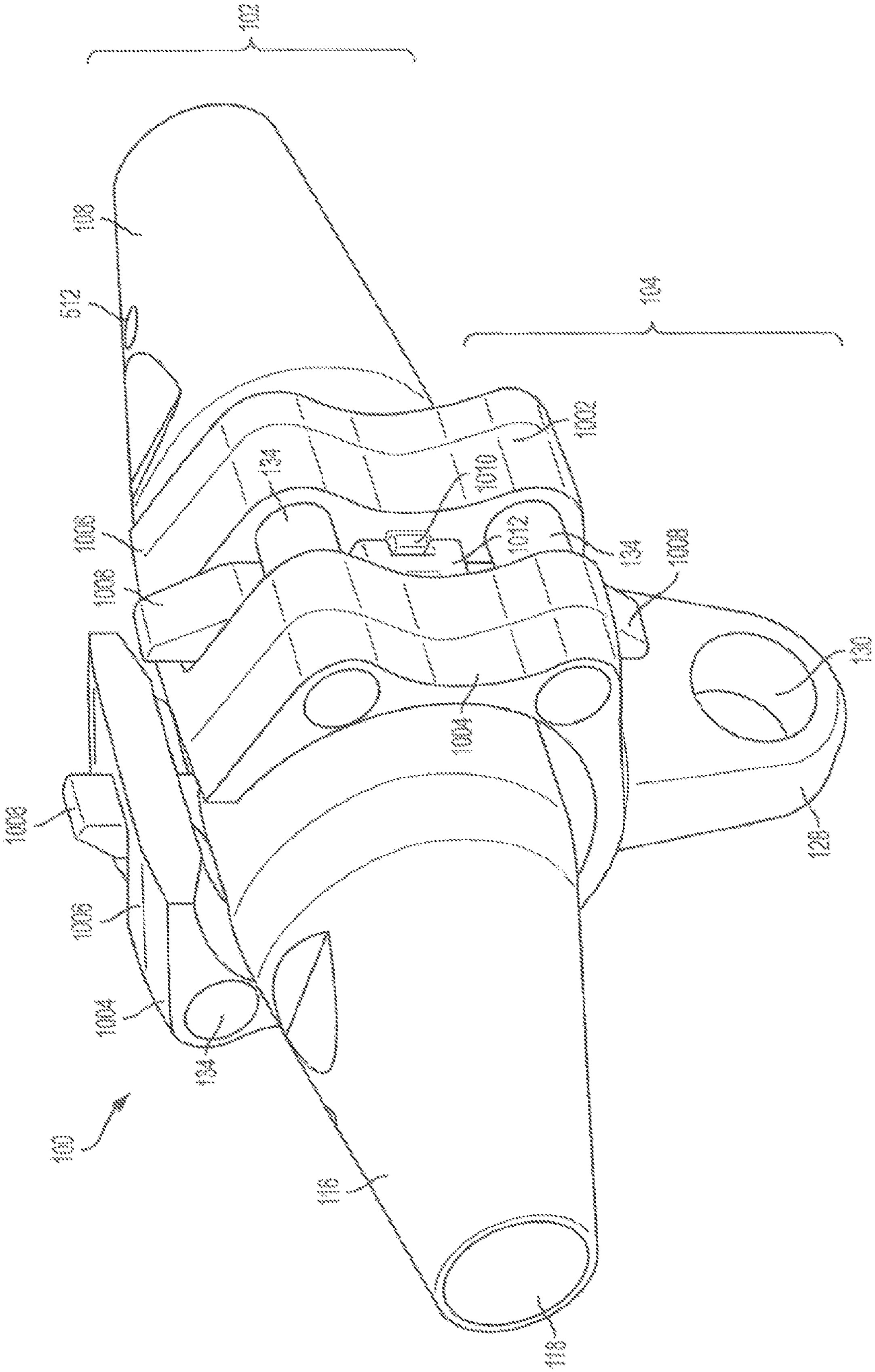

FIG. 10 depicts the system 100 including a spindle 102 and connector 104, in accordance with an implementation. The connector 104 can engage with the spindle 102 via clamps 1002 and 1004. The clamps 1002 and 1004 can hold onto the spindle 102. The clamps 1002 and 1004 can open and close. The clamps 1002 and 1004 can be disposed in an open state or a closed state. The clamps 1002 and 1004 can include two opposing clamps that come together to wrap at least partially around the spindle 102. Each clamp 1002 and 1004 can include one or more portions that wrap around the spindle 1092. For example, clamp 1002 can include two portions 1002 that form two fingers that are connected by the end portion 1006. The clamps 1002 and 1004 can include an end portion 1006. The system 100 can include a tumbler 1008 that lochs the clamps 1002 and 1004 in a closed state or closed position. The tumbler 1008 can be held in place by mechanical force devices 134. The tumbler 1008 can slide into place to lock the clamp 1004. The mechanical force device 134 can compress as the tumble 1008 is moved into position to lock the clamp 1008 in the closed position.

The tumbler 1008 can include a protrusion 1012 that contacts a locking mechanism 1010 of the clamp 1002 or 1004. The locking mechanism 1010 can contact the tumbler 1008 to lock the tumbler 1008 in a position to lock the clamp 1002 or clamp 1004 in the closed state.

Figure 11:
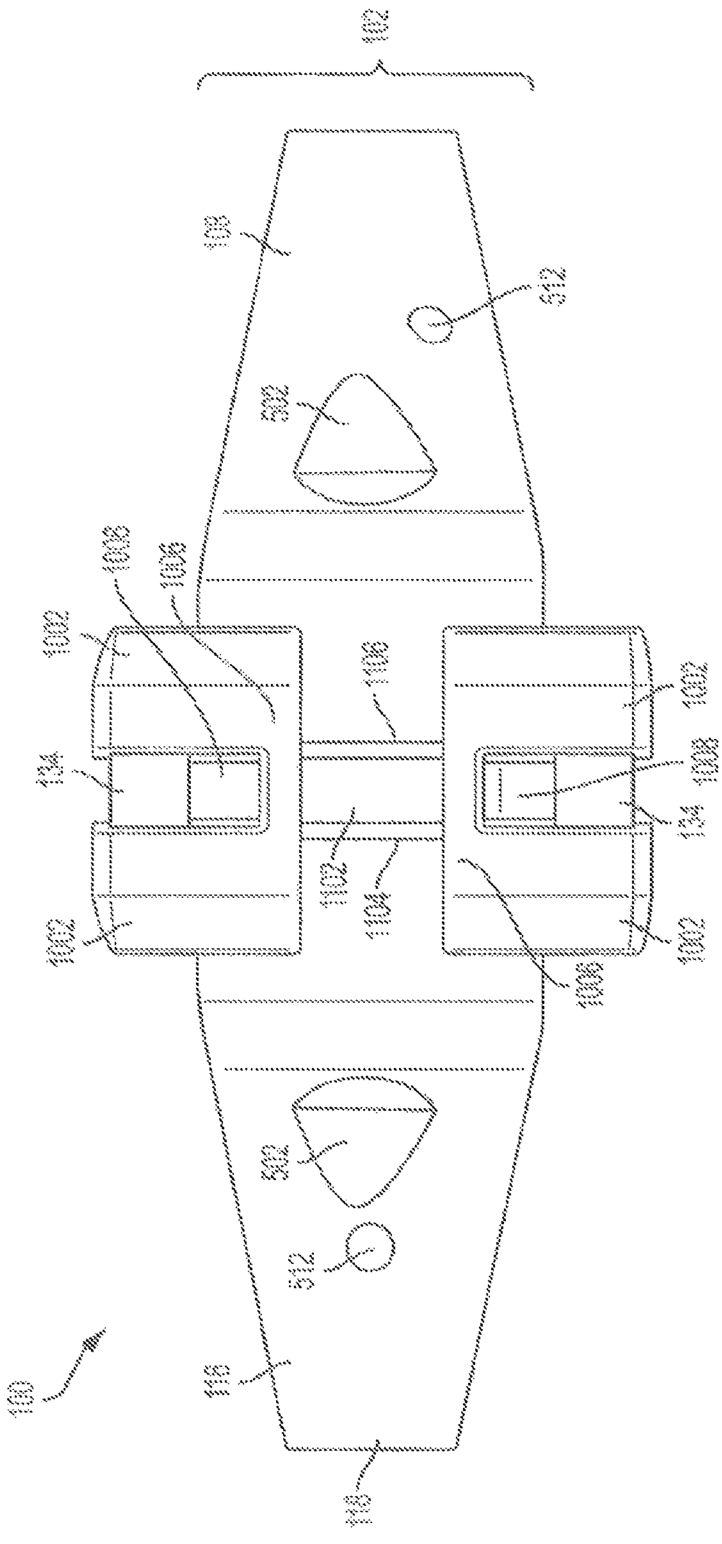

FIG. 11 depicts the system 100 including a spindle 102 and connector 104, in accordance with on implementation. FIG. 11 depicts atop perspective view of the clamps 1002 and 1004 wrapped around the spindle 102. The spindle 102 can include a groove or opening 1102 in which the tumbler 1008 can enter to engage the clamps 1004 and 1002 to the spindle 1002. The groove 1102 can be bordered by protrusions, walls, guides, or rails 1104 and 1106 that can facilitate locking, securing, or holding the tumbler, 1008 in the groove 1102.

Figure 12:
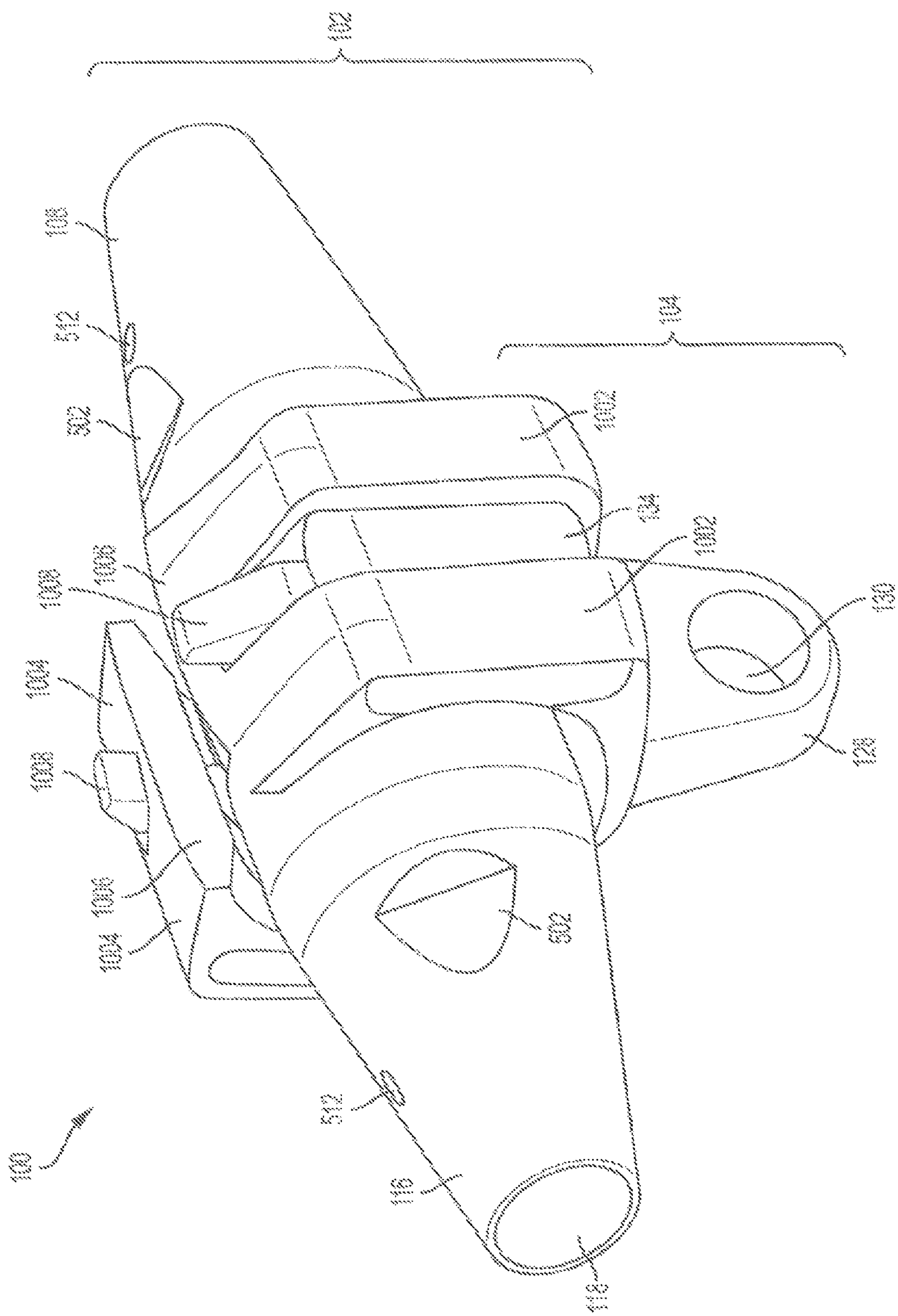

FIG. 12 depicts the system 100 including a spindle 102 and connector 104, in accordance with an implementation FIG. 12 depicts aside perspective view of the clamps 1002 and 1004 wrapped around the spindle 102. The mechanical force device 134 can include a rectangular piece of flexible material or foam that extends along a portion of the tumbler 1008. The mechanical force device 134 can be a square piece of foam or material.

Figure 13:
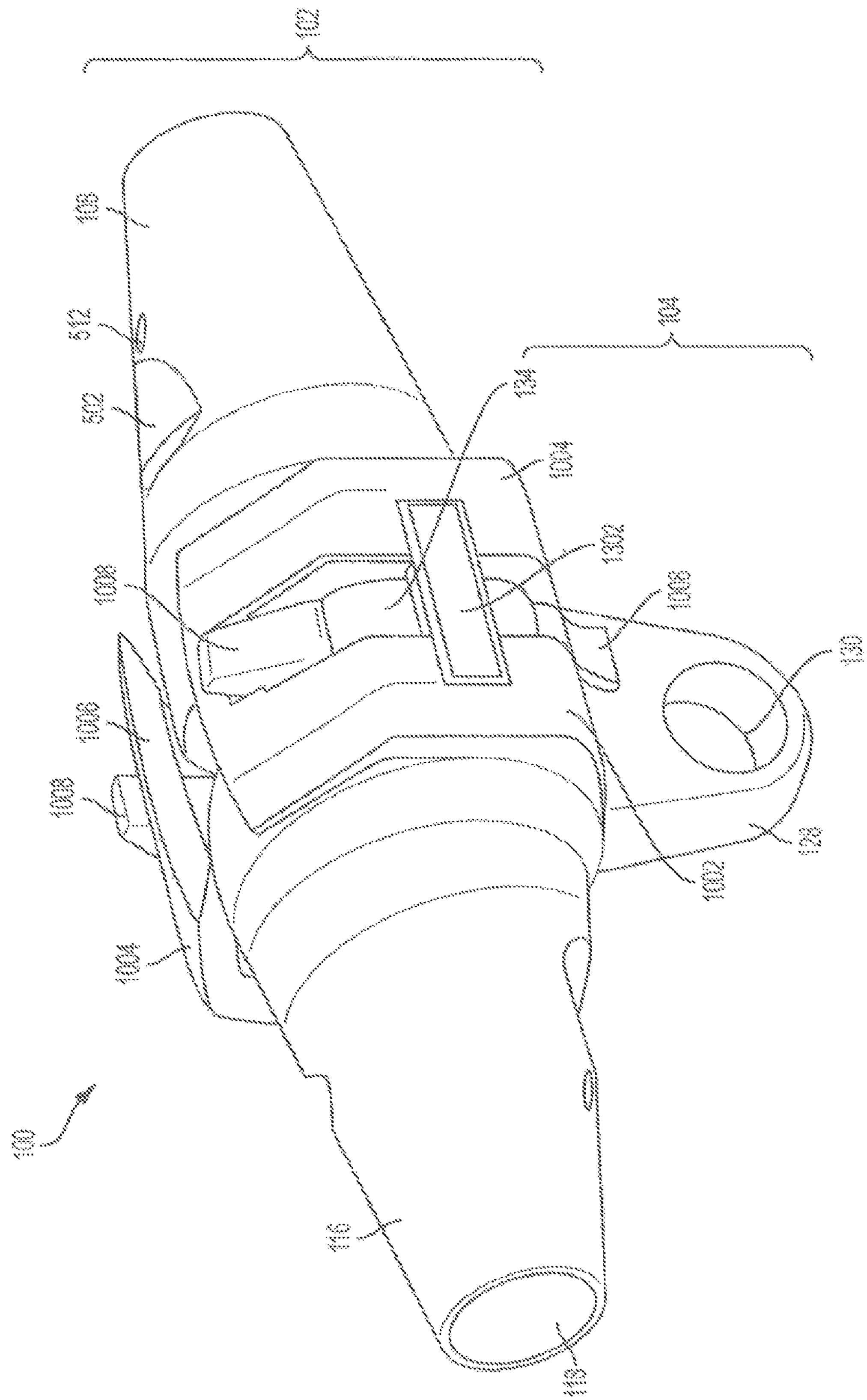

FIG. 13 depicts the system 100 including a spindle 102 and connector 104, in accordance with an implementation. FIG. 13 depicts a side perspective view of the clamps 1002 and 1004 wrapped around the spindle 102. The clamps 1002 and 1004 can include a bar 1302 that locks the mechanical force device 134 in place. The bar 1302 can be an elongated structure or material that is external to the clamps 1002 and 1004. The bar 1302 can be fixed or moveable. The bar 1302 can be referred to as a locking mechanism 1302. The locking mechanism 1302 can be removed to allow the mechanical force device 134 to release the tumbler 1008.

Figure 14:
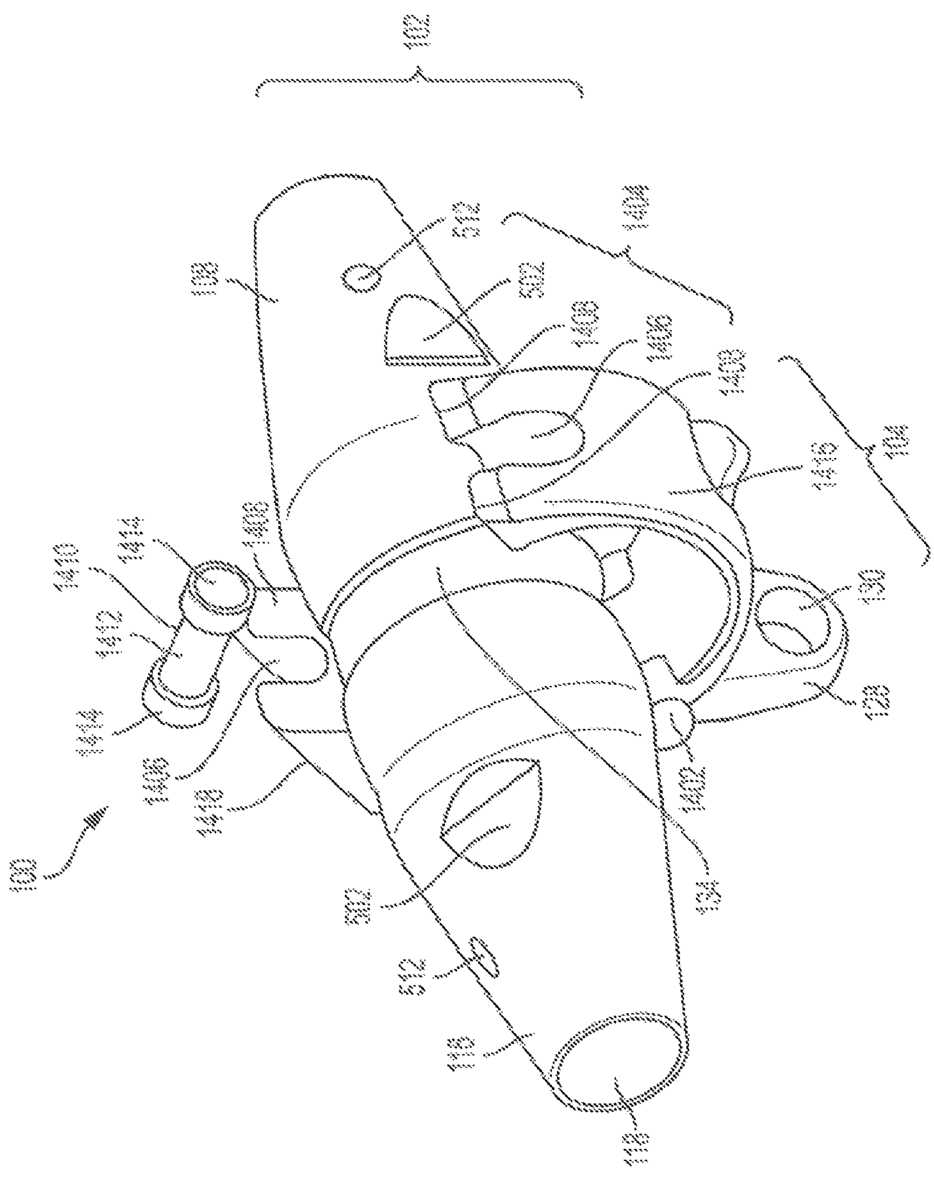

FIG. 14 depicts the system 100 including a spindle 102 and connector 104, in accordance with an implementation. The connector 104 can attach, connect or couple to the spindle 102 via a clamp 1404. The clamp 1404 can include a first clamp member 1416 and a second clamp member 1418 opposing the first clamp member 1416. The first clamp member 1416 and the second clamp member 1418 can be similar, symmetrical, the mirror one another, or different. The first member 1416 of the clamp can be coupled to the second member 1418 of the clamp 1404 via a pin 1402. The pin 1402 can form a pivot point about which the first member 1416 and the second 1418 cart pivot or rotate. The pin 1402 can be inserted into on opening of the first member 1416 and the second member 1416. The opening can be on a bottom side of the spindle 102. The bottom side of the spindle 102 can refer to the side adjacent to the connector 104.

The first clamp member 1416 can include a distal end having at least one protrusion 1408 separated by a cavity or opening 1406. A second pin 1410 (or locking mechanism 1410) can be inserted in the cavity 1406 to lock the first clamp member 1416 and the second clamp member 1418 of the clamp 1404 in a closed position to couple the clamp 1404 to the spindle 102. The pin 1410 can have cylindrical shape, rectangular shape, or polygonal shape. The pin 1410 can be elongated. The pin 1412 can be solid or have an internal opening formed by an internal wall.

The pin 1410 can include ends 1414, such as a first end 1414 and a second end 1414. A cross-section of the ends 1414 of the pin can have a diameter that is different than a diameter of a cross section of the pin 1410 at the middle portion 1412. The diameter of the ends 1414 can be greater than the diameter of the opening 1406 of the clamp members 1416 and 1418. The diameter of the ends 1414 can be greater than the diameter of the opening 1406 to lock the pin 1410 in a position to look the clamp 1404 in a closed state to couple the clamp 1404 to the spindle 102. The pin 1410 can be formed of one or more materials that can form the clamp 1404, spindle 102 or connector 104. The pin 1410 can be formed of rubber, plastic, metal, an alloy, or other material. A portion of the pin 1410 can be deformable such that the pin 1410 can be inserted into the opening 1406. While in the closed state, the clamp 1404 can be coupled to the spindle 102 via the pin 1410.

Figure 15:
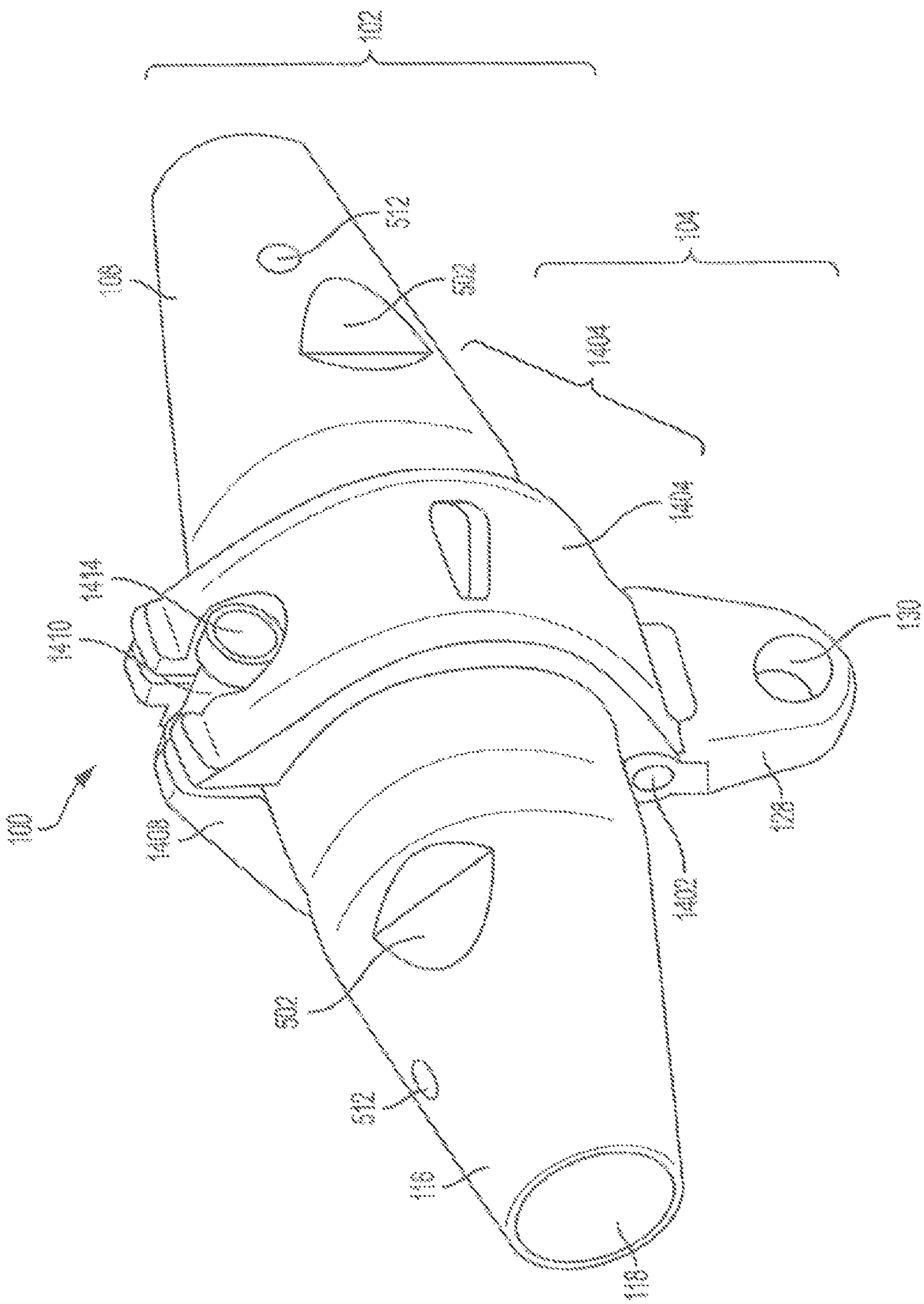
Figure 35:
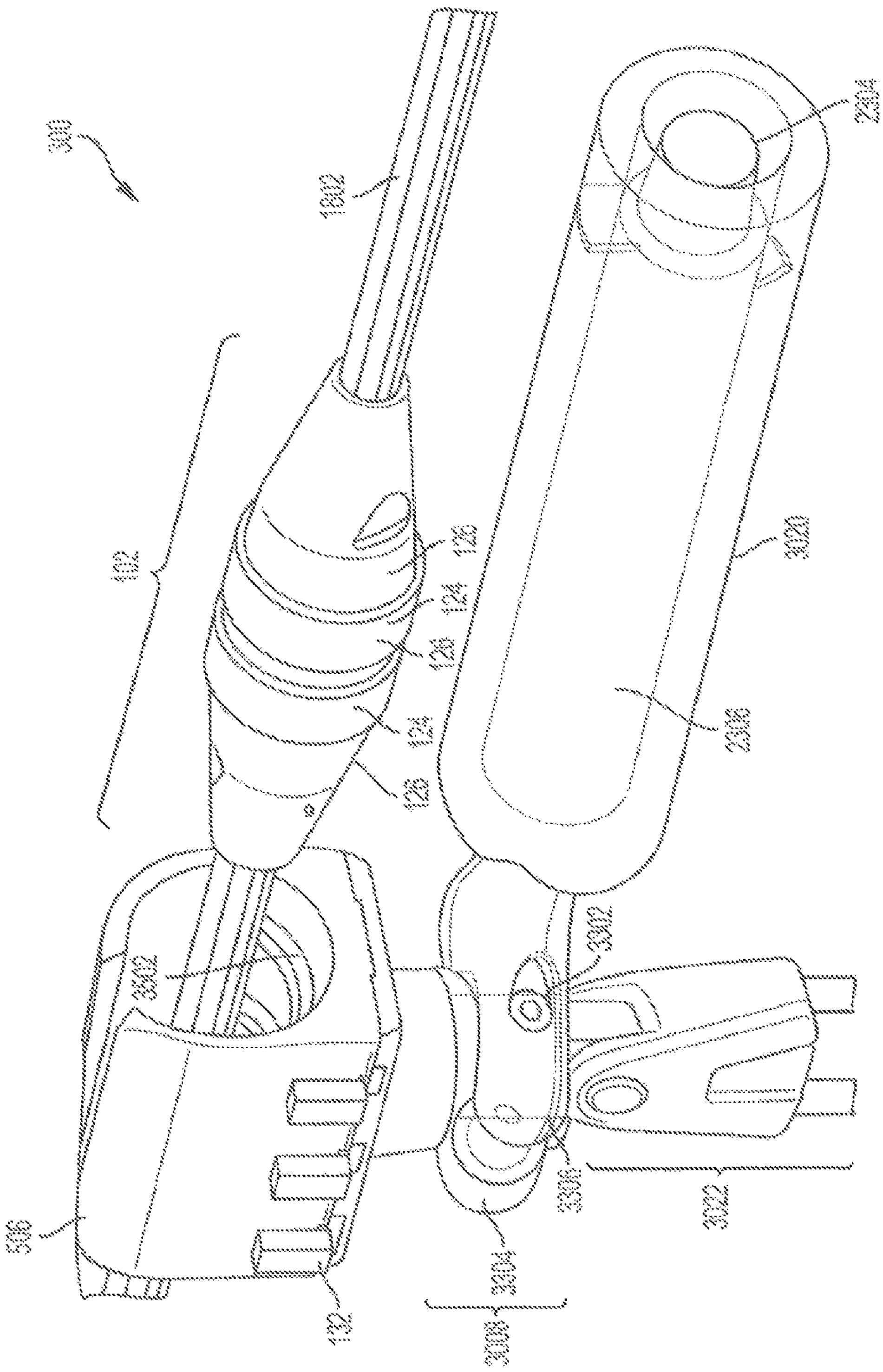

FIG. 15 depicts the system 100 including a spindle 102 and connector 104, in accordance with an implementation. FIG. 35 depicts the clump 1404 in a closed state or closed position. In the closed position, the first clamp member 1416 is coupled to the second clamp member 1418 via the pin 1410 that is inserted in the cavity 1406 at the distal ends of the first and second clamp member 1416 and 1418.

Figure 16:
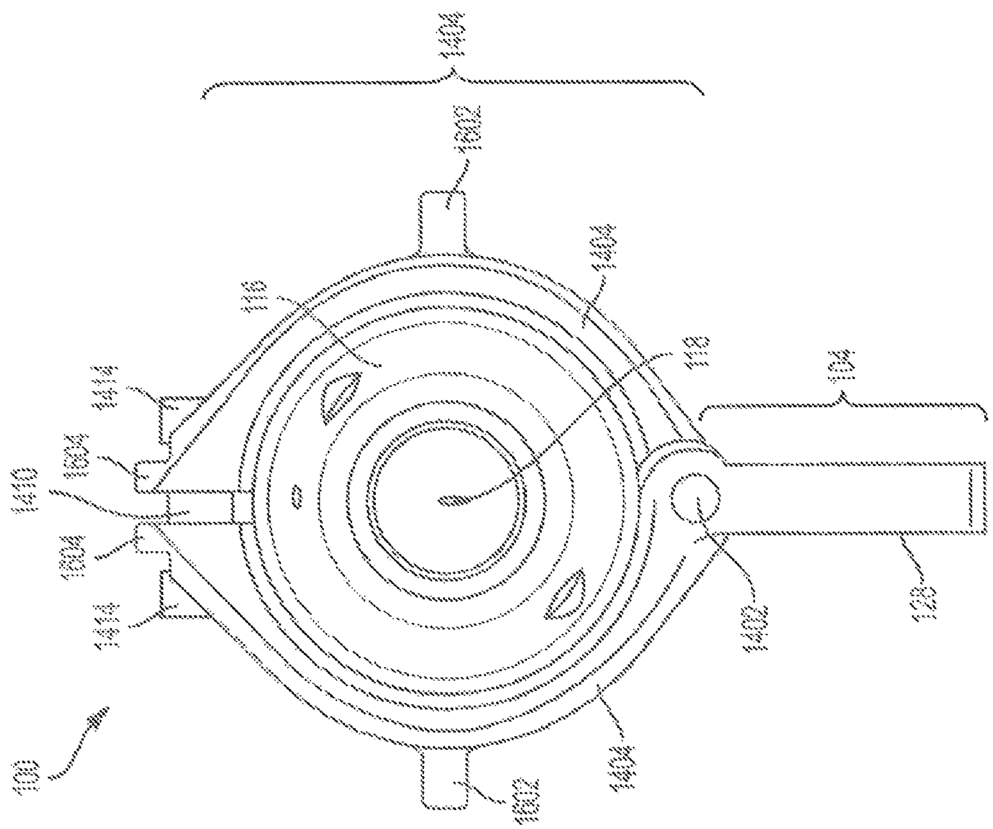

FIG. 16 depicts the system 100 including a spindle 102 and connector 104, in accordance with an implementation. FIG. 16 depicts the clamp 1404 in a closed state or closed position. The first and second members 1416 and 1418 of the clamp 1404 can include protrusions 1602. The first and second members 1416 and 1418 of the clamp 1404 can be rounded or include a rounded portion that facilitates coupling to the spindle 102. The clamp members 1416 and 1418 can have a shape based on the external shape of the spindle 102. For example, if the spindle 102 has a rectangular external shape, then the first and second members 1416 and 1418 can have a rectangular shape to facilitate coupling to the spindle 102. The clamp members 1416 and 1418 can include a protrusion 1416 at the distal end that facilitates locking the pin 1410 in the cavity 1406 (illustrated in FIG. 14) at the distal end of the clamp members 1416 and 1418.

Figure 17:
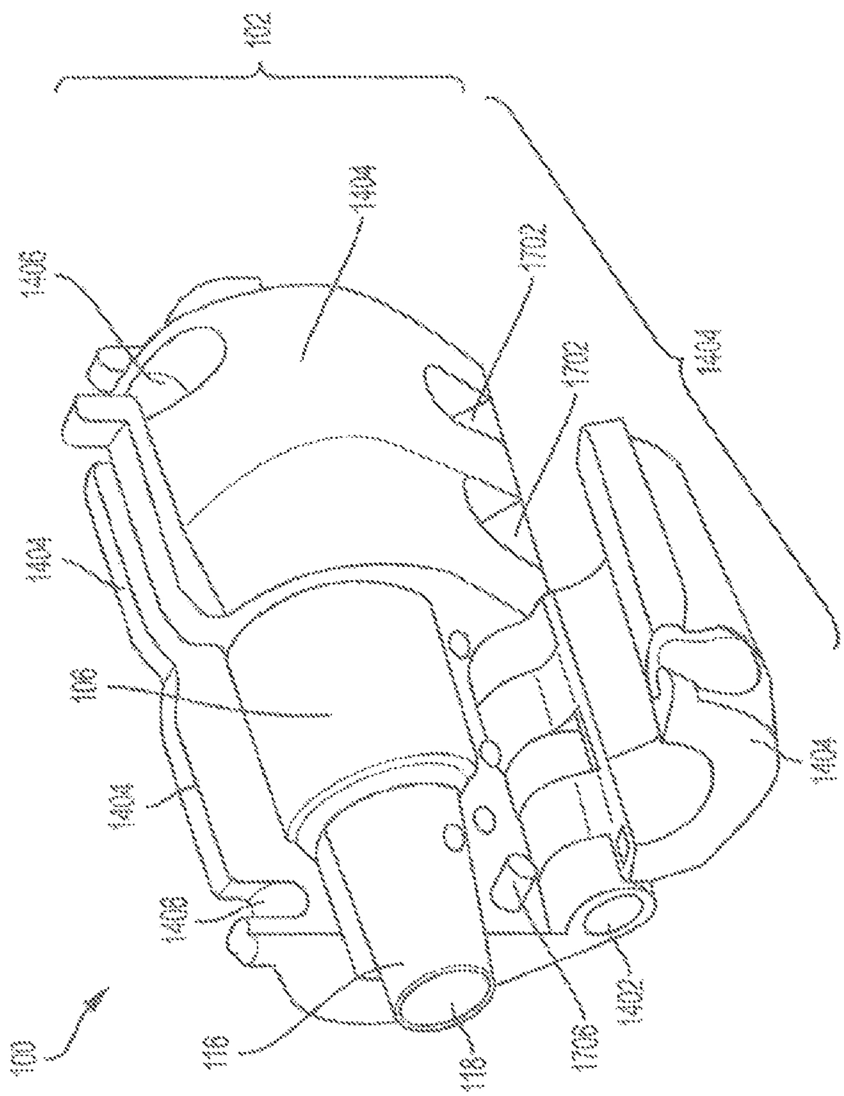

FIG. 17 depicts the system 100 including a spindle 102, in accordance with an implementation. As depicted in FIG. 17, the system car, include a clamp 1404 having two or more clamp members 1416 on aside of the clamp 1404, and two or more clamp members 1418 on an opposing side of the clamp 1404. The multiple clamp members 1416 and 1418 can include one or more component or functionality as depicted in FIGS. 14-16. Further, the clamp members depicted in FIG. 17 can include an opening 1702 in which a pin 1706 can be inserted. The pin 1706 and opening 1702 can facilitate locking the clamp 1404 and its multiple clamp members 1416 and 1418 in a locked position. The pin 1706 can include one at more material, shape or functionality as pin 1410. Thus, the clamp 1404 including multiple clamp members 1416 and 1418 on each side can form an elongated clamp 1404 that extends along a length of the spindle 102. This elongated clamp 1404 can provided greater or improved coupling to the spindle 102, while minimizing or reducing the amount the clamp 1404 or connector 104 moves relative to the spindle 102.

Figure 18:
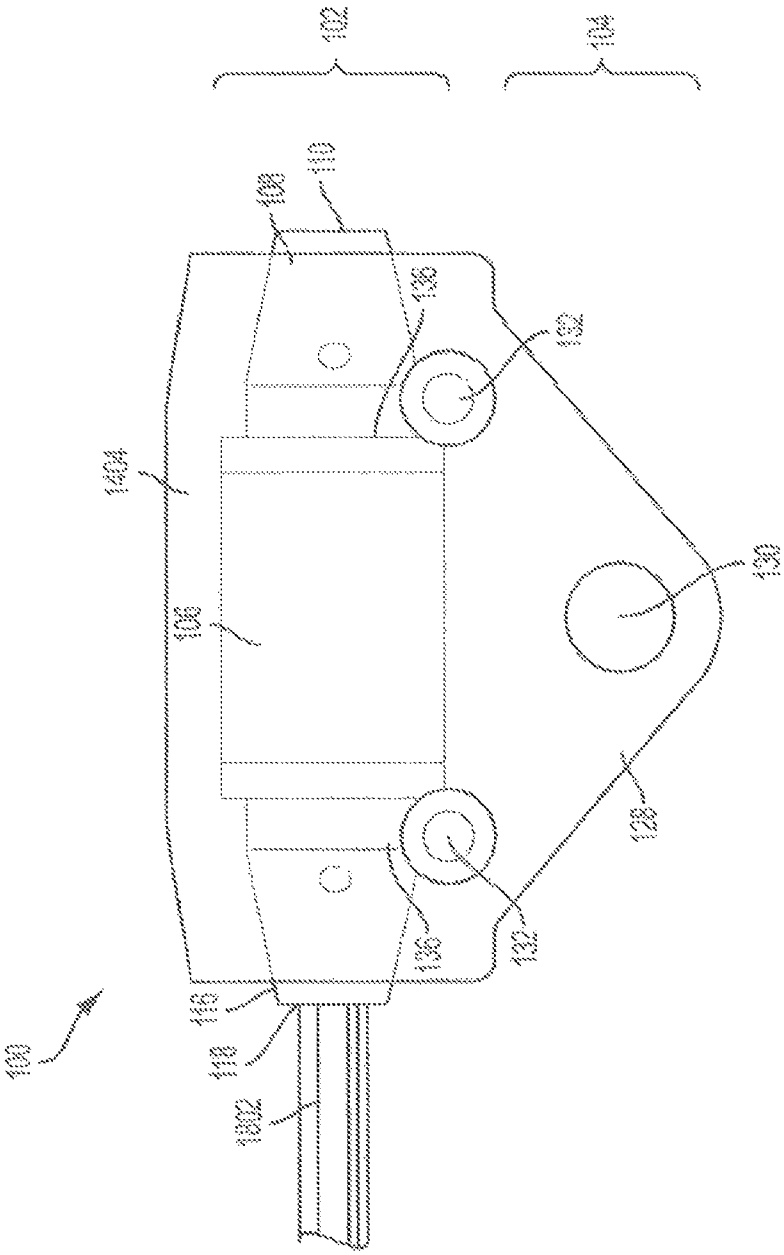
Figure 19:
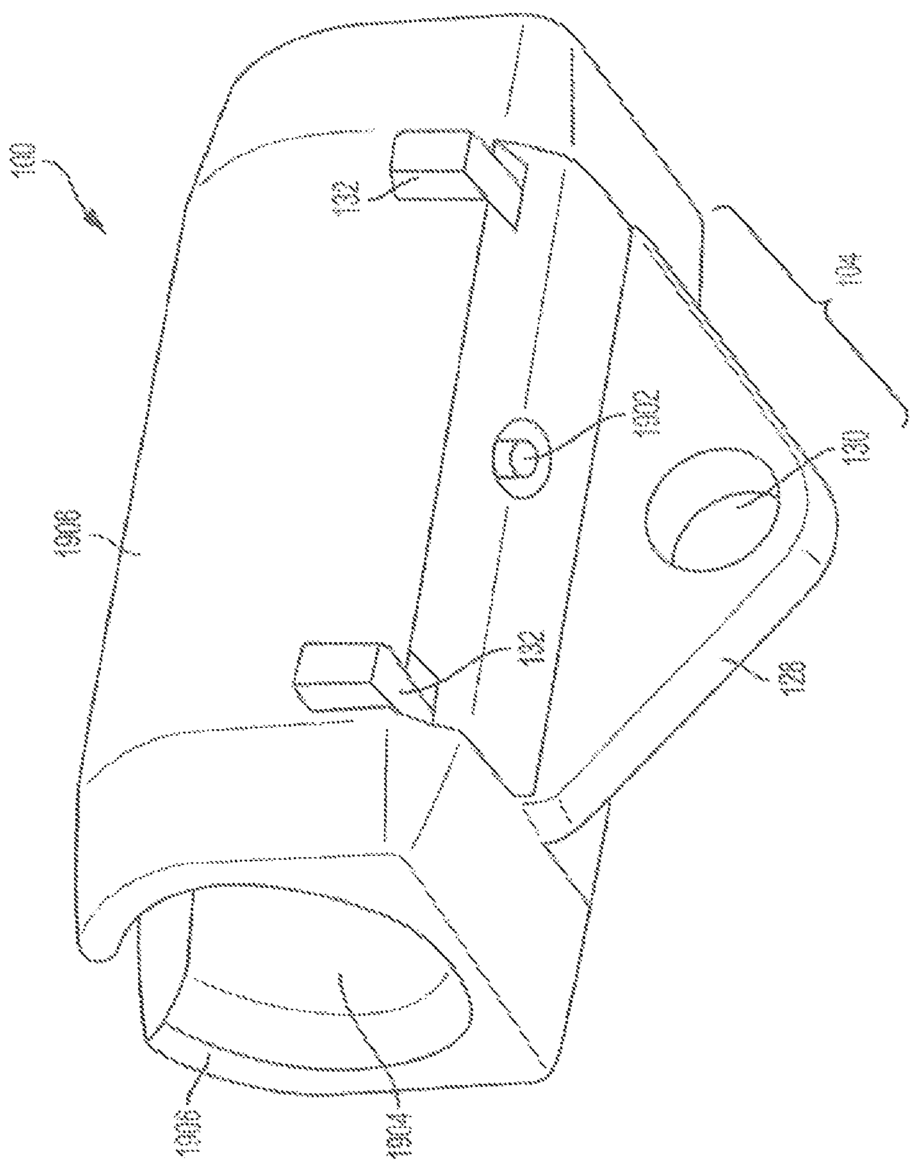

FIG. 18 depicts the system 100 including a spindle 102, in accordance with an implementation. The system 100 can include the elongated clamp 1404 depicted in FIG. 17 in a closed state or position. The system 30 can further include a deployment cable 1802 inserted in the opening 118 of the spindle 102. The deployment cable 1802 can extend through the opening 118 of the spindle 118, as well as through the opening 110 on the opposing end of the spindle 102.

FIG. 18 depicts the system 100 including a spindle 102, in accordance with an implementation. The system 100 can include an elongated sleeve 1906. The elongated sleeve 1906 can include a shape based on the shape of the spindle 102. For example, the internal wall 1904 can have a shape that can be formed to couple the spindle 102 so the sleeve 1906 can wrap around the spindle 102. The sleeve 1906 can slide over the spindle 102. The sleeve 1906 can include tumblers 132 that facilitate coupling the sleeve 1906 to be spindle 102 to minimize movement of the sleeve 1906 relative to the spindle 102. The temblors 132 can automatically engage the spindle 102 when the sleeve 1906 is positioned over or around the spindle 102. The connector 104 can be coupled to the sleeve 1906 via a fastener 1902. The fastener 1902 can include a screw, nut, bolt, adhesive, welding, spot welded joint, pin, or other coupling mechanism.

Figure 20:
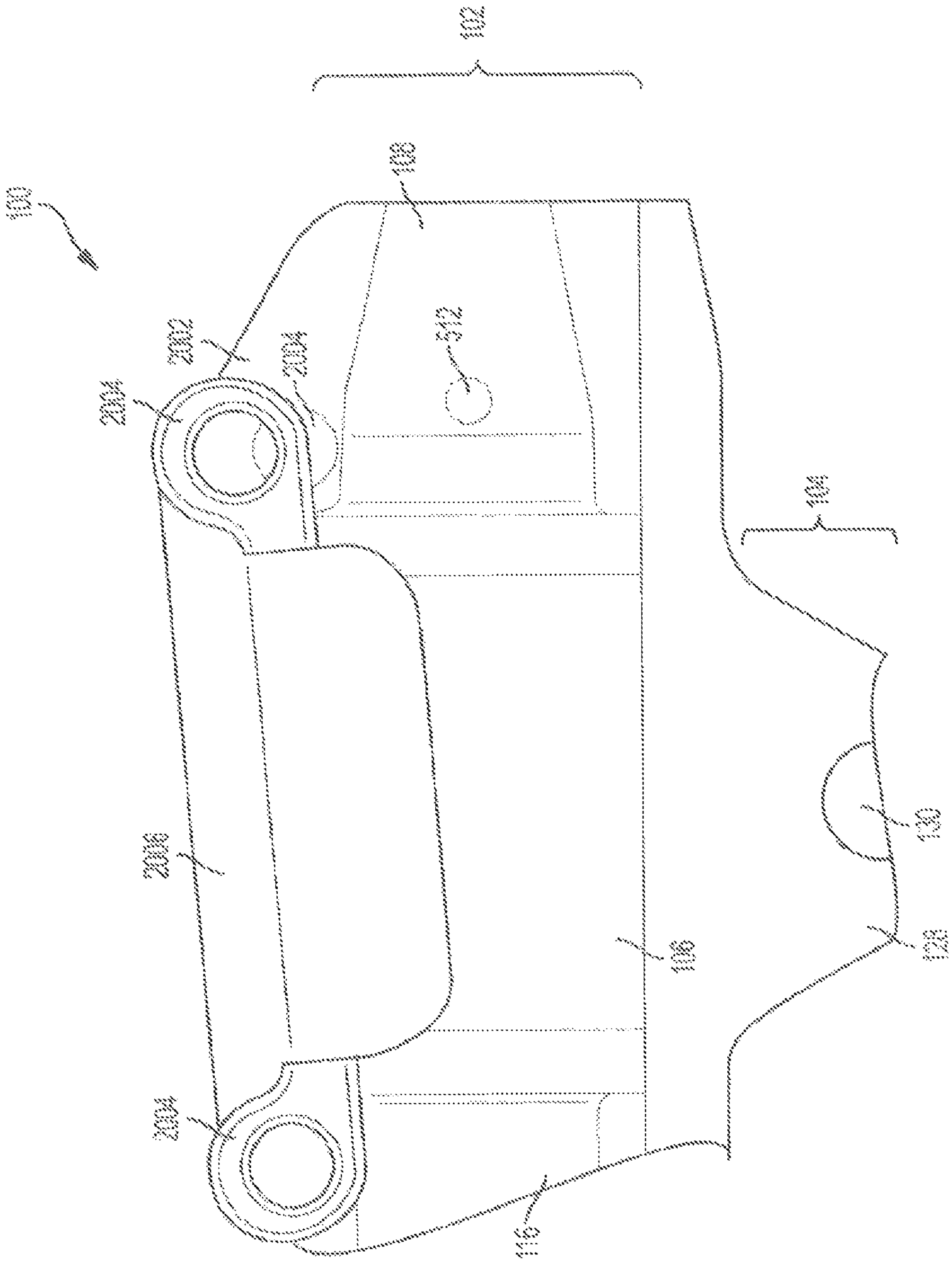

FIG. 20 depicts the system 100 including a spindle 102, in accordance with an implementation. The system 100 includes a sleeve 2002 and a sleeve cover 2006 having openings 2004 on ends of the sleeve cover 2006. The sleeve 2002 can wrap around a bottom portion of the spindle 102 and the sleeve cover 2006 can wrap around a top portion of the spindle 102. The sleeve 2002 and the sleeve cover 2006 can have complementary openings 2004 to allow a locking mechanism, such as a pin, to be inserted through openings 2004 of both the cover 2006 and the sleeve 2002. The locking mechanism can couple the sleeve cover 2006 to the sleeve 2002, as well as couple the sleeve cover 2006 and the sleeve 2002 to the spindle 102. The connector 104 can be coupled to the sleeve 2002, and indirectly coupled to the spindle 102 via the sleeve cover 2006 and the above 2002 assembly.

Figure 21:
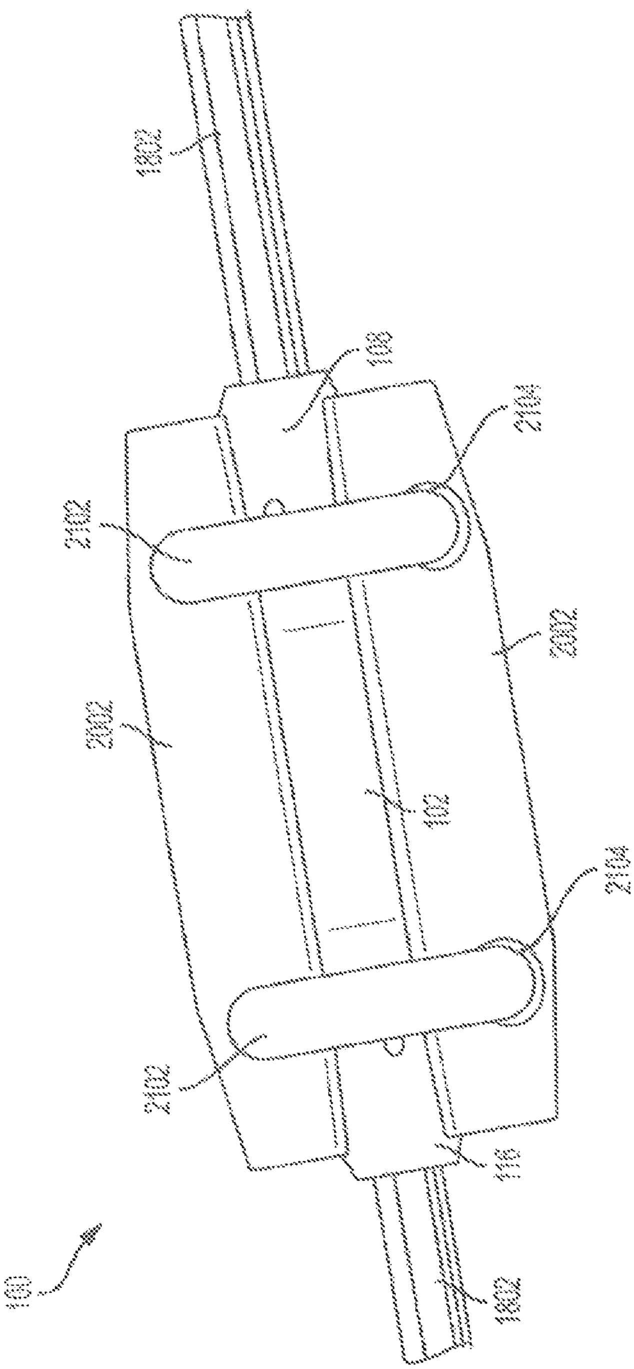

FIG. 21 depicts the system 100 including a spindle 102, in accordance with an implementation. The sleeve 2002 can include openings 2104 through which a coupling mechanism 2102, such as loops 2102, can be inserted to couple the sleeve 2002 to the spindle 102. The loops 2102 can go through the spindle 102, or extend above the spindle 102. The loops 2102 can be circular, rounded, cylindrical, or rectangular. The loops 2102 can be deformable or rigid.

Figure 22:
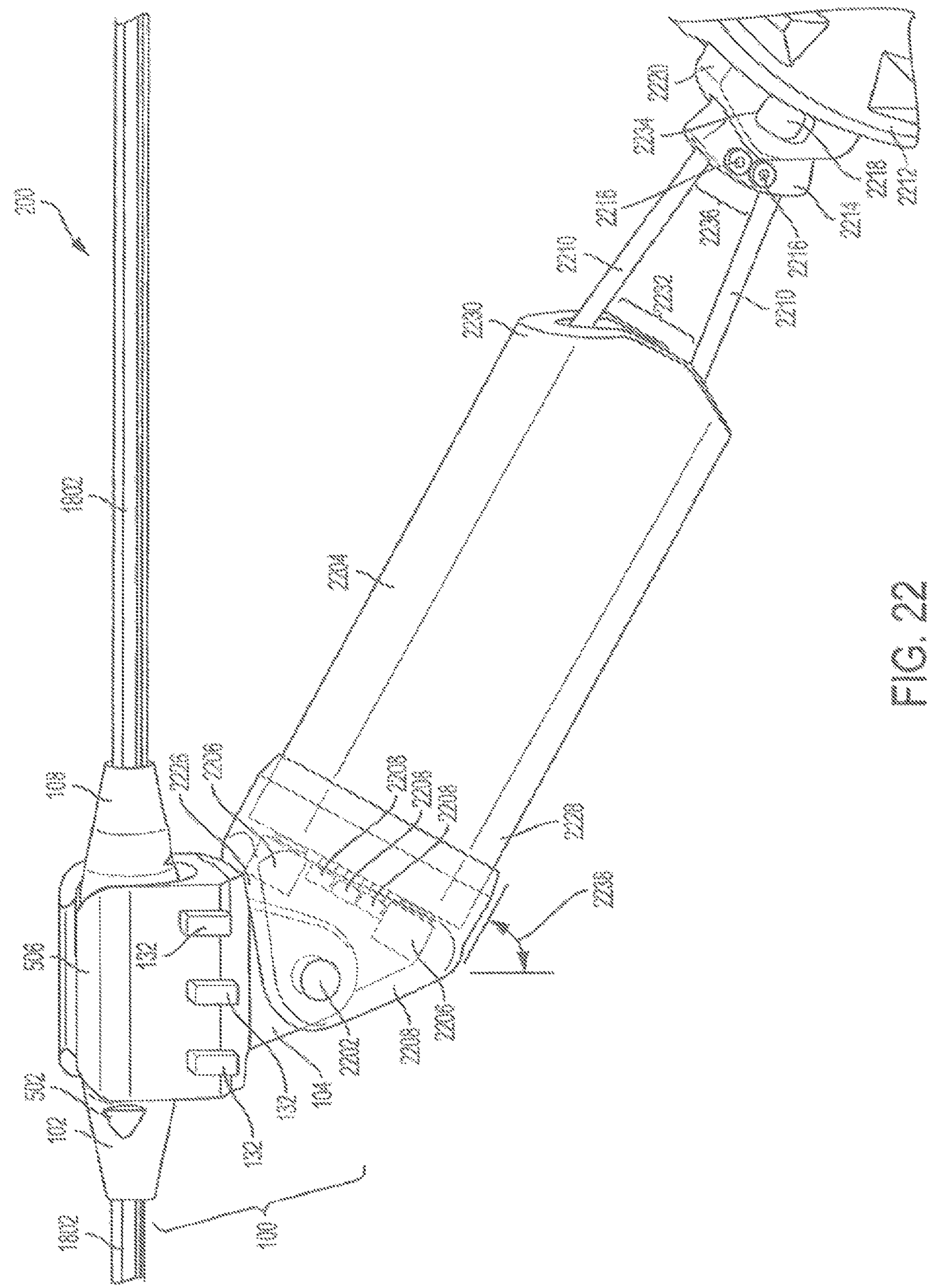
FIGS. 22-26 depict a tether used to deploy seismic data acquisition units from a marine vessel, in accordance with some implementations.

FIG. 22 depicts a system to mount a seismic data acquisition unit for deployment from a marine vessel, in accordance with an implementation. The system 200 can include a housing 2204. The housing 2204 can refer to or include a tether 2204 (e.g., tether 3022 depicted in FIG. 30), tether case 2204, tether housing 2204, transponder case 2204 or transponder housing 2204. The housing 2204 can be coupled to the deployment cable 1802 via system 100 or connection assembly 109. The housing 2204 can refer to include a tether 2204. The tether 2204 can refer to or include exactly one or more than one cable 2210 that couples or connects the connector 104 to the connection block 2214. The tether 2204 can refer to a tether case 2204 that covers or at least partially covers the cables 2210. The tether 2204 can include an internal component in which a transponder 2306 can be at least partially disposed.

The system 200 can include a spindle 102. A deployment table 1802 can extend through the spindle 102. The system 200 can include a connector 104 coupled to the spindle 102. The connector 104 can couple to the spindle 102 via a sleeve 506. The connector 104 can include the sleeve 506. The sleeve 506 and connector 104 can be coupled to the spindle 102 via tumblers 132. The tumblers 132 can be disposed within the connector 104 or sleeve 506. The tumblers 132 can be disposed in a position to extend from the connector 104 or sleeve 506 to contact the spindle 102 such that the connector 104 and sleeve 506 are engaged to the spindle 102.

The connector 104 can include an end region 128 having an opening 130, as illustrated in FIG. 1. The housing 2204 or tether 2204 can couple, attach, connect or otherwise fasten to the connector 104. For example, the tether 2204 can include a first end 2228. The first end 2228 can be adjacent to the connector 104. The first end 2228 can be opposite the second end 2230, which can be adjacent or proximate to the seismic data acquisition unit 2212. A cap 2208 can be disposed, positioned, coupled or integrated with the first end 2228 of the tether 2204. In some cases, the cap 2208 can be an integral part of the tether 2204, and can be referred to as an end region 2208 of the tether 2204. The end region 2208 can be a part of the tether 2204. In some cases, the end region 2208 can be a separate component that is coupled to the tether 2204. The end region 2208 can be a cap that is positioned on the tether 2204. The end region 2208 can be coupled to the tether 2204 by a coupling mechanism, such as screws, nuts, bolts, welding, adhesives, latches, pins, or other fastener. For example, one or more screws or other fasteners 2224 can couple the end region 2208 or cap 2208 to the tether 2204.

The tether 2204 can be coupled, connected, or attached to the connector 104. The tether 2204 can be coupled to the connector 104 such that the tether 2204 can pivot about an axis. For example, the end region 2208 or cap 2208 can include an opening 2222. The opening 2222 can be configured to align with the opening 130 on the connector 104. The opening 2222 can be the same size or a different size than the opening 130 on the connector 104. The opening 130 can have a diameter that is greater than or less than a diameter of the opening of the cap 2205. A pin 2202 can be instated into the opening 2222 of the cap 2208 and the opening 130 of the connector 104. The pin 2202 can define a pivot point about which the tether pivots. The pin 2202 can have a coefficient of friction that allows the tether 2208 to pivot. The pin 2202 can provide resistance to control the degree to which the tether 2208 pivots.

The end region 2208 or cap 2208 can include a stopper 2226 to establish a maximum pivot angle 2238 of the tether 2208 about the pivot point defined by the pin 2202. The maximum pivot angle 2238 can be determined relative to rest position or initial state, illustrated in FIG. 24, in which the tether 2204 is perpendicular to a longitudinal axis of the spindle 102 that is parallel to the deployment cable 1802. The maximum pivot angle 2238 can be determined relative to an axis extending along a length of the tether 2204 when the tether 2204 is in a rest or initial state. The maximum pivot angle 2238 can be, for example, 20 degrees, 25 degrees, 30 degrees, 40 degrees, 50 degrees, 60 degrees, 65 degrees, 70 degrees, 75 degrees, or 80 degrees.

The stopper 2226 can be a separate component or integrated as part of the cap 2208. The stopper 2226 can be a mechanical component. The stopper 2226 can be formed of the same material as the cap 2208, or a different material. The stopper 2226 can include a deformable material. The stopper 2226 can include an elastic material that can absorb force. For example, the stopper 2226 can slightly deform when the stopper 2226 contacts a portion of the connector 104 or the sleeve 506. The stopper 2226 can deform responsive to the impulse force resulting from the tether 2204 pivoting about the pivot point at the pin 2202. The stopper 2226 can absorb the impulse force generated from the stopper 2226 contacting the connector 140 or sleeve 506 by deforming or compressing. The stopper 2226 can dissipate the absorbed force. For example, the stopper 2226 can include a shock absorbing material or shock absorbing polymer, such as visco-elastic polymers or visco polymers. Shock absorbing materials can include, for example, rubber, neoprene, or silicone. The stopper 2226 can be formed of or include a shook absorbing material designed and constructed absorb the impulse force in a range of temperatures (e.g., 32 degrees Fahrenheit to 120 degrees Fahrenheit).

The tether 2204 can include an internal compartment. The tether 2204 can include an enclosure. Within the internal compartment of the tether 2204, the system 200 can include a cable 2210 or rope 2210 that traverse a length of the tether 2204. The cable 2210 can be coupled, attached, connected or otherwise fastened to a portion of the tether 2204. The cable 2210 can be coupled at an end of the tether 2204 adjacent or proximate to the connector 104 or cap 2208. The cable 2210 can be screwed to the cap 2208 or a portion of the end 2208 of the tether via screws or coupling mechanisms 2206. The coupling mechanisms 2206 can include threads that screw into the cap 2208 or an end portion 2208 of the tether. The coupling mechanisms 2206 can include any type of coupling mechanism to couple the cable 2210 to the end 2208 of the tether, such as an adhesive, protrusion, hook, magnet, or other fastener.

The cable 2210 can be rigid or flexible. The cable 2210 can be a solid material. The cable 2210 can be elastic. The cable 2210 can include a rope. The cable 2210 can include one or more materials, such as fibers, polymers, metals, alloys, wood, plastics, or ceramics. The cable 2210 can include a non-rigid, flexible rope to reduce the transfer of vibration from the spindle 102 to the connection block 2214. For example, the transfer of vibration can be reduced by 10%, 15%, 20%, 25%, 30%, 40%, 50%, 60% or more.

The cable 2210 can include two portions of the cable 2210 that extend from a second 2230 of the tether 2204. The two portions 2210 can form a single cable 2210, or be two separate cables 2210 that are not directly joined together. For example, a first portion of the cable 2210 can be a first cable, and the second portion of the cable 2210 can be a second cable. The two portions of the cable 2210 (or the two cables 2210) can be separated from one another at the second end 2230 by a first distance 2232. The first distance 2232 can range, for example, from 1 inch to 18 inches.

The one or more cables 2210 can extend toward a connection block 2214. The connection block 2214 can include a cavity or opening that receives the one or more cables 2210. The connection block 2214 can secure the one or more cables 2210. The one or more cables 2210 can be coupled, attached, locked, or otherwise fastened or held in the connection block 2214. The cable 2210 can be snapped into the connection block 2214, welded into the connection block 2214, screwed into the connection block 2214, or otherwise connected to the connection block 2214. The two portions of the cable 2210 or the two cables 2210 can be separated by a second distance 2236 when then contact the connection block 2214. The second distance 2236 can be the same or different from the first distance 2232. The second distance 2236 can range, for example, from 0.5 inch to 16 inches. In some cases, the second distance is less than the first distance.

The connection block 2214 can include a protrusion 2218 to engage the seismic data acquisition unit 2212. The protrusion 2218 can enter a tether receiver 2220 on the seismic data acquisition unit 2212. The tether receiver 2220 can be a receptacle for the connection block 2214. The tether receiver 2220 can include an opening 2234 that receives the protrusions 2218 and couples the connection block 2214 to the seismic data acquisition unit 2220. The opening 2234 of the tether receiver 2220 can be any shape or dimension operational to receive and hold the protrusion 2218 of the connection block 2214. For example, the opening 2234 can be rectangular, square shaped, triangular, circular, elliptical, polygonal or a combination thereof.

In some cases, the connection block 2214 can include a mechanical force device in contact with the protrusion 2218 of the connection block 2214 to engage the tether receiver 2220 of the seismic data acquisition unit 2212 to indirectly couple the seismic data acquisition unit 2212 to the spindle 102. The seismic data acquisition unit 2212 can be coupled to the deployment cable 1802 via the tether receiver 2220, connection block 2214, cable 2210, tether 2204, tether cap 2208, pin 2202, connector 104, sleeve 506, tumblers 132, and spindle 102.

Figure 23:
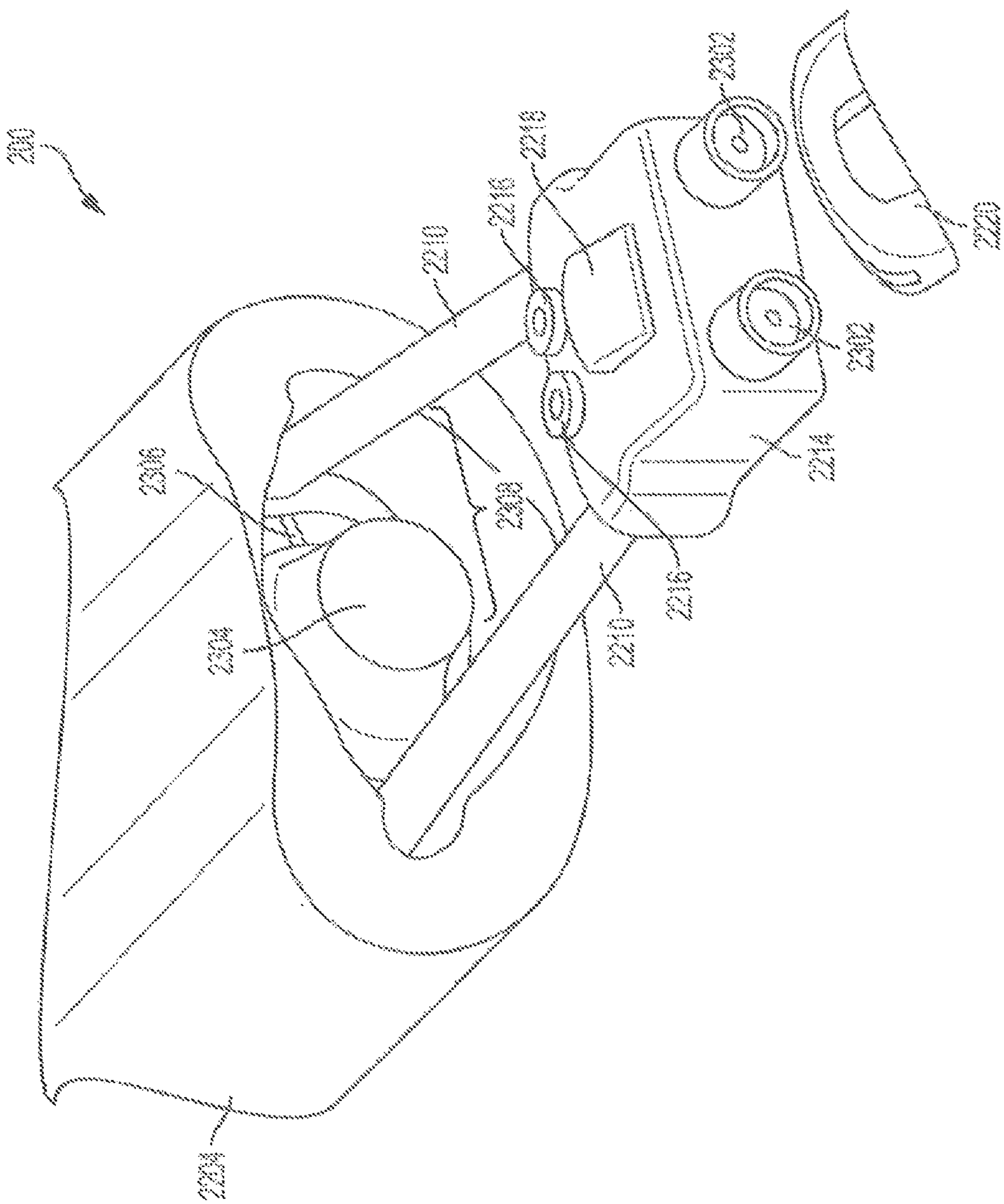

FIG. 23 depicts a system to mount a seismic data acquisition unit for deployment from a marine vessel, in accordance with an implementation. The system 200 can include the tether 2204, connection block 2214, and cables 2210. The tether 2204 can include an internal compartment 2308. The tether 2204 can form an enclosure sealing, or partially searing, the internal compartment 2308. The tether 2204 can form an enclosure. The enclosure can be a partial enclosure. The enclosure can seal off one or more internal portions or compartments of the tether. A stopper 2304 can be placed in the opening of the internal compartment 2308 formed by the tether 2204 to enclose or close the internal compartment 2308 of the tether 2204.

The system 200 can include a transponder 2306. The transponder 2306 can be placed at least partially within the internal compartment 2308 of the tether 2204. The transponder 2306 can be fully placed within the internal compartment 2308 of the tether 2204. The transponder 2306 can be secured or affixed within the internal compartment 2308 of the tether 2204. For example, the transponder 2306 can include a threaded ring to secure the transponder within the internal compartment 2306 of the tether 2204.

The transponder 2306 can be an acoustic transponder. The transponder 2306 can include an acoustic beacon. The transponder 2306 can include an acoustic pinger. The transponder 2306 can transmit acoustic waves or pulses. The acoustic waves or pulses can be encoded with information. The transponder 2306 can transmit acoustic waves, pulses, or signals that indicate the location of the transponder 2306. The location of the transponder 2306 can further indicate the location of the tether 2204 since the transponder 2306 can be positioned within an internal compartment 2308 of the tether 2204. The acoustic transponder 2306 can transmit acoustic signals at different frequencies to facilitate indicating a location of the transponder 2306. In some cases, the transponder 2306 can transmit an acoustic wave responsive to receiving an acoustic signal from a transducer.

The transponder 2306 can transmit acoustic signals, waves or pulses at a set frequency, different frequencies, or a range of frequencies. The transponder can encode information in the acoustic signals, such as location information or status information. The transponder 2306 can transmit a status of the transponder 2306. The status of the transponder 2306 can include, for example, mode of operation of the transponder (e.g., on, off, ping, ping interval, ping frequency, or location mode), whether the transponder 2306 is operational, results of a self-diagnostic process (e.g., all clear or errors found), battery usage, remaining battery percentage, remaining operational duration based on current rate of energy consumption and remaining battery percentage, or the amount of time the transponder has been on.

The connection block 2214 can include footings 2302 that facilitate coupling the connection block 2214 to the tether receiver 2220 illustrated in FIG. 22. The footings 2302 can contact a portion of the tether receiver 2220. Responsive to contacting the tether receiver 2220, the footings 2302 can receive a force from the contact, and exert a force on the protrusion 2218 to extend the protrusion 2218 to facilitate extending the protrusion 2218 through the opening 2234 of the tether receiver 2220 illustrated in FIG. 22.

Figure 24:
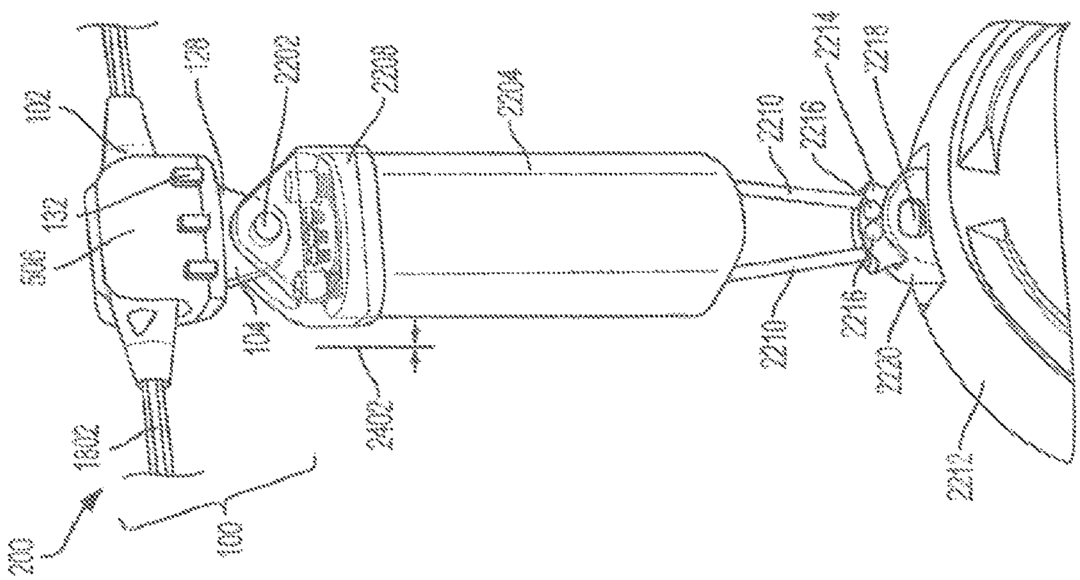

FIG. 24 depicts a system to mount a seismic data acquisition unit for deployment from a marine vessel, in accordance with an implementation. The system 200 can include one or more component of system 300. For example, the system 200 can include a spindle 102, a connector 104, a sleeve 506 and tumblers 132. The tether 2204 can include a tether cap 2208 which can couple to the connector 104. The tether cap 2208 can be coupled to the tether 2204 via welding, adhesive, screws, nuts, bolts, hooks, latches, magnets, or other mechanical coupling devices. In some cases, the tether cap 2208 can be formed as part of the tether 2204. The tether cap 2208 can be coupled to the connector 104 via a mechanical coupling technique that allows the tether 2204 to pivot about a pivot point. For example, the tether cap 2208 can be coupled to the connector 104 via a pin 2202 that forms or defines a pivot point about which the tether 2204 can pivot. As illustrated in FIG. 24, the tether 2204 can be in a rest state or initial position in which the tether 2204 extends perpendicularly or orthogonal to the spindle 102 and deployment cable 1802. When the tether 2204 is in the rest style or initial state, the angle 2402 can be relatively small compared to the maximum pivot angle 2238. The angle 2402 during the rest state can be less than the maximum pivot angle 2238. For example, this angle 2402 can be 0 degrees, 1 degree, 2 degrees, 3, degrees, 5 degrees, 7 degrees, 10 degrees, 15 degrees, or 20 degrees.

Figure 25:
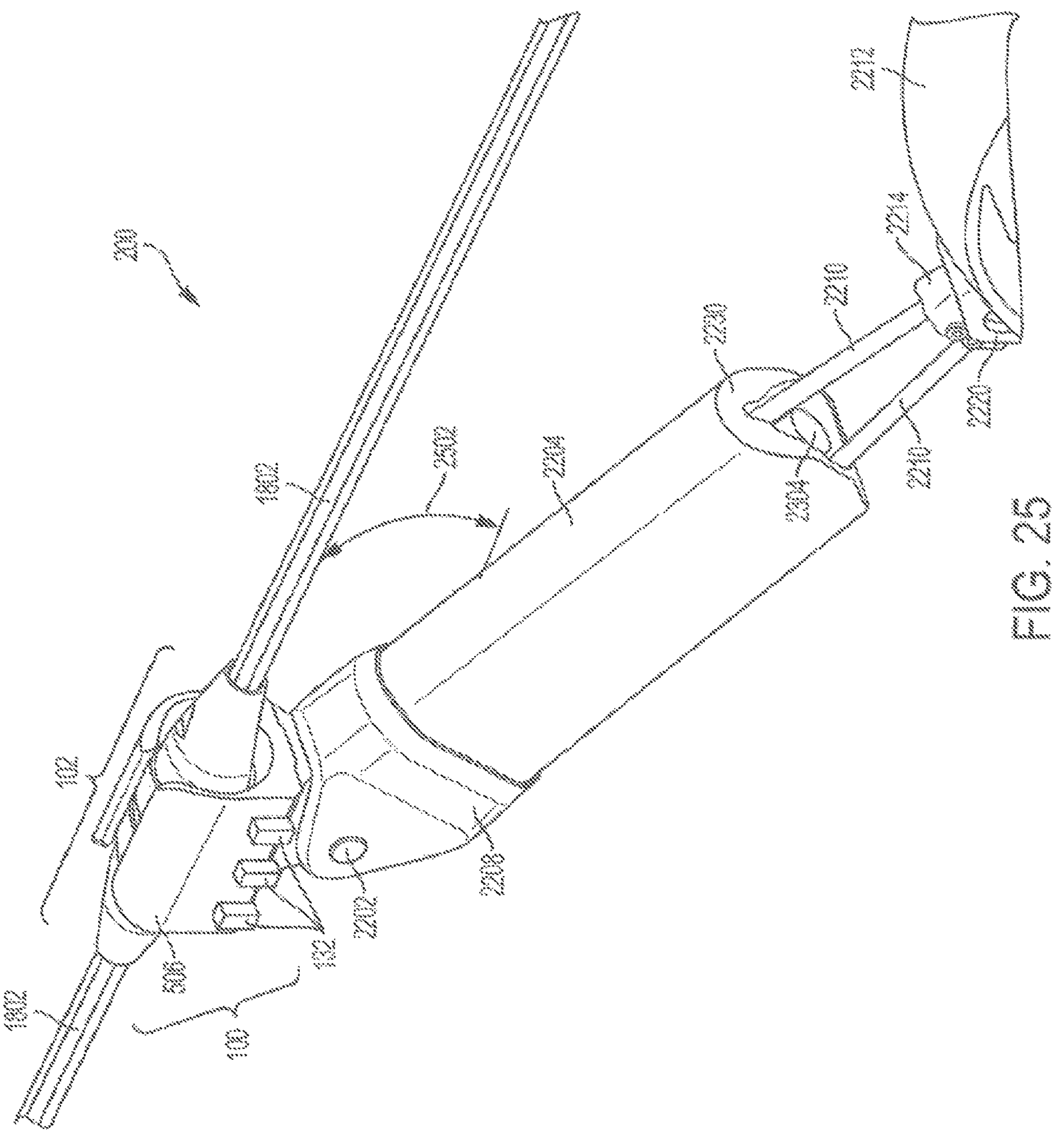

FIG. 25 depicts a system to mount a seismic data acquisition unit for deployment from a marine vessel, in accordance with an implementation. The system 200 can include one or more components of system 100. As illustrated in FIG. 25, the tether 2204 can pivot about the pivot point formed by the pin 2202. The tether 2204 can pivot towards the deployment cable 1802 such that the angle of separation 2502 between the deployment cable 1802 and an axis of foe tether than extends from the tether cap 2208 to the second end 2230 of the tether 2204 is less than 80 degrees, less than 70 degrees, less than 60 degrees, less than, less than 50 degrees, less than 45 degrees, less than 40 degrees, less than 35 degrees or less than 30 degrees, for example. The angle of separation 2502 can vary based on an angle of the deployment cable 1802 relative to a vector pointing in the direction corresponding to a force from gravity. For example, the tether 2204 or housing 2204 can be coupled via the pin 2202 such that the tether 2204 self-orientates responsive to or based on the direction of the force of gravity. For example, an axis that extends from the tether cap 2208 to the second end 2230 of the tether can stay substantially aligned (e.g., within 10%, 15%, 20%, 30%, 40%, or 50%) with the force of gravity, while the axis that extends along the deployment cable 1802 may vary, thus causing a change in the angle of separation 2502. The angle of separation 2502 may change responsive to forces exerted on the tether 2204, such as air, wind, fluid, waves, or other matter.

As the tether 2204 pivots about the pin 2202, the seismic data acquisition unit 2212 coupled to the tether 2204 via tether receiver 2220, connection block 2214 and cables 2210 can also pivot. In some cases, the cables 2210 can be rigid, in which case the seismic date acquisition unit 2252 can pivot a same amount as the tether 2204. If the cables 2210 are semi-rigid or non-rigid, the degree to which the seismic data acquisition unit 2212 can pivot relative to the deployment cable 1802 can be the same or different as the tether 2204. For example, if the cable 2210 includes a non-rigid, flexible rope, an axis of the seismic data acquisition unit 2212 extending from the tether receiver 2220 through a center point of the seismic data acquisition unit 2212 (e.g., an axis that corresponds to a diameter of the seismic data acquisition unit 2212) can be separated from the deployment cable 18002 by an angle that is greater than or less than angle 2502.

Figure 26:
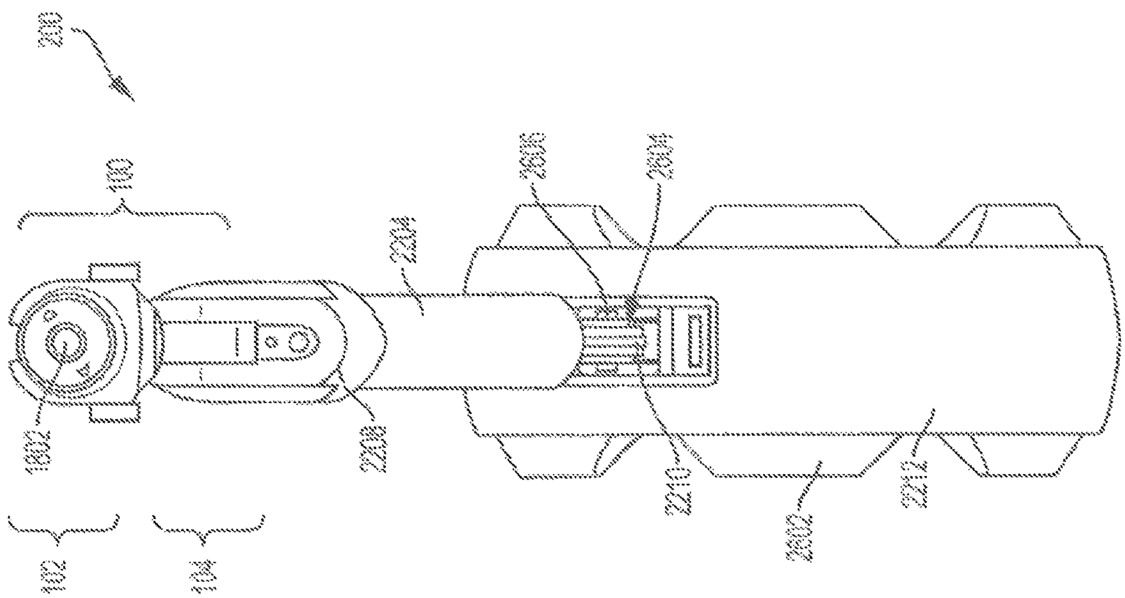

FIG. 26 depicts a system to mount a seismic data acquisition unit for deployment from a marine vessel, in accordance with an implementation. As depicted in FIG. 26, the seismic data acquisition unit 2212 can include protrusions 2632 that extend laterally from a flat surface of the seismic data acquisition unit 2212. The protrusions 2602 can include ridges, spikes, teeth, footings, or other protrusions that can facilitate coupling the seismic data acquisition unit 2212 to a seabed.

FIG. 26 illustrates a top-down perspective of the connection block 2214 inserted into the tether receiver 2220. In some cases, the cable 2210 (or cord or rope) can extend into the connection block and wrap around a wheel 2604. The wheel 2604 can include a cylindrical component. The wheel 2604 can include an axel 2606 about which the wheel 2604 can rotate. The cable 2210 can be coupled to the wheel 2604 such that the wheel 2604 can rotate, at least partially, about the axel 2604. Thus, the (other 2234 can pivot, at least partially, relative to the seismic data acquisition unit 2212 thereby minimizing the transfer of vibration or rotational force to the tether receiver 2220 or the seismic data acquisition unit 2212 and allowing the seismic data acquisition unit to automatically align with gravity.

Figure 27:
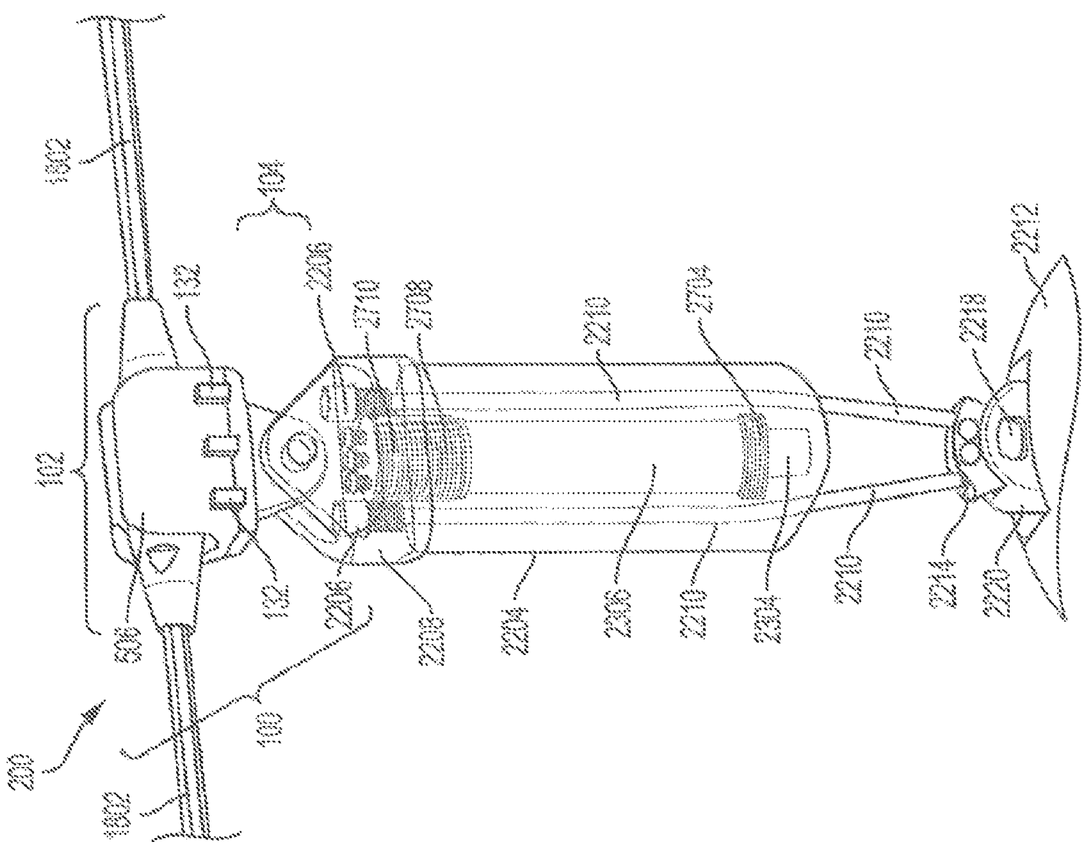
FIGS. 27-37 depict a tether and a transponder used to deploy seismic data acquisition units from a marine vessel, in accordance with some implementations.

FIG. 27 depicts a system to mount a seismic data acquisition unit for deployment from a marine vessel, in accordance with an implementation. FIG. 27 illustrates components of system 200 that are within tether 2204. For example, the transponder 2306 can be an elongated cylindrical transponder that is placed within the tether 2204 and extends along a longitudinal axis of tether 2204. The transponder 2306 can be coupled in-line with the seismic data acquisition unit 2212. The transponder 2306 can be intermediary in the connector 104 or spindle 102 and the seismic data acquisition unit 2212. The transponder 2306 can include a coupling mechanism 2708 to couple the transponder to the tether cap 2208. The coupling mechanism 2708 can include threads, adhesives, magnets, weeding, screws, pins, latches or other coupling techniques to couple the transponder 2306 to the tether cap 2208 or an end of the tether 2204 proximate to the tether cap 2208. The threading 2708 can be received by grooves 2710 in the tether 2204 or tether cap 2208.

The transponder 2306 can include a second coupling mechanism 2704 disposed at an end of the transponder 2306. The second coupling mechanism 2704 can couple the transponder 2306 to the tether 2204 or a stopper 2304. The second coupling mechanism 2704 can include threads, adhesives, magnets, welding, screws, pins, latches or other coupling techniques to couple the transponder 2306 to the stopper 2304 or a second end of the tether 2204 opposite the tether cap 2208.

FIG. 27 illustrates the tether cap 2208 at least partially enclosing, surrounding, housing, including or otherwise at least partially covering the coupling mechanism 2206, coupling mechanism 2708, and grooves 2710. For example, the coupling mechanism 2206 and 2708 can be at least partially within an internal cavity or opening of the tether cap 2208. Similarly, the transponder 2306 and cable 2210 can be at least partially within the tether housing 2204.

Figure 28:
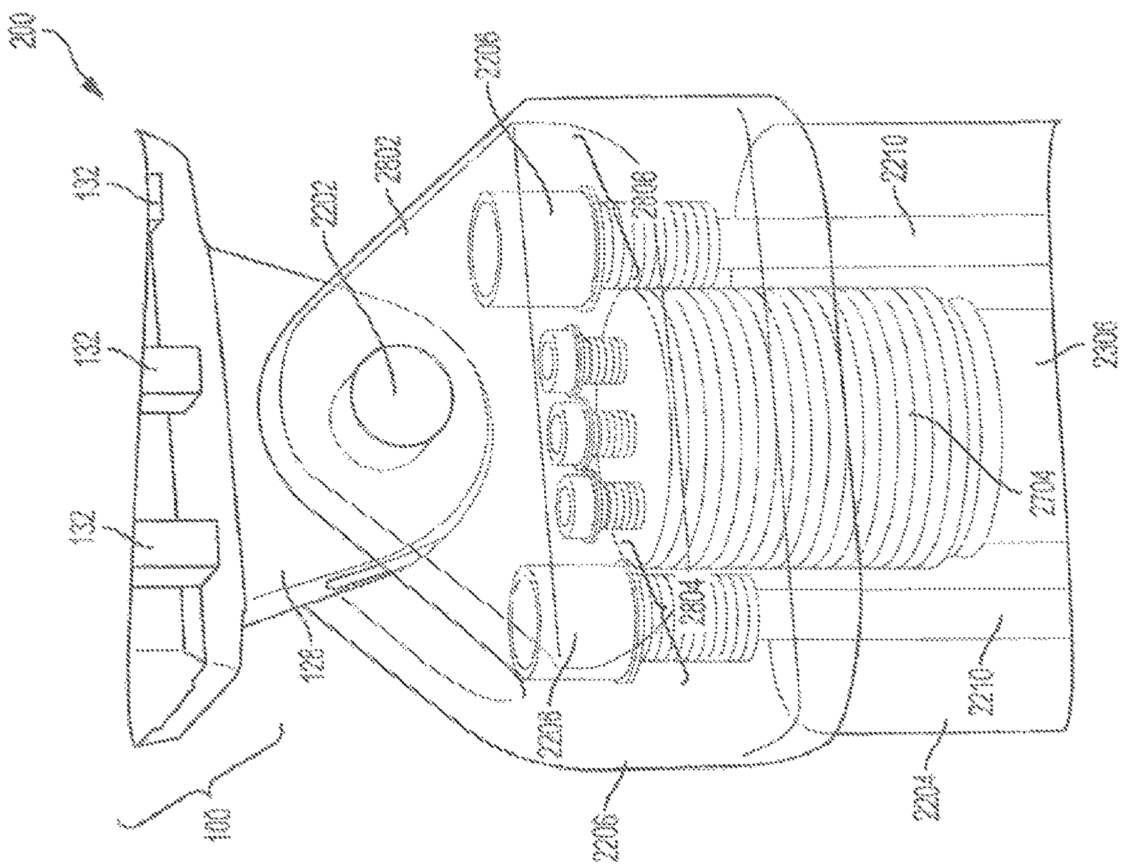

FIG. 28 depicts a system to mount a seismic data acquisition unit for deployment from a marine vessel. In accordance with an implementation. As illustrated in FIG. 28, the tether cap 2208 can cover or one or various coupling mechanism. The tether cap 2208 can include an internal compartment in which cables 2210 are coupled by coupling mechanism 2206 to the tether cap 2208 or an end of the tether 2204. Further, the transponder 2306 can be coupled to the tether cap 2208 or tether 2204 via threads 2704.

The tether cap 2208 can include a triangular shape, rectangular shape, cylindrical shape, circular shape, rounded shape, or polygonal shape. For example, the tether cap 2208 can include a linear portion 2802 that form a part of a triangular shape. The linear portion 2802 can extend from an end of the tether cap 2208 adjacent the pin 2202 towards a bottom portion of the tether cap 2208 adjacent the tether 2204. The linear portion 2802 can extend at an angle relative to a vertical axis that extends from the pin 2202 towards a bottom of the tether 2204. The angle of the linear portion 2202 can correspond to or based on a maximum pivot angle 2238 (illustrated in FIG. 22) of the tether 2204 or no angle 2502 depicted in FIG. 25. Thus, the shape of the tether cap 2208 can define, set, or establish a maximum pivot angle for the tether 2204.

The cable 2210 (or cord) can include first cord 2210 and a second cord 2210. The first cord 2210 can be fastened at or to a first portion 2804 of the tether cap 2208. The second cord 2210 can be fastened at or to a second portion 2806 of the tether cap 2208 opposite the first portion 2804. In some cases, the cord 2210 (or cable 2210) can be fastened to a portion of the tether enclosure 2204 (or transponder housing 2204). The transponder 2306 can be disposed between the first cord 2210 fastened to the first portion 2804 and the second cord 2210 fastened to the second portion 2804.

Figure 29:
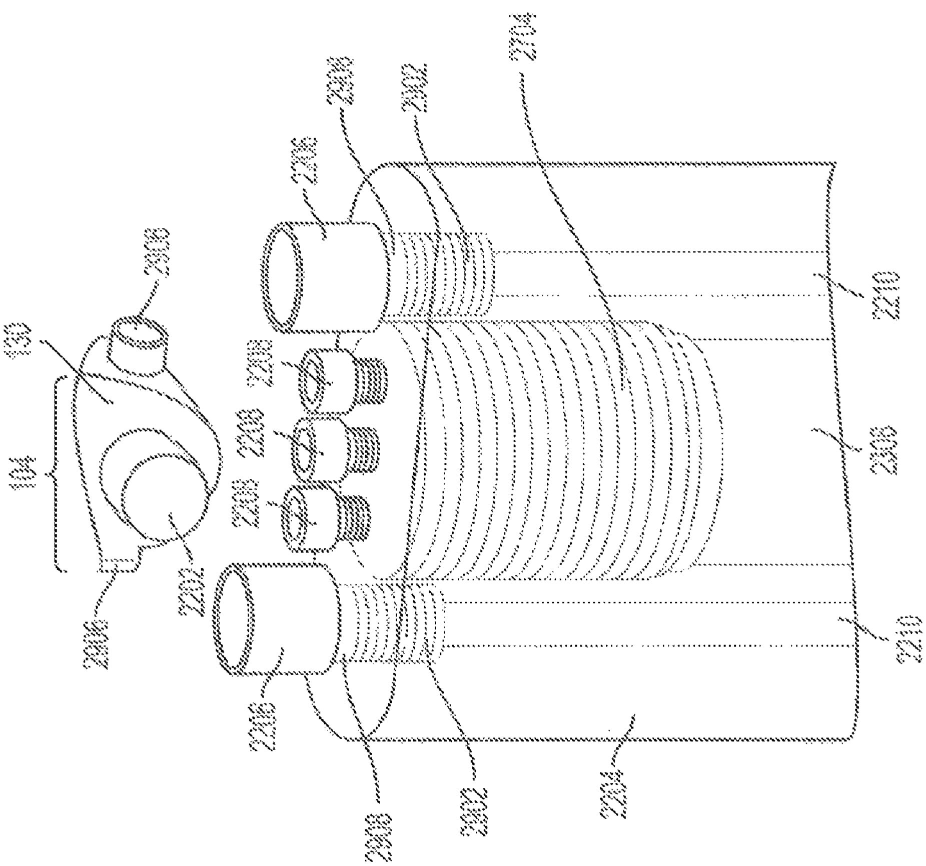

FIG. 29 depicts a system to mount a seismic data acquisition unit for deployment from a marine vessel, in accordance with an implementation. FIG. 29 illustrates components at least partially enclosed or covered by the tether cap 2208. The components 2206, 2208, 2902, and 2906 can be at least partially enclosed by tether cap 2208. For example, the coupling mechanisms 2206 can includes threads that screw into the tether cap 2208 or into an opening 2908 of the tether 2204. The opening 2908 of the tether 2204 can include grooves to receive the threads of the coupling mechanism 2902. The coupling mechanism 2902 can at least partially extend through the opening 2908.

The tether 2204, or tether housing 2204, can include an internal insert 2908 comprising the threads. The cable 2210 can include a threaded tether anchor 2902. The internal insert 2908 can receive the threaded tether anchor 2902 to secure or couple the cable 2210 to a portion of the tether 2204. The threaded tether anchor 2902 can be disposed in the internal insert 2908 to couple the cable 2210 to the tether 2204.

The connector 104 can include the pin 2202 and a second pin 2906. The second pin 2906 can lock the first, pin 2202 in the opening 130. The second pin 2906 can be the same size or different size than the first pin 2202. The first pin 2202 can include an opening in the middle of the pin 2202 that receives the second pin 2906 to lock the first pin 2202 in the opening 130. In some cases, the second pin 2906 can include two separate pins that extend towards a middle portion of the pin 2202 but do not extend through the pin 2202. The second pins 2906 can contact the first pin 2202 and hold the first pin 2202 in a position disposed within opening 130 to prevent the pin 2202 from falling out of the opening 130.

Figure 30:
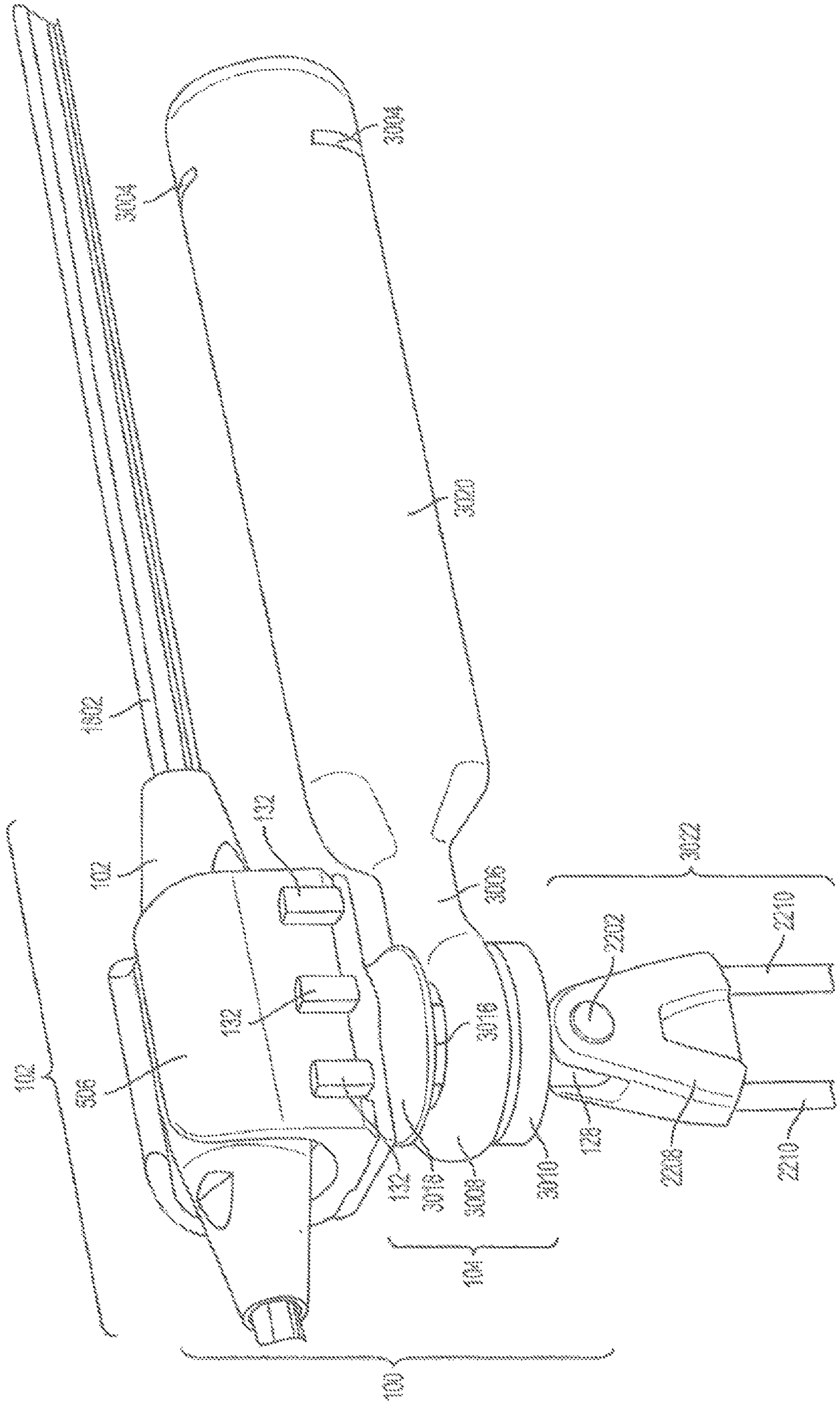

FIG. 30 depicts a system to deploy seismic data acquisition units from a marine vessel, in accordance with an implementation. The system 300 can include one or more component of system 200 or system 100. The system 300 can include a tether 3022. The tether 3022 can include one or more component or functionality of the tether housing 2204 depleted in FIGS. 22-29. The tether 3022 and its components can be interchangeable with the tether 2204 and its components. In some cases, the tether 3022 can differ from the tether housing 2204 or its components. For example, tether 3022 can include the cables 2210 and tether cap 2208, but may not include the housing 2204 or may not include the transponder 2306.

The tether 3022 can include one or more cables 2210. The tether 3022 can include a tether cap 2208. The tether cap 2208. The tether cap 2208 can include a cavity. The tether cap 2208 can be coupled to a connector 104 via a pin 2202 that forms a pivot point external to the cavity within the tether cap 2208. The tether cap 2208 can include a cable 2210 (or cord 2210) disposed at least partially within the cavity of the tether 3022. The cable 2210 (or card 2210) can be fastened to the tether cap 2208. The system 200 can include a connection block 2214 coupled to a portion of the cable 2210 that is external from the cavity within the tether cap 2208. The system 300 can include a transponder housing 3020 coupled to at least one of the connector 104 and the tether 3022 (e.g., the connector 104 and the tether 2204, the connector 104, or the tether 2204). The transponder housing 3020 can include or house a transponder 2306. The transponder 2306 can be enclosed in the transponder housing 3020, or at least partially enclosed in the transponder housing 3030. The transponder 2306 can include a transmitter that wirelessly transmits an indication of at least one of a location of the transponder 2306 and a status of the transponder 2306.

The system 300 can include a spindle 102 coupled to a deployment cable 1802. The system 300 can include a sleeve 506 coupled to the spindle 102 via one or more tumblers 132. The system 300 can include a connector 104. The connector 104 can be configured to couple the transponder housing 3020 to the spindle 102 via a sleeve 506. The connector 104 can be configured to couple the tether cap 2208 to the spindle 102. The tether cap 2208 can be coupled to the cables 2210, which can be coupled to the seismic data acquisition unit 2212.

The connector 104 can include a first disk-shaped protrusion 3018, a second disk-shaped protrusion 3010, and an elongated member 3016. The first disk-shaped protrusions 3018 can be separated from the second disk-shaped protrusion by a predetermined distance. The first disk-shaped protrusion 3018 can be separated from the second disk-shaped protrusion 3010 by an elongated member 3016. The first disk-shaped protrusion 3018 can be separated from the second disk-shaped protrusion 3010 by a distance that allows the tether 2204 to couple to the connector 104. For example, the separation distance can be a distance in range of 1 inch to 12 inches.

The first disk shaped portion 3010 and the second disk shaped portion 3018 can be referred to, include, or form a mating taper 3010 or mating taper 3018. The mating taper 3010 or mating taper 3018 can be configured to maintain a level of flatness of the coupling mechanism 3008. The level of flatness can range from 1 degree, 2 degree, 3 degrees, 4 degrees, 5 degrees, 10 degrees, 15 degrees, 20 degrees, 25 degrees or more relative to flat.

The transponder housing 3020 can include a coupling mechanism 3008 configured to couple the transponder housing 3020 to the connector 104. The coupling mechanism 3008 can include a ring, hook, circle, loop, latch or other coupling mechanism 3008 configured to connect the connector 104. The coupling mechanism 3008 can include a ring encircling at least a portion of the connector 104. The connector 104 can include an elongated portion 3016 configured to receive the coupling mechanism 3008, such as a ring 3008 or loop 3008. The coupling mechanism 3008 can be formed of one or more materials, including, for example, metal, plastic, rubber, fibers, alloys, or ceramic.

The ring 3008 can include an opening. The diameter of the opening of the loop 3008 can be based on the diameter of the elongated member 3016. The diameter of the opening of the ring 3008 can be the same as or greater than the diameter of the elongated member 3016 to allow the ring 3008 to encircle or couple to the connector 104. For example, the diameter of the elongated member 3016 can be a value in the range of 0.25 inches to 10 inches.

The transponder housing 3020 can be connected to the ring 3016 via an elongated portion 3006. The elongated portion 3006 can be less than the diameter of a main portion of the transponder housing 3020 to minimize or prevent contact between the transponder housing 3020 end a portion the sleeve 506 or connector 104.

The transponder housing 3020 can include one or more openings 3004. The openings 3004 can facilitate acoustic transmissions or optical transmissions from the transmitter 2036 within the transponder housing 3020 to traverse the transponder housing 3020. The openings 3004 can further facilitate transmissions entering the transponder housing 3020 and being received by the transponder 2036.

Figure 31:
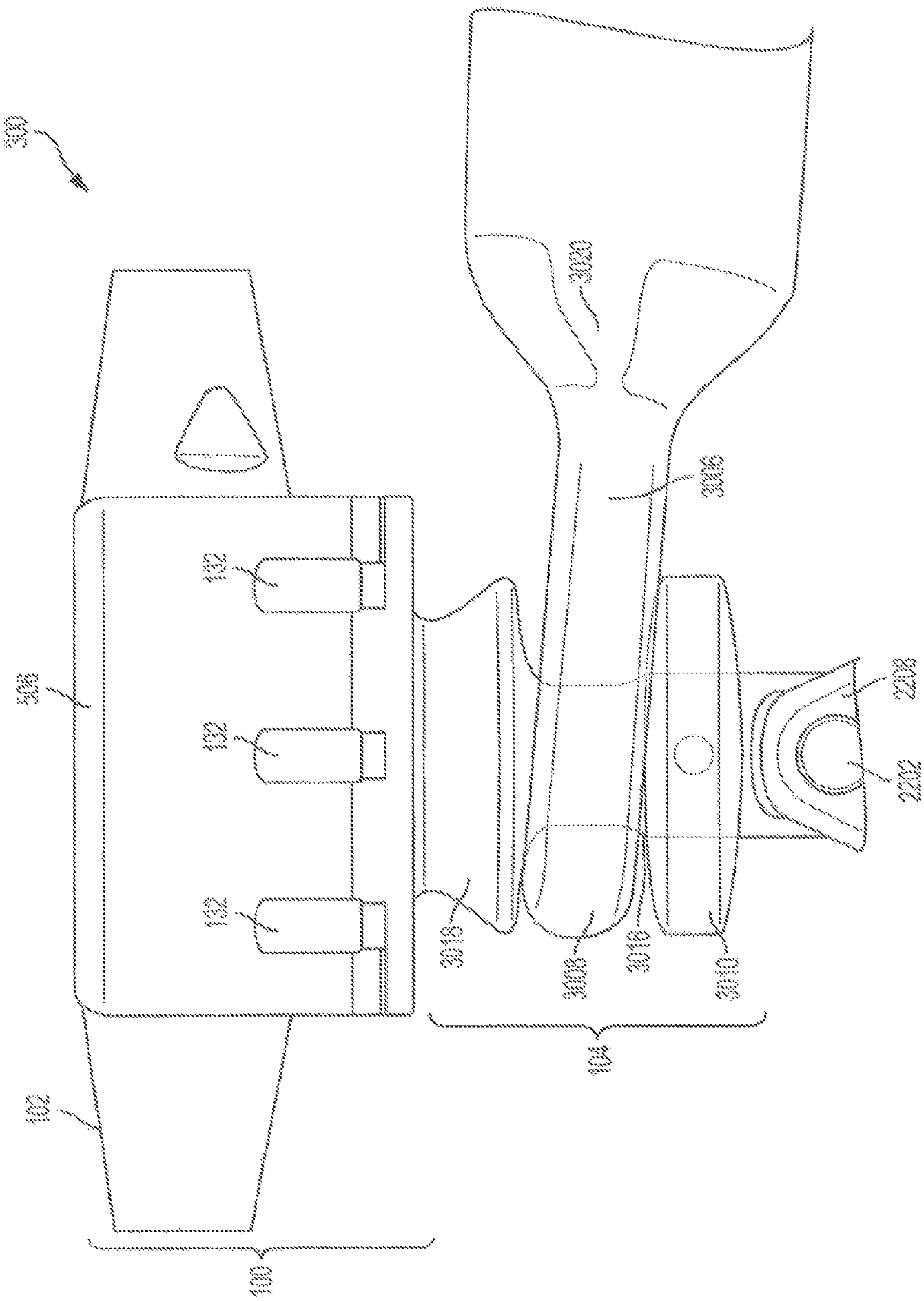

FIG. 31 depicts a system to deploy seismic data acquisition units from a marine vessel, in accordance with an implementation. The system 300 can include one or mom component of system 200 or system 100. As illustrated in FIG. 31, the transponder housing 3020 can couple to a portion of the connector 104 that is external to the tether 102. The coupling mechanism 3008 can be rigidly coupled to the connector 104. The coupling mechanism 3008 can be flexibly coupled such that the transponder housing 3020 can move or oscillate in a virtual direction or horizontal direction by a certain degree (e.g., 5 degrees, 2 degrees, 10 degrees, 15 degrees, or 20 degrees).

Figure 32:
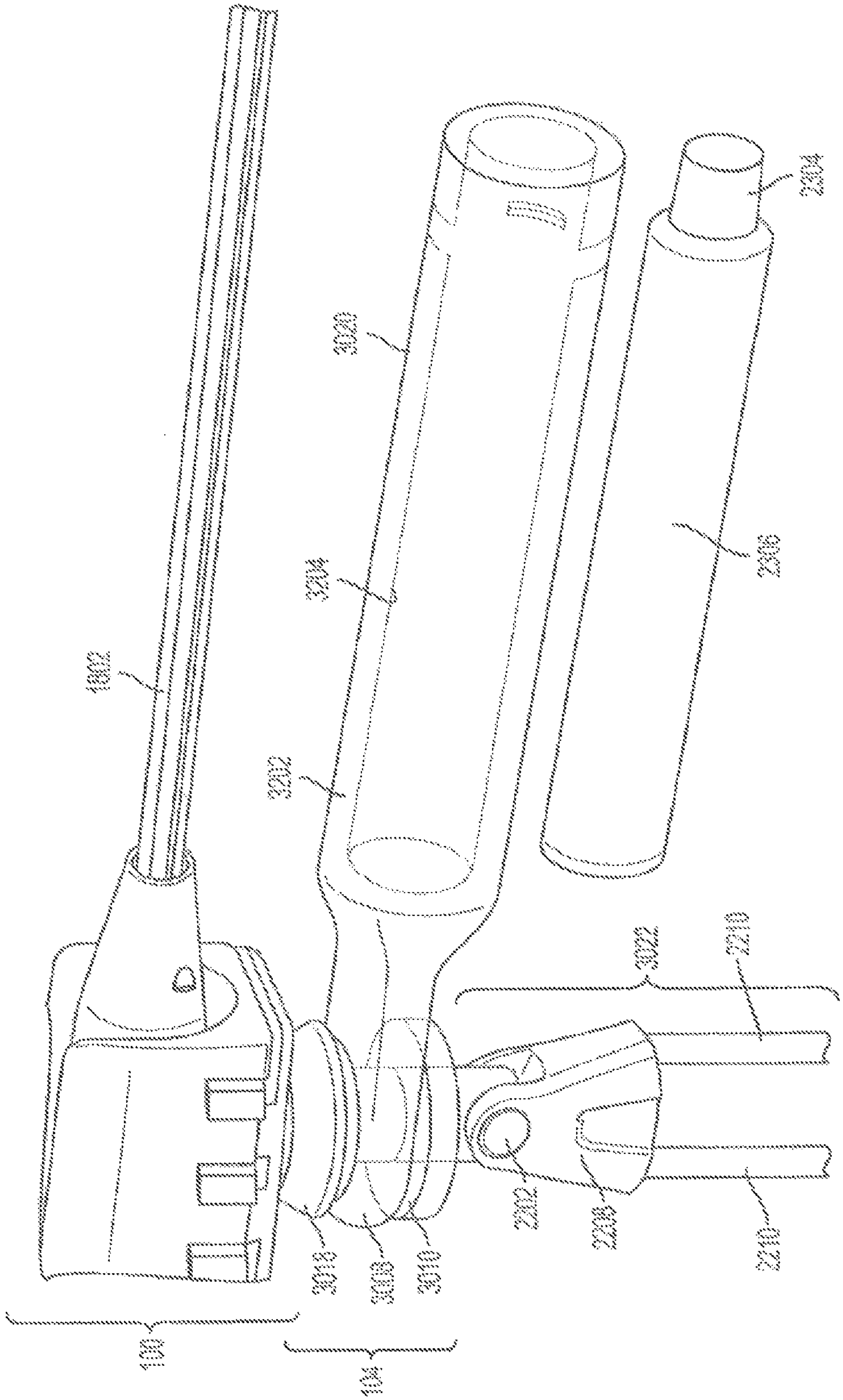

FIG. 32 depicts a system to deploy seismic data acquisition units from a marine vessel, in accordance with an implementation. As illustrated in FIG. 32, the system 300 can include the transponder 2306 that is placed within the transponder housing 3020. The transponder housing 3020 can include an external case 3202 formed of plastic. The transponder housing 3020 can include an internal wall 3204 formed of metal. The external case 3202 can be formed of a first material and the internal wall 3204 can be formed of a second material. The first and second materials can be the same or different. The first and second materials can be at least one of metallic, an alloy, plastic, ceramic, rubber, aluminum, tungsten, fabric, thermoplastic, polyurethane or other material. The transponder housing 3020 can be coupled to the connector 104 such that the transponder housing 3020 (and the transponder 2306) extend from the connector 104 in a manner that is orthogonal to the tether 2204 when the tether 3022 is to a rest position or initial position. The transponder housing 3020 can be coupled to the connector 104 such that the transponder housing 3020 (and the transponder 2306) extend from the connector 104 in a manner that is parallel to the deployment cable 1802 or spindle 102.

Figure 33:
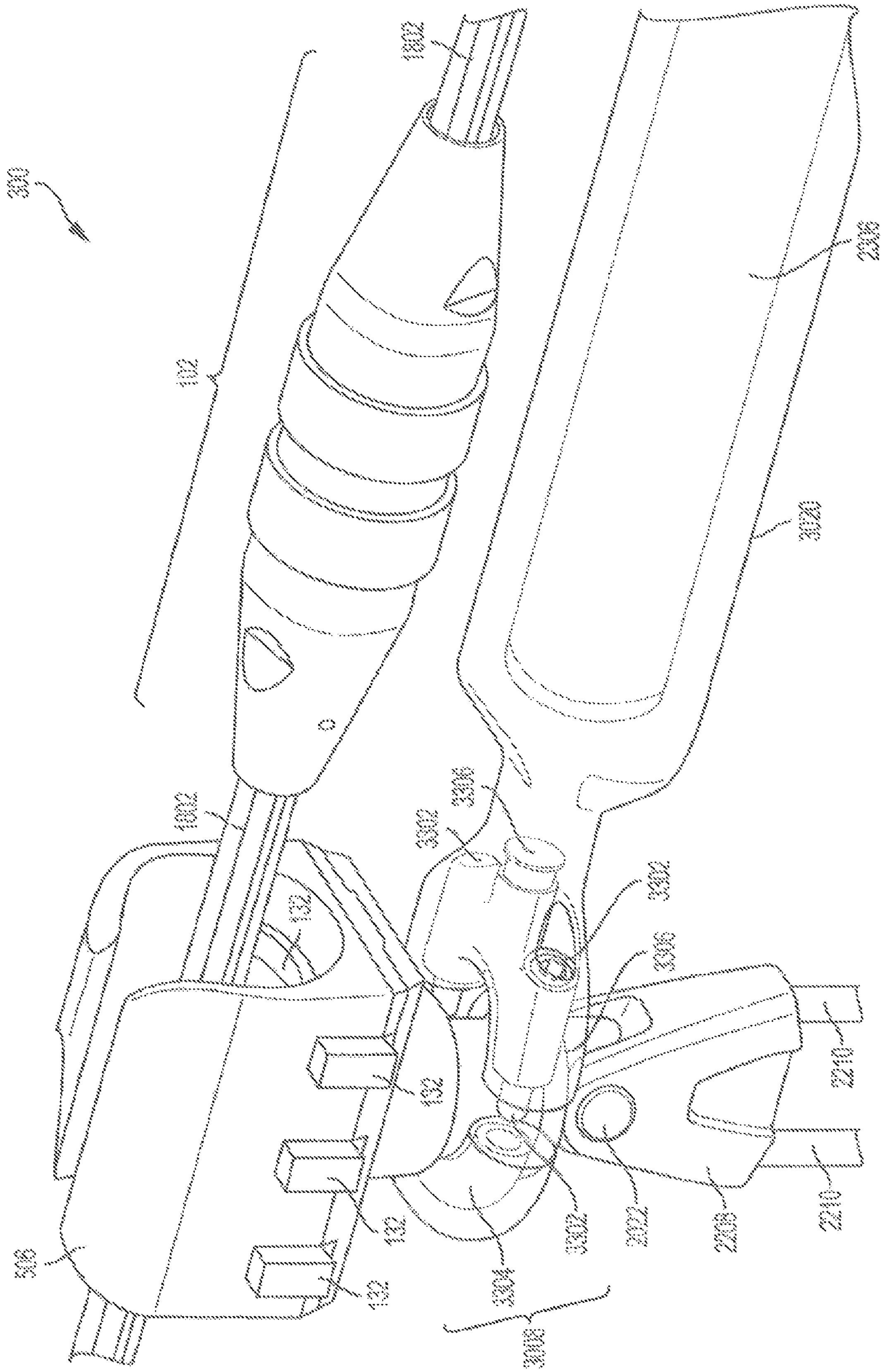

FIG. 33 depicts a system to deploy seismic data acquisition units from a marine vessel, in accordance with an implementation. As illustrated in FIG. 33, the coupling mechanism 3008 can couple the transponder housing 3020 to the connector 104. The coupling mechanism 3008 can include a first portion 3306 that connects to a second portion 3304. The first portion 3306 can connect or couple to the second portion 3304 via a screw, pin, plug, adhesive, fastener, or other connection member 3302 that can couple or connect the first portion 3306 to the second portion 3304. The connection 3302 can lock the first portion 3306 to the second portion 3304 such that the coupling mechanism 3008 can hold or secure the transponder housing 3020 to the connector 104 while the system 300 is deployed into the aqueous medium.

Figure 34:
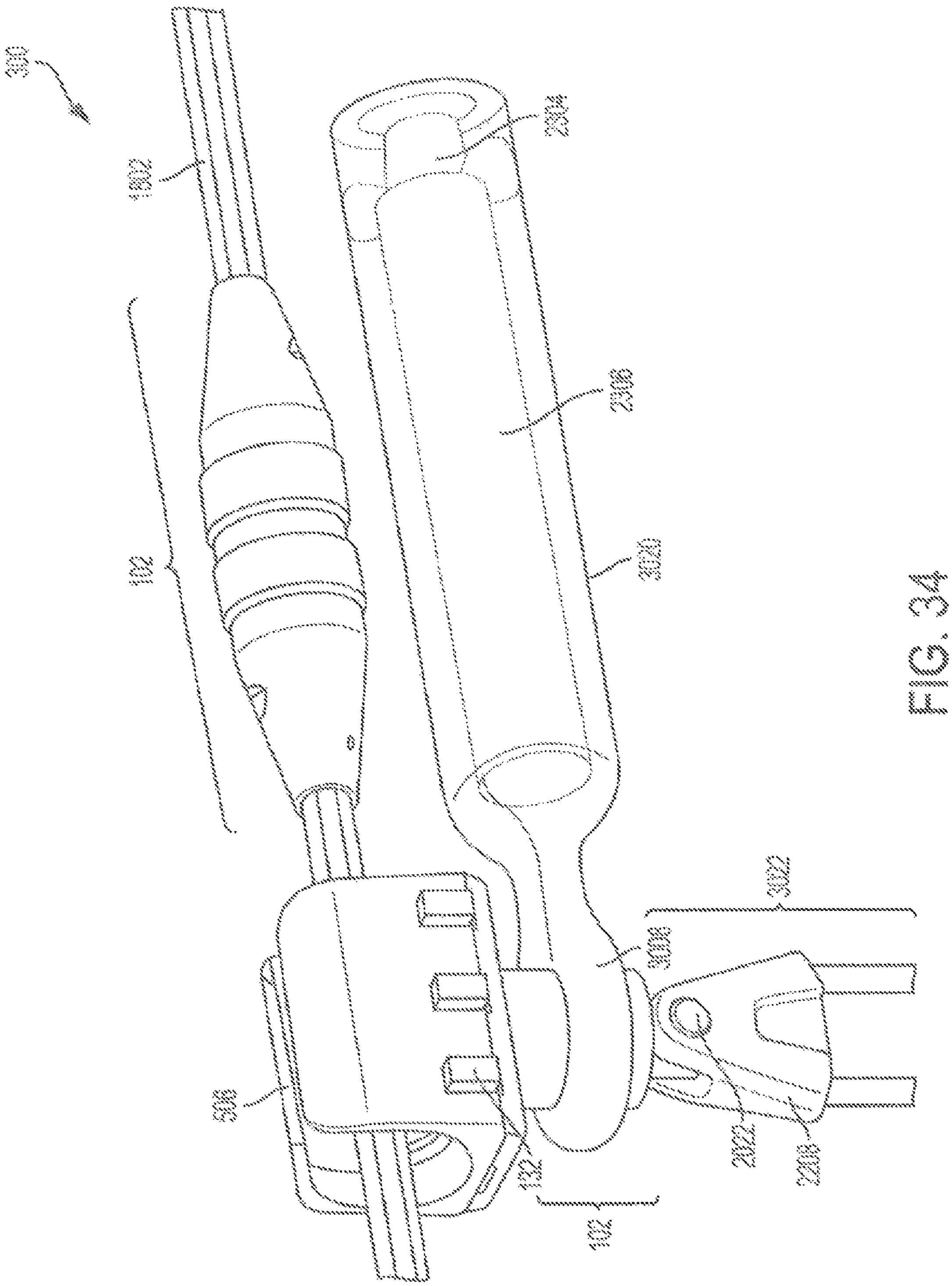

FIG. 34 depicts a system to deploy seismic date acquisition units from a marine vessel, in accordance with an implementation. As illustrated in FIG. 34, the sleeve 506 is not coupled to the spindle 102. The sleeve 506 may not yet have been coupled to foe spindle 102. The sleeve 506 may be in the process of being coupled to the spindle 102. The sleeve 506 may have been decoupled from the spindle 102 (e.g., during a retrieval process).

The sleeve 506 can move towards the spindle 102 (or the spindle 102 towards the sleeve 506). The sleeve 506 can contact the spindle 102. Responsive to contacting the spindle 102, the sleeve can engage the spindle 102 via tumblers 132. The transponder housing 3020 can couple to the connector 104 prior to the sleeve 506 coupling to the spindle 102. The transponder housing 3020 can couple to the connector 104 after the sleeve 506 couples to the spindle 102. The transponder housing 3020 can couple to the connector 104 at the same time the sleeve 506 couples to the spindle 102.

FIG. 35 depicts a system to deploy seismic data acquisition units from a marine vessel, in accordance with an implementation. As illustrated in FIG. 35, the spindle 102 and the sleeve 506 can come together to engage one another. The spindle 102 can include protrusions 124 and grooves 126 that extend radially around a cylindrical portion of the spindle 102. The tumblers 132 can include a portion 3502 that engages with the grooves 126 on the spindle 102 to contact the spindle 102 and secure or couple the sleeve 506 to the spindle 102.

Figure 36:
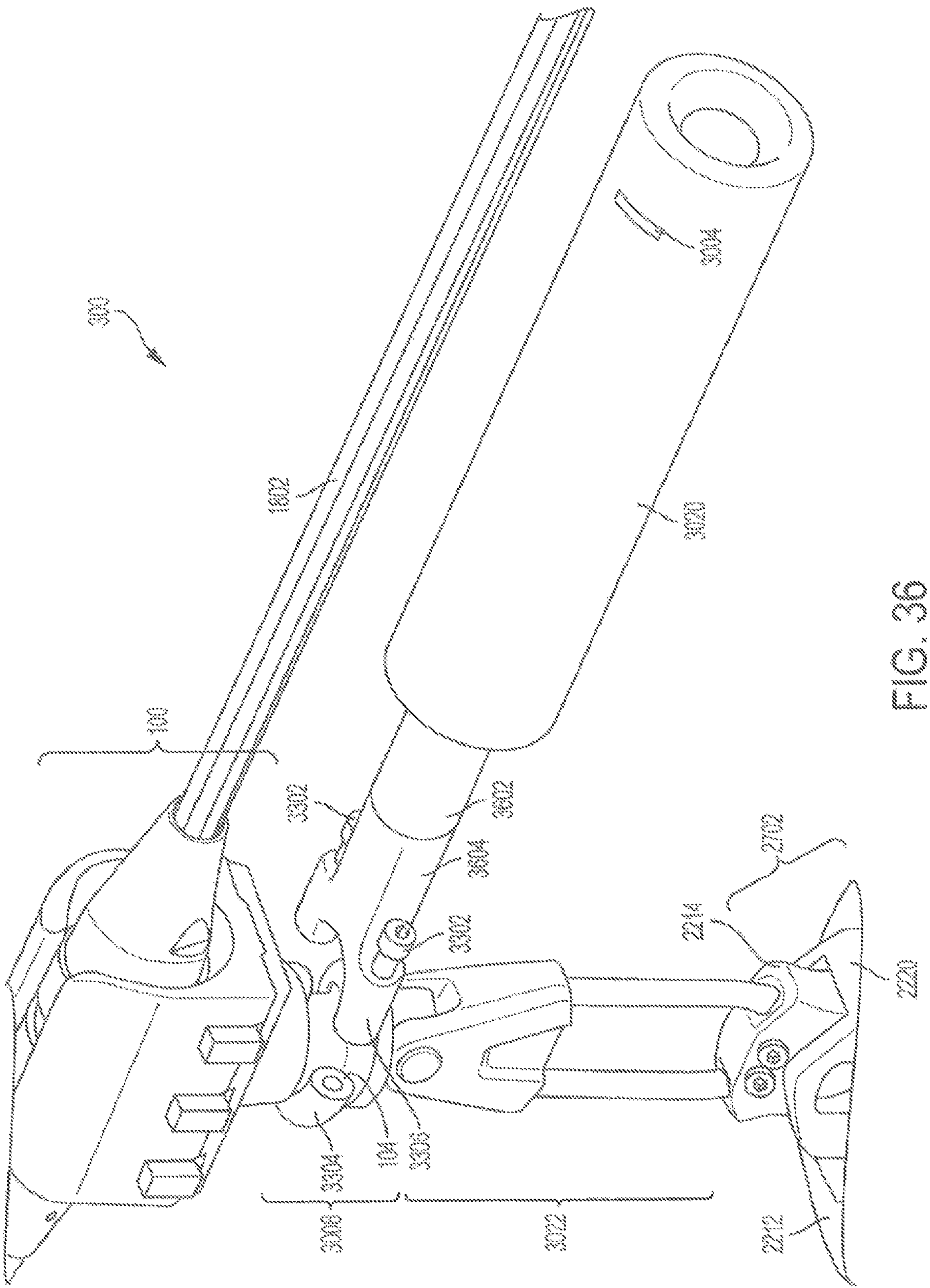

FIG. 36 depicts a system to deploy seismic data acquisition units from a marine vessel, in accordance with m implementation. As illustrated in FIG. 36, the transponder housing 3020 can connect or couple to the connector 104 via coupling mechanism 3008. The coupling mechanism 3008 can include a plurality of portions, such as a first portion 3306 and second portion 3304. The first portion 3306 of the plurality of portions can attach to the transponder housing 3020. The second portion 3304 of the plurality of portions can attached the first portion 3306. The connector 104 can be placed in between the first portion 3306 and the second portion 3304 to couple the transponder housing 3020 to the corrector 104 via the coupling mechanism 3008.

The coupling mechanism 3008 can include a first coupling portion 3306 and a second coupling portion 3304 that connect to each other via pins, screws, or plugs 3302. The second coupling portion 3304 can include an elongated portion 3604 that couples to an elongated portion 3602 of the transponder housing 3020. The transponder housing 3020 and the second portion 3304 of the coupling mechanism 3008 can be separate components that are assembled together. The transponder housing 3020 can connect to the second portion 3304 of the coupling mechanism 3308 via the elongated portion 3604. The transponder housing 3020 can include an elongated portion 3602 that couples to the portion 3604. The portion 3602 of the transponder housing can be narrower or have a smaller diameter as compared to the main portion of the transponder housing 3020. The transponder housing 3020 can connect to the elongated portion 3604 of the second portion 3304 of the coupling mechanism 3008 via a screw, adhesive, hook, magnet, or other fastener. For example, the elongated portion 3602 of the transponder housing 3020 can be swaged to the elongated portion 3604 of the coupling mechanism 3008 with a compression insert.

Figure 37:
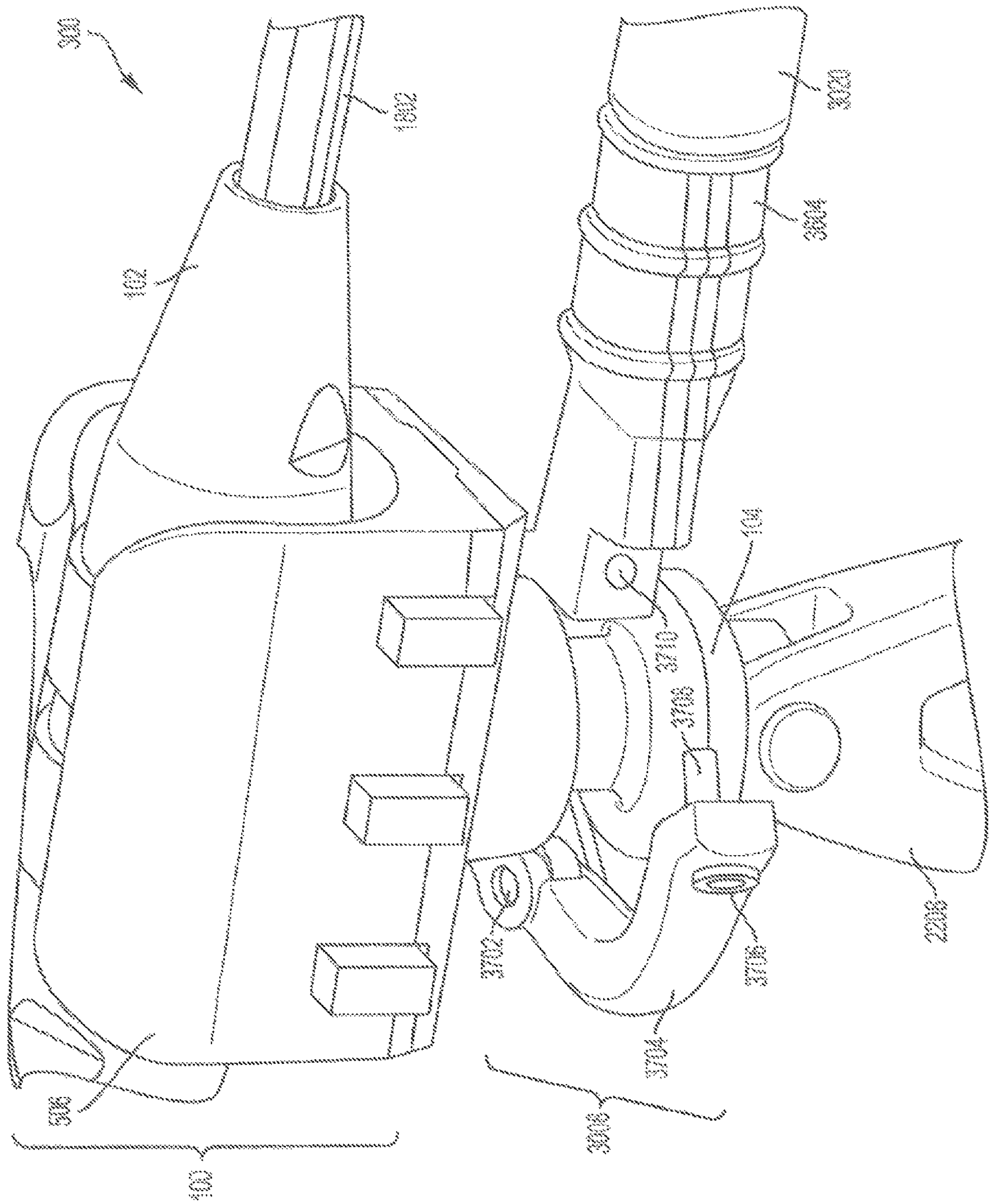

FIG. 37 depicts a system to deploy seismic data acquisition units from a marine vessel, in accordance with an implementation. As illustrated in FIG. 37, the system 300 can include the transponder housing 3020 that can connect to the connector 104 via a coupling mechanism 3008. The coupling mechanism 3008 can include a clamp 3704 and a hinge 3702 that couple the transponder housing to the connector. The clamp 3704 can include a mechanical hook 3704 that pivots about the hinge 3702. The clamp or mechanical hook 3704 can pivot about the hinge 3702 from an open state to a closed state. In the closed state, the clamp or mechanical hook 3704 can secure or couple the transponder housing 3020 to the connector 104. For example, a screw, pin, plug, or other locking mechanism 3708 can be inserted into cavity 3710 to close the clamp 3704. The screw or plug can include a wider portion 3706 that secures the pin to the mechanical hook 3704, and an insertable portion 3708 configured to be at least partially disposed within cavity 3710. The insertable portion 3708 can include threads configured to be screwed into cavity 3710.

Figure 38:
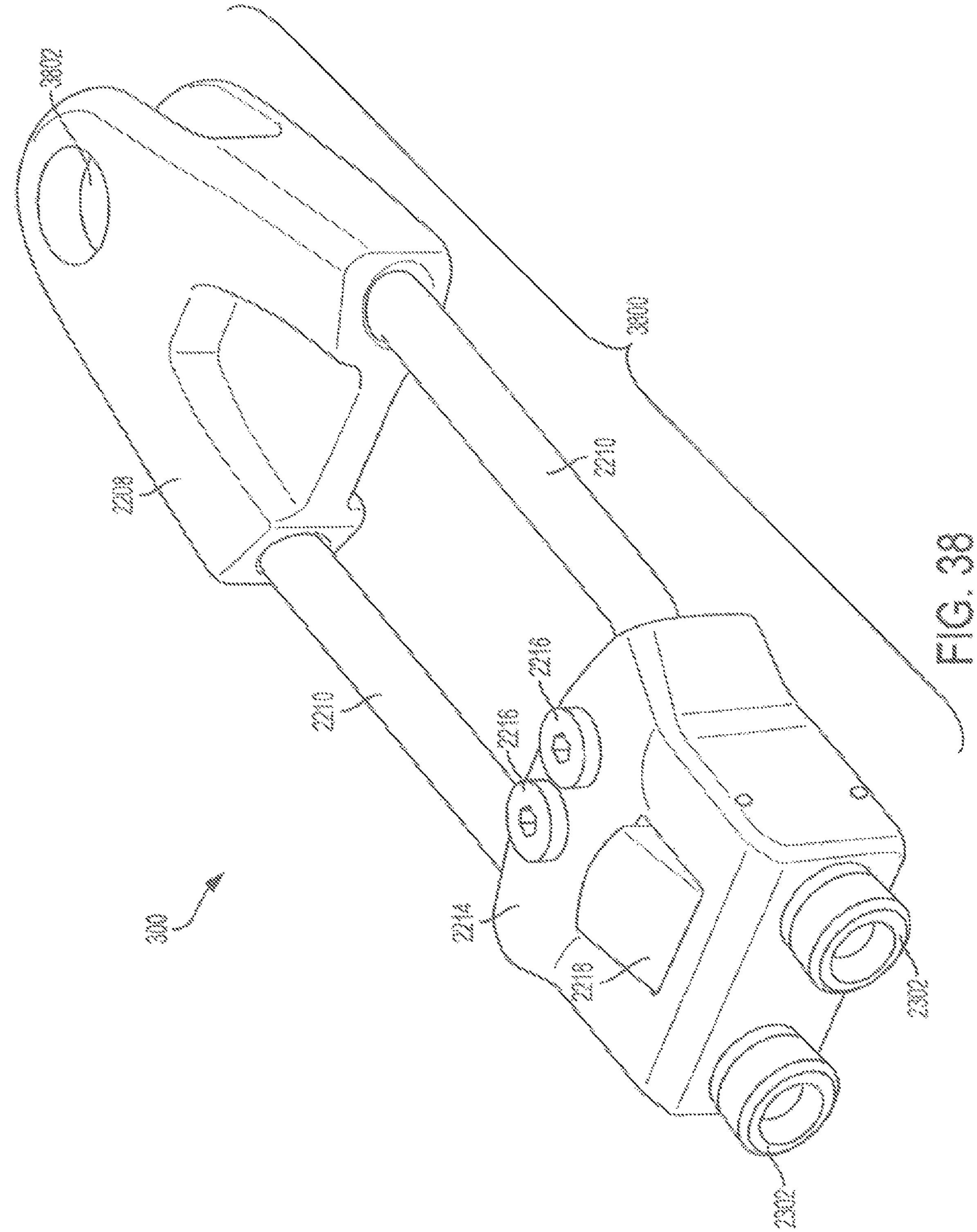
FIGS. 38-40 depict a tether used to deploy seismic data acquisition units from a marine vessel, in accordance with some implementations.

FIG. 38 depicts a system to deploy seismic data acquisition units from a marine vessel, in accordance with an implementation. The system 300 can include a tether assembly 3800 or tether system 3800. The tether assembly 3800 can include the tether 3022. The system 3800 can include the tether cap 2208 and an opening 3802 on the tether cap 2208. The pin 2202 can be inserted into the opening 3802 to couple the tether cap 2208 to the connector 104 (e.g., illustrated in FIG. 22). The tether cap 2208 can be coupled to cables 2210 that extend from a cavity within tether cap 2208. The cables 2210 can extend towards connection block 2214. The connection block 2218 can include a protrusion 2218 and protrusion 2302. The protrusion 2218 can facilitate coupling the tether cap 2218 into tether receiver 2220.

Figure 39:
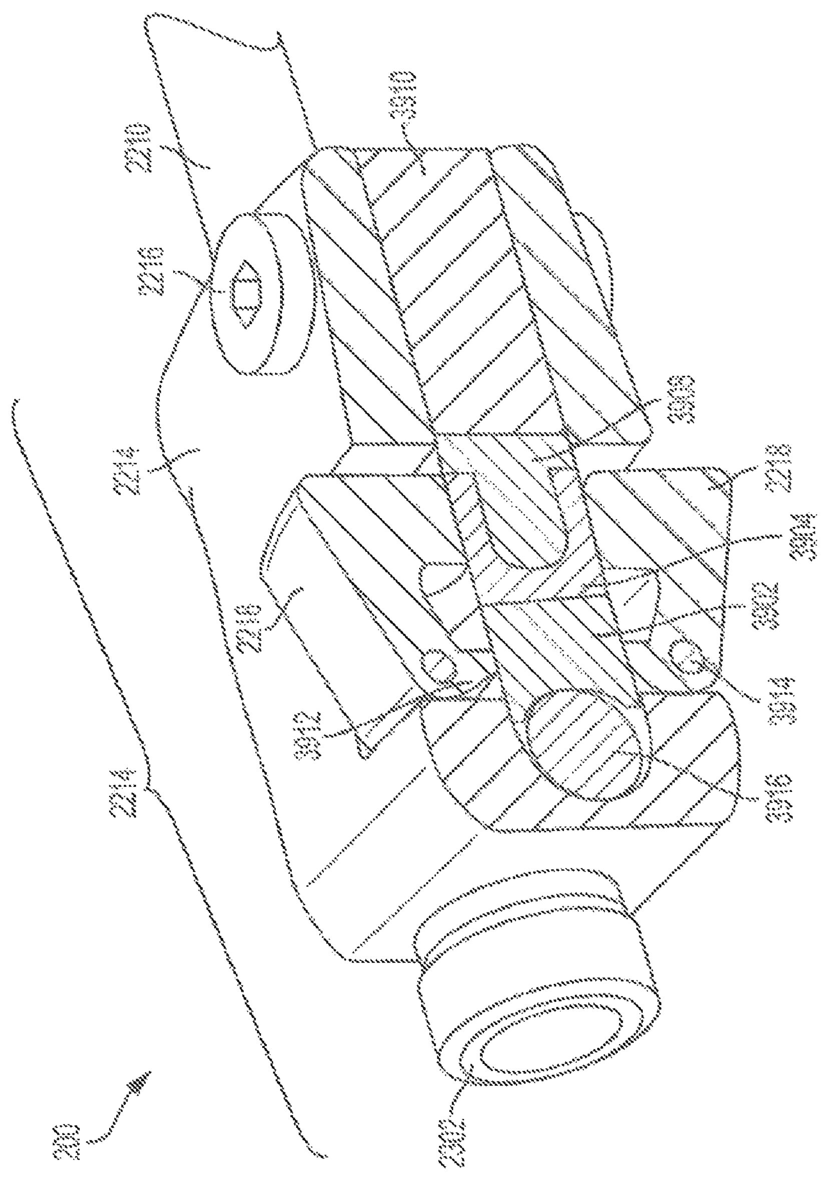

FIG. 39 depicts a system to deploy seismic data acquisition units from a marine vessel, in accordance with an implementation. The system 300 includes the connection block 2214. Illustrated in FIG. 39 is a cross-sectional view of the connection block 2214, including a view of one more components that are internal to the connection block 2214. The connection block 2214 can include a protrusion 2218. The connection block 2214 can include a mechanical force device 3904, such as a spring, foam, flexible plastic, or ether resistive material that exerts force. The mechanical force device 3904 can exert force on protrusion 2218 such that protrusions 2218 extend externally from the connection block 2214. The mechanical force device 3904 can be formed of multiple components, such as a first foam or spring-like material 3904 and a second foam or spring like material 3908. The mechanical force device 3904 can be deformable to allow the protrusions 2218 to compress and expand.

The connection block 2218 can further include a third material 3902 that contacts a bottom portion 3912 of the protrusion 2218. The third material 3902 facilitates the protrusion 2218 pivoting about a pivot point formed by a pin 3914. The pin 3914 can extend through the bottom portion 3912 of the protrusion 2218 to allow the protrusion 2218 to pivot towards the connection block 2214 and away from the connection block 2214 such that the protrusions 2214 can be compressed in order to enter the opening of the tether receiver 2220, expand in order to couple to the tether receiver 2220, and then compress again in order to decouple from the tether receiver 2220.

The connection block can include a component 3910 at a top of the connection block 2214 adjacent to the cable 2210. The component 3910 can include a cavity that receives the cable 2210. The component 3910 can further include a cavity to receive the screw 2216 (or pin 2216 or plug 2216, or other coupling mechanism). The screw 2216 can secure the cable 2210 to the connection block 2214. The connection block 2214 can include a shock absorber 3916 that can reduce the transfer of vibration from the connection block 2214 to the footing 2302 that contacts the seismic data acquisition device 2212.

In some cases, responsive to contacting the tether receiver 2220, the footings 2302 can receive a force from the contact, and exert a force on the protrusion 2218 to extend the protrusion 2218 to facilitate extending the protrusion 2218 through the opening 2234 of the tether receiver 2220 illustrated in FIG. 22. The combination and configuration of mechanical force devices and resistive materials 3916, 2902, 3904, and 3908 can transfer force receive from the contact between the footing 2302 and the tether receiver 2220 towards the protrusion 2218 to expand or push the protrusions 2218 out towards and through the opening of the tether receiver 2220 to facilitate coupling the connection block 2214 to the seismic data acquisition unit 2212.

Figure 40:
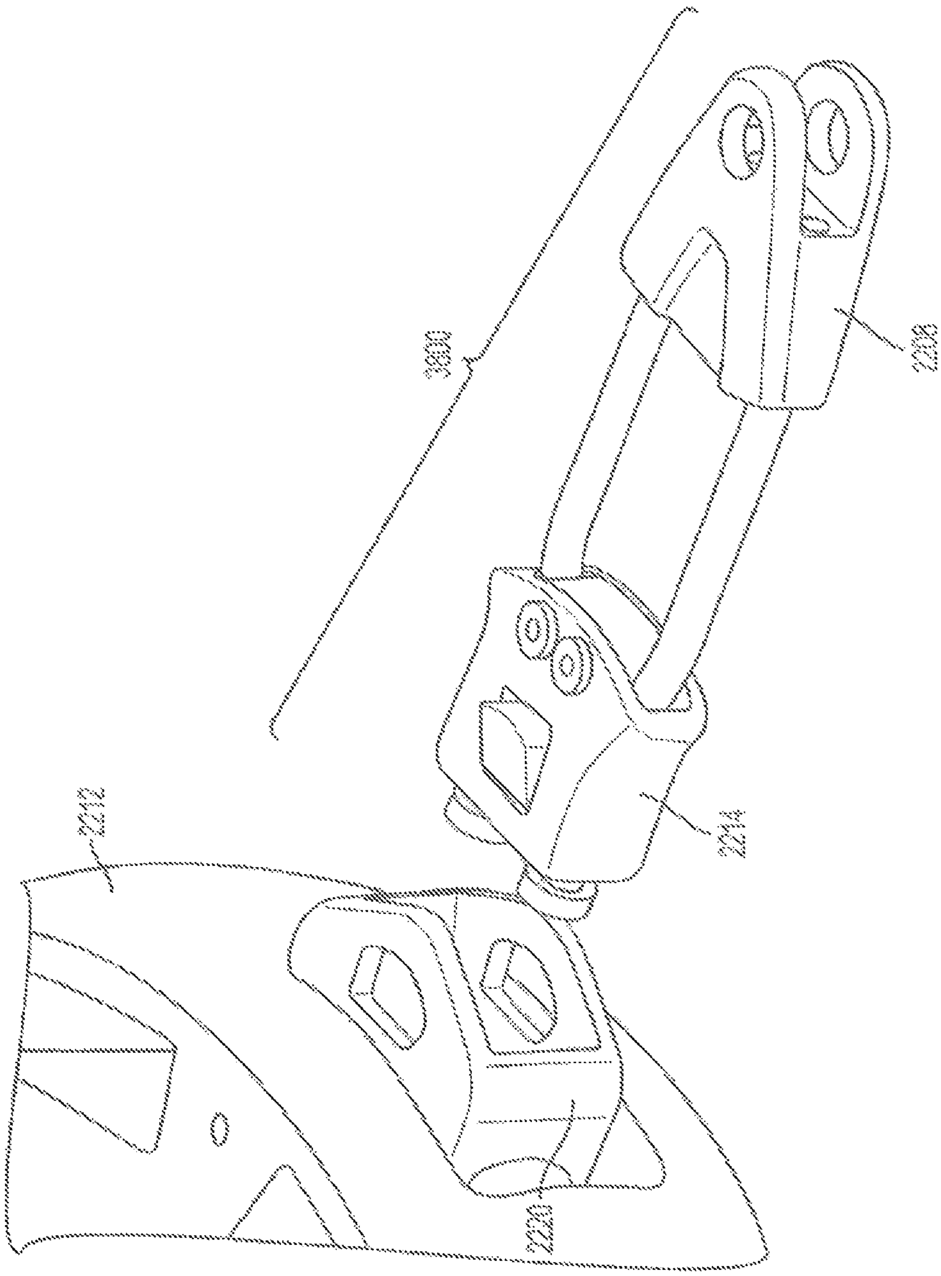

FIG. 40 depicts a system to deploy seismic date acquisition units from a marine vessel, in accordance with an implementation. The tether assembly 3800 can be inserted into tether receiver 2220. The tether receiver 2220 can be coupled to or a part of the seismic data acquisition unit 2212. The tether receiver 2220 and the tether assembly 3800 can be brought together during coupling. The tether assembly 3800 can automatically couple or lock to the tether receiver 2220 responsive to being inserted into the tether receiver 2220.

Figure 41:
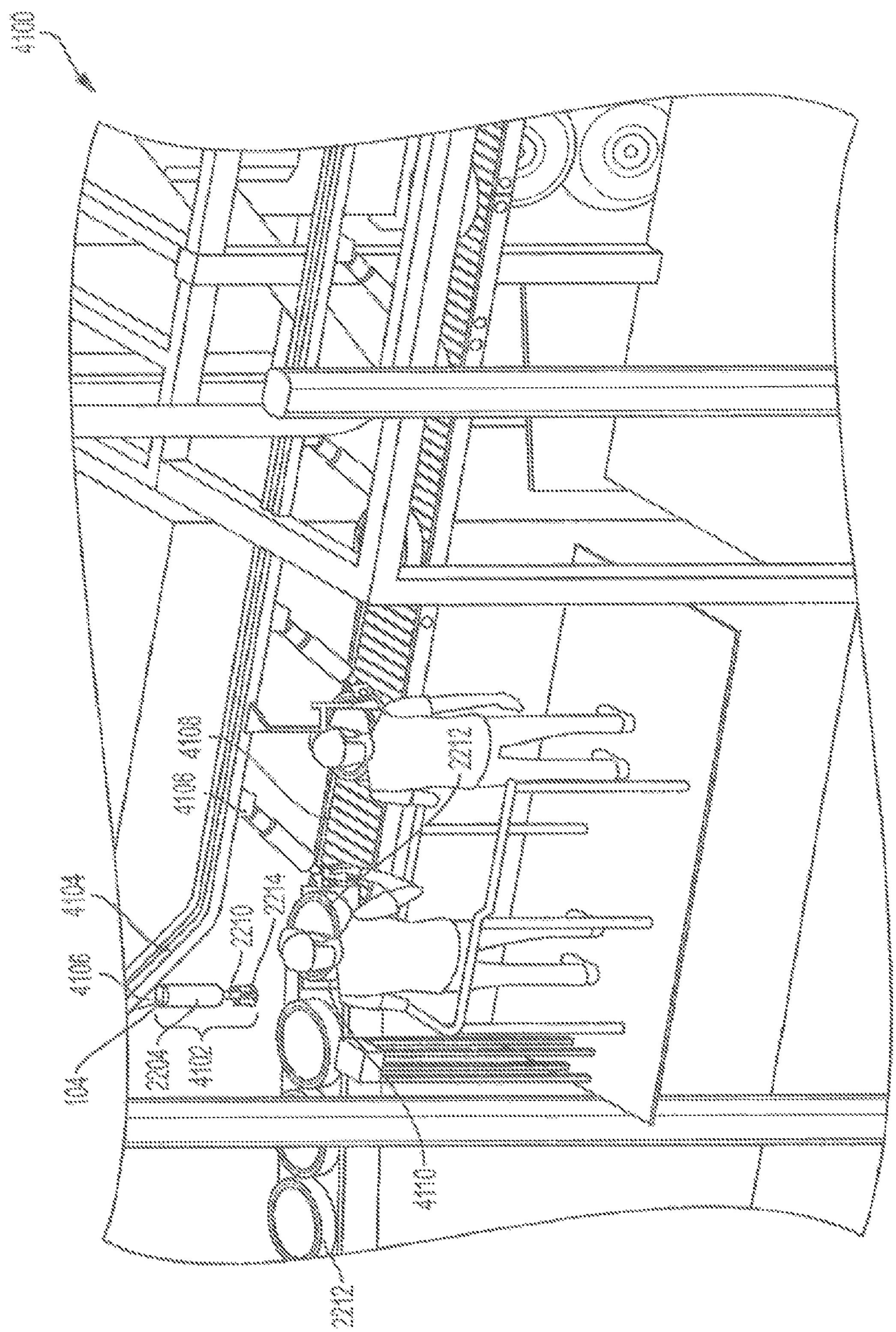
FIGS. 41-48 depict a system used to deploy seismic data acquisition units from a marine vessel, in accordance with some implementations.

FIG. 41 depicts a system to mount seismic data acquisition units for deployment from a marine vessel. The system 4100 can include a tether assembly 4102. The tether assembly 4102 can include one or more component or functionality of system 100, 200 or 300 or component thereof depicted in FIGS. 1-40. For example, the tether assembly 4102 can include a connector 104, a sleeve 506, a tether cap 2208, a tether housing 2204, cable 2210, and connection block 2214. The connector 104 can include the sleeve 506 and tether cap 2208. The tether assembly 4102 can be referred to as the tether 4102. The system 4100 can include a first conveyor 4104. The first conveyor 4104 can be an overhead conveyor 4104. The overhead conveyor 4104 can include one or more rails. The elevated conveyor 414 can be a motorized overhead conveyor. The first conveyor 4104 can convey, transfer, transport, move, hold, or store the tether assembly 4102.

The first conveyor 4104 can include a coupling mechanism 4106. The coupling mechanism 4196 can be referred to as a conveyor coupler 4106 or overhead conveyor coupler 4106. The overhead conveyor coupler 4196 can be configured to connect to the tether assembly 4102. The overhead conveyor coupler 4106 can couple the tether assembly 4102 to the conveyor 4104. The overhead conveyor coupler 4106 can be shaped similar to the spindle 102 to allow the connector 104 of the tether assembly 4102 to connect or couple to the conveyor 4106 via one or more tumblers 132 disposed in a cavity of the connector 104. The overhead conveyor coupler 4106 can include a hook, rack, latch, magnet, wire, rope, or other couple mechanism configured to hold the tether assembly 4102. For example, the overhead conveyor coupler 4106 can include robotic hands or clamps configured to open and close to hold the tether assembly 4102 and release the tether assembly 4102.

The overhead conveyor coupler 4106 can be configured to allow the tether assembly 4102 to pivot about a point at or near the overhead conveyor coupler 4106. For example, the overhead conveyor coupler 4106 can be coupled to the overhead conveyor 4104 such that the overhead conveyor coupler 4106 can itself pivot relatives to the first conveyor 4104. In some cases, the overhead conveyor coupler 4106 can connect to the tether assembly 4102 such that the tether assembly 4102 can pivot relative to the overhead conveyor coupler 4106. For example, the connection mechanism can include a hinge, pin, ball bearing, swing, rope or other mechanism that allows the tether assembly 4102 to pivot, rotate, or otherwise move relative to the overhead conveyor coupler 4106 or the first conveyor 4104.

The system 4100 can include a second conveyor 4108. The second conveyor 4108 can convey, transfer, transport, move, hold, or store seismic data acquisition units 2212. The second conveyor 4108 can be different from the first conveyor 4104. The second conveyor 4108 can be referred to as a lower conveyor or a seismic data acquisition unit conveyor. The second conveyor 4108 can include a chute conveyor, wheel conveyor, gravity roller conveyor, powered roller conveyor, chain conveyor, slat conveyor, flat belt conveyor, magnetic belt conveyor, troughed belt conveyor bucket conveyor, or tow conveyor. The second conveyor 4108 can be formed of one or more portions or pieces that are placed next to each ether or joined together. The distance between the portions of the second conveyor 4108 can allow seismic data acquisition units 2212 to traverse the portions of the second conveyor 4108 without causing damage or friction to adversely affect the deployment process or a component of the seismic data acquisition unit 2212.

The second conveyor 4108 can transport the seismic data acquisition unit 2212. The first conveyor 4104 and the second conveyor 4108 can be separated by a predetermined distance. The first conveyor 4104 and the second conveyor 4108 can be separated by a distance corresponding to a dimension of the tether assembly 4102 to allow the connection block 2214 of the tether assembly 4102 to contact and connect to the tether receiver 2220 on the seismic data acquisition unit 2212, as illustrated in FIG. 22, without having to lift the seismic data acquisition unit 2212 off the second conveyor 4108. To improve the efficiency and speed of deploying seismic data acquisition units 2212, while reducing resource usage, the first and second conveyors 4104 and 4108 can be separated by a distance that allows the tether assembly 4102 to connect to the seismic data acquisition unit 2212 with minimal adjustment or additional movement. For example, the second conveyor 4108 can include a rotation station 4110 that rotates the seismic data acquisition unit 2212 to align the tether receiver 2220 on the seismic data acquisition unit 2212 with the connection block 2214 of the tether assembly 4102. The rotation station 4110 can include a carousel, a table carousel, rotating disk, a turntable, low friction surface, or roller wheels.

Figure 42:
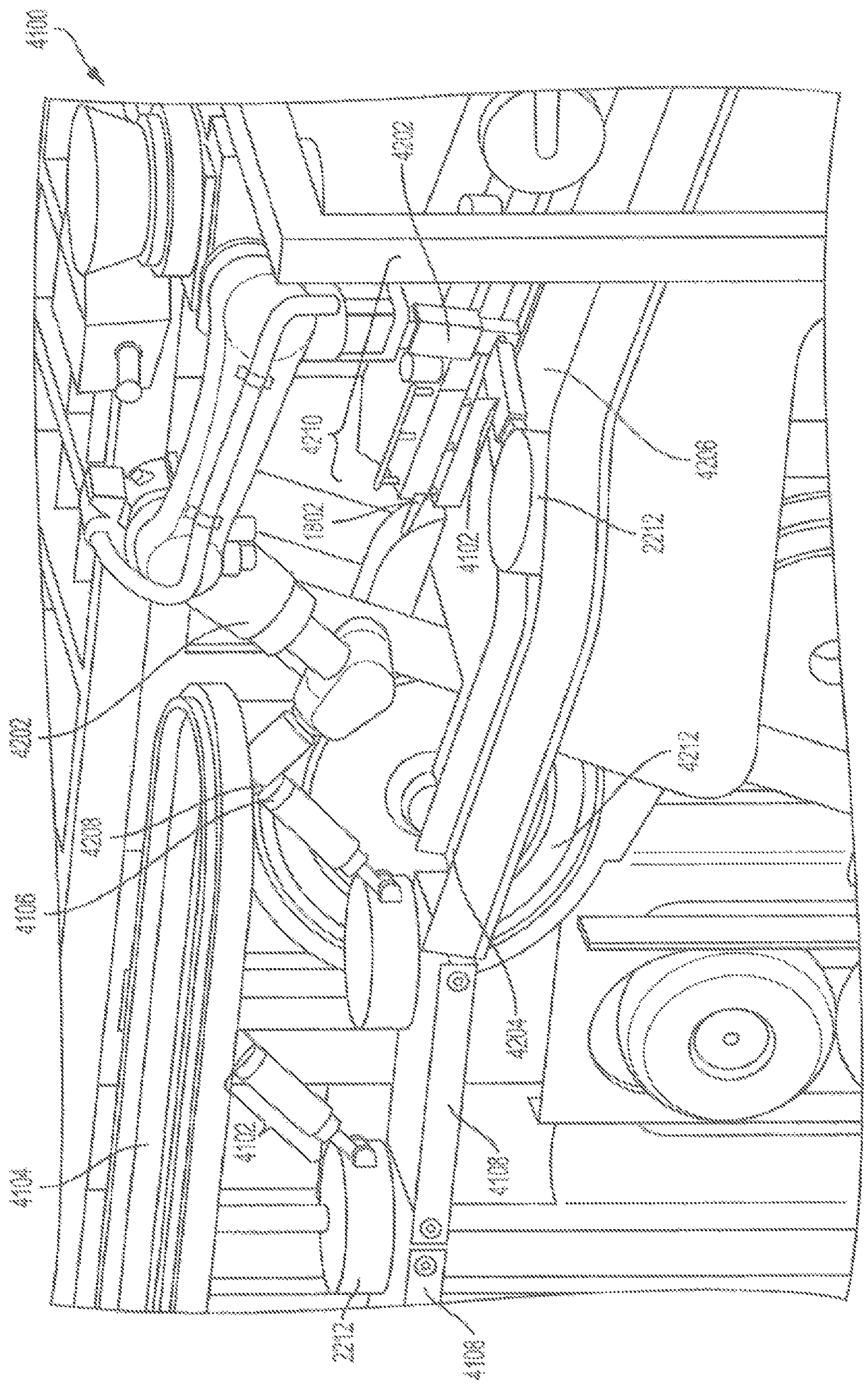

FIG. 42 depicts a system to mount seismic data acquisition units for deployment from a marine vessel. The system 4100 includes the tether assembly 4102 connected to the overhead conveyor 4104. The tether assembly 4102 can be connected to the seismic data acquisition unit 2212. The overhead conveyor 4104 can transport the combination of the tether assembly 4102 and the seismic data acquisition unit 2212. The overhead conveyor 4104 can pull the tether assembly 4102, which pulls the seismic data acquisition unit 2212 coupled to the connection block 2214 of the tether assembly 4102. The overhead conveyor 4104 can pull file seismic data acquisition unit 2212, via the tether assembly 4102, while the seismic data acquisition unit 2212 is in contact with the second conveyor 4108 such that the seismic data acquisition unit 2212 slides along the second conveyor 4108 while the tether assembly 4102 is pulled by the first conveyor 4104.

The system 4100 can include a table 4206. The table 4206 can be positioned on a duck of a marine vessel. The table 4206 can be coupled to the deck (e.g., deck 20 illustrated in FIG. 53) of the marine vessel (e.g., marine vessel 5 illustrated in FIG. 53). The table 4206 can be positioned on another type of vessel or vehicle. The table 4206 can be positioned on land or other surface.

The table 4206 can include a deployment block 4210 disposed on the table 4206. The deployment block 4210 can be disposed in a deployment position to receive a cable 1802. The deployment block 4210 can be disposed in the deployment position responsive to initiation of a deployment operation, prior to initiation of the deployment operation, during initiation of the deployment operation, or subsequent to initiation of the deployment position. For example, the deployment operation may initiate when spindles 102 are reeled in via cable 1802 and seismic data acquisition units are coupled to a tether assembly 200 and connector 104. The deployment block can be moved to the deployment position just-in-time, for example, at the moment when the spindle 104 and the connector 104 are approaching or entering the deployment block 4210. The deployment block 4210 can be constructed to deploy seismic date acquisition units 2212 into the aqueous medium (e.g., into water column 15 or surface of the water 10 illustrated in FIG. 53). The deployment block 4210 can move to a stowed position (e.g., way from the cable 1802) when not in use.

A retrieval block 4408 can be disposed on the table 4206. The retrieval block 4408 can be disposed in a retrieval position to receive the cable 1802. The retrieval block 4408 can be disposed in the retrieval position responsive to initiation of the retrieval operation, responsive to initiation of a retrieval operation, prior to initiation of the retrieval operation, during initiation of the retrieval operation, or subsequent to initiation of the retrieval position. For example, the retrieval block 4408 can be moved to the retrieval position as a spindle 102 approaches the table 4206 or deck 20 of the marine vessel 5. The retrieval block 4408 can be constructed to receive the seismic data acquisition units 2212 from the aqueous medium 10. The retrieval block 4408 can move to the stowed position.

The table 4206 can include a surface material having a coefficient of friction. The coefficient of friction of the surface of the table 4206 can facilitate deploying seismic data acquisition unit 2212. For example, the surface of the table 4206 can include a material having a coefficient of friction that prevents the seismic data acquisition unit 2212 from inadvertently sliding down the table 4206. The coefficient of friction between the seismic data acquisition unit 2212 and the surface of the table 4206 can generate a friction force that can hold the seismic data acquisition unit 2212 in a position, resist movement of the seismic data acquisition unit 2212, or slow the movement of the seismic data acquisition unit 2212. For example, the surface of the table 4206 can include one or more materials such as robber, sand, concrete, nickel, plastic, or aluminum. In some cases, the surface of the table 4206 can include protrusions that can create a frictional force. The protrusions can include one or more materials such as rubber, sand, concrete, nickel, plastic or aluminum. In some cases, the surface of the table 4206 can include a material or protrusions that can create the frictional force when the surface is wet (e.g., due to rainwater or sea water). Thus, the coefficient of friction can be greater than a threshold to create a frictional force (when dry or wet) to hold the seismic data acquisition unit 2212 in place as the connector 104 of the tether 4102 is coupled with the spindle 102 on the cable 1802. The threshold can be, for example, 0.2, 0.3, 0.4, 0.5, 0.6, 0.7, 0.8, 0.9, 1, 1.1, 1.2, 1.3 or more.

The table 4206 can include a rail guide 4204. The rail guide 4204 can facilitate guiding the seismic data acquisition unit 2212 from the second conveyor 4108 towards the table 4206 and the deployment block 4210 where the connector 104 of the tether assembly 4102 can be coupled to the spindle 102 on the deployment cable 1802.

The rail guide 4204 can include a single rail or multiple rails. For example, the rail guide 4204 can include a first rail and a second rail. The first rail of the rail guide 4204 can be separated from the second rail of the rail guide 4204 by a distance. The first rail can be parallel to the second rail. The distance separating the first rail from the second rail can be based on the diameter of the seismic data acquisition unit 2212.

The rail guide 4204 can have a height. The height can be based on a height of the seismic data acquisition unit 2212. The height of the rail guide 4204 can be sufficient to guide the seismic data acquisition unit 2212 without the seismic data acquisition unit 2212 traversing through a rail of the rail guide 4204. For example, the height of the rail guide 4204 can be a ratio of the height of the seismic data acquisition unit 2212, such as 1/10, 1/5, 3/10, 2/5, 1/2, 3/5, 7/10, 4/5, or greater. In some cases, the height of the rail guide 4204 can be greater than the height of the seismic data acquisition unit 2212. Thus, the robotic arm 4202 can use the rail guide on the deployment block 4206 to position at least one of the connector 104, tether 4102 (including tether assembly 4102) and seismic data acquisition unit 2212 on the deployment block 4210.

The system 4100 can include a deployment block 4210. The deployment block 4210 can include or refer to one or more components on the table 4206 that are designed, constructed and configured to guide the deployment cable 1802, receive the spindle 102, and allow the connector 104 of the tether 4102 to couple to the spindle 102. The deployment block 4210 can further guide the coupled assembly including the spindle 102, connector 104, tether 4102, and seismic data acquisition unit along the table 4206 and towards an edge of the marine vessel for deployment into an aqueous medium.

The deployment block 4210 can be attached to the table 4206. The deployment block 4210 can be coupled to the table 4210. The deployment block 4210 can be placed on a conveyor or track 4602 (illustrated in FIG. 46) on the table 4206 that can move or transport the deployment block 4210. For example, during a deployment process, the deployment block 4210 can be disposed in a deployment state in which the deployment block is positioned to receive the tether 4102 from the robotic band 4208 via the robotic arm 4202, the deployment cable 1802, and the spindle 102. The track 4602 can be coupled, fastened, attached, screwed, glued or otherwise connected to the table 4206 on the marine vessel (e.g., marine vessel 5 depicted in FIG. 53). The track 4602 can be integrated with the table 4205. The track can guide or move the deployment block 4210 or retrieval block 4408 from a stowed position to an online position adjacent the cable 1802 (e.g., a deployment position or retrieval position).

Figure 43:
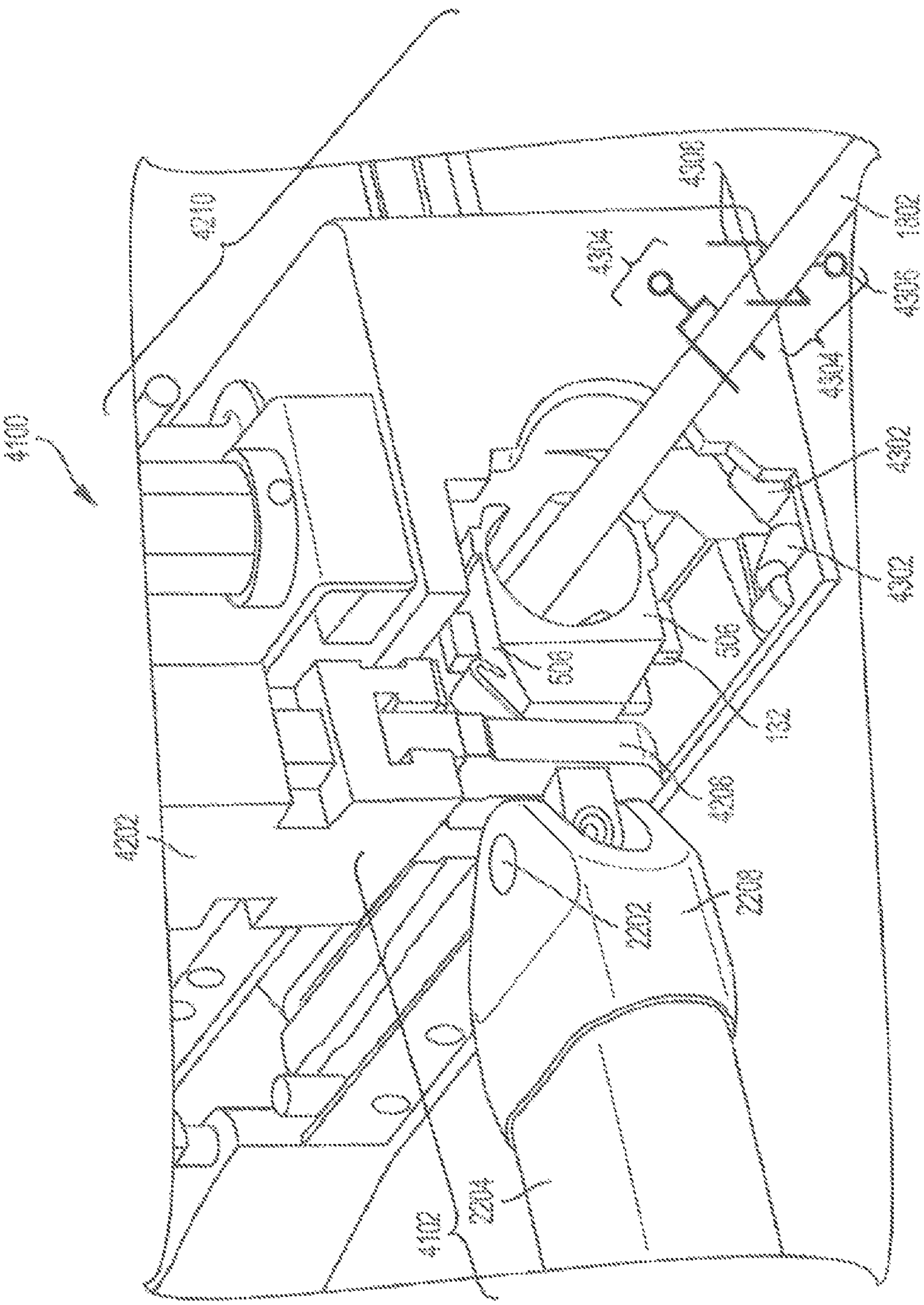

The deployment block 4210 can include a locking mechanism 4604 (illustrated in FIG. 46) configured to lock the deployment block 4210 in-line with the deployment cable 1802 during the deployment process. The locking mechanism 4604 can be enabled responsive to sensor data indicating that the deployment block 1802 is aligned with the cable 1802. The locking mechanism 4604 can include a latch, pin, magnet, bolt, hook, clamp, or other locking device. The deployment block 1802 can include at least one sensor 4302, as depicted in FIG. 43, that provides the sensor data.

During a retrieval process, the deployment block 4210 can be disposed in a stow position so as not to interfere with the retrieval process. The retrieval process can refer to retrieving seismic data acquisition units 2212 from the aqueous medium and decoupling the tether 4102 from the spindle 102. The retrieval process may use different equipment or components as compared to the deployment process, as depicted in FIGS. 49-52.

The system 4100 can include a robotic arm 4202. The robotic arm 4202 can include a robotic hand 4208. The robotic arm 4202 and robotic hand 4208 can decouple the tether assembly 4102 from the first conveyor 4104. The robotic arm 4202 can include or refer to a type of mechanical arm. Types of mechanical arms can include, for example, a Cartesian robot (e.g., a robot including an arm with three prismatic joints whose axes can be coincident with a Cartesian coordinate), a gantry robot, a cylindrical robot (e.g., a robot having axes that form a cylindrical coordinate system), a spherical robot (e.g., a robot whose axes form a polar coordinate system), a polar robot, a selective compliance assembly robot arm ("SCARA") (e.g., a robot having two parallel rotary joints to provide compliance in a plane), an articulated robot (e.g., a robot having an arm that has at least three rotary joints), a parallel robot (e.g., a robot whose arms have concurrent prismatic or rotary joints), or an anthropomorphic robot (e.g., a robot having a hand with independent members that can resemble fingers or a thumb). The robotic arm 4202 can include at least one typo of mechanical arm or a combination of types of mechanical arms.

The robotic arm 4202 can be programmable. The robotic arm 4202 can receive instructions from a processor. The robotic arm 4202 can include one or more mechanisms or be part of a more complex robot. The robotic arm 4202 can include one or more links or portions. The links of the robotic arm 4202 can be connected by joints that allow for rotational motion (e.g., articulate about a pivot point) or translation (or linear) displacement. The links of the robotic arm 4202 can form a kinematic chain. The end of the kinematic chain can include an end effector 4208 (or robotic hand 4208).

The system 4100 can include one or more processors configured to control the robotic arm 4202 to disengage or decouple the connector 104 of the tether assembly 4102 (or tether 4102) from the conveyor coupler 4106. The robotic hand 4208 can include movable members configured to move, grip or spin an object. The robotic hand 4208 can grab or hold the tether assembly 4102 or portion thereof and transport the tether assembly 4102. The robotic hand 4208 can include opposable members, clamps, latches, magnets, actuators, pneumonic actuators, or other mechanical coupling mechanisms. The system 4100 can include one or more processors configured to control the robotic hand 4208 to disengage or decouple the connector 104 of the tether assembly 4102 (or tether 4102) from the conveyor coupler 4106 and insert the connector 104 into a deployment block 4210 on a table 4206 on a deck of the marine vessel. The one or more processors can further control the robotic hand 4208 to align the connector 164 of the tether 4102 with the deployment cable 1802 that extends through the deployment block 4210.

The robotic arm 4202, including robotic hand 4208, can remove the tether assembly 4102 and the attached seismic data acquisition unit 2212 from the overhead conveyor 4101. The robotic arm 4202, including robotic hand 4208, can transport the tether assembly 4102 and the attached seismic data acquisition unit 2212 from the overhead conveyor 4101 towards the deployment block 4210.

For example, the connector 104 of the tether 4102 can include a disengagement mechanism. In some cases, the conveyor coupler 4106 can include the disengagement mechanism. The processor can instruct the robotic hand 4208 to trigger the disengagement mechanism to remove the tether assembly 4102 from the conveyor coupler 4106 prior to insertion of the connector 104 in the deployment block 4210. For example, conveyor coupler 4106 can include an engagement mechanism, such as a spring-loaded clamp (or other mechanical force device in contact with a clamp). The default state for the conveyor coupler 4106 (e.g., the spring-leaded clamp 4106) can be a closed state. The disengagement mechanism can include, for example, mechanically opening the spring-loaded clamp. In some cases, the default state for the conveyor coupler 4106 (e.g., spring-loaded clamp 4106) can be an open state. The spring-loaded clamp 4106 can be locked in the closed state when coupled to the tether assembly 4102. To decouple the tether assembly 4102 from the conveyor coupler 4106, the robotic hand 4208 can trigger the disengagement mechanism which can include unlocking the spring-loaded clamp 4106 so the spring (or other mechanical force device) exerts force on the clamp in a direction to open the clamp, and release the tether assembly 4102 from the overhead conveyor 4104. Thus, the conveyor coupler 4106 can include a disengagement mechanism and the processor can instruct the robotic hand 4208 to trigger the disengagement mechanism to release the tether 4102 from the conveyor coupler 4106 prior to insertion of the connector 104 in the deployment block 4210.

The system 4100 can include a deployment regulator device 4212. The deployment regulator device 4212 can deploy the cable 1802 to direct the spindle 102 towards the connector 104 of the tether 4102. The deployment regulator device 4212 can reduce the speed of the cable 1802 to facilitate coupling the spindle 102 to the connector 104 of the tether 4102. In some cases, the deployment regulator device 4212 can increase the speed of the cable 1802 to deploy the spindle 102 coupled to the tether 4102 and the seismic data acquisition unit 2212 off the marine vessel and into an aqueous medium on which the marine vessel floats. The deployment regulator device 4212 can control or adjust the speed, direction of movement, or acceleration of the cable 1802.

The deployment regulator device 4212 can include a motor-driven cable reel. The motor-driven cable reel can include a reel body, drive, and slip ring assembly. The cable 1802 can be wound around the reel body, and wound or unwound by the motor rotating the reel body.

The deployment regulator device 4212 can include a belt conveyor in contact with the deployment cable. The deployment regulator device 4212 can include at least two opposing belt conveyors in contact with the cable 1802. The belt conveyors can be driven by an engine or motor to convoy the cable 1802. The deployment cable 1802 in a separate location, such as below the deck of the marine vessel. The deployment cable 1802 can be stored in a spool, reel, or other container.

FIG. 43 depicts a system to mount seismic data acquisition units for deployment from a marine vessel. The system 4100 can include the deployment block 4210. As illustrated in FIG. 43, the robotic fingers 4208 can position the connector 104 and sleeve 506 of the tether assembly 4102 to the deployment block 4210. The robotic fingers 4208 can position the sleeve 506 such that the sleeve 506 is centered or substantially centered (e.g., within 1%, 2%, 3%, 4%, 5%, 6%, 7%, 10%, 12%, 15%, 20%, 25%, 30%, 40%, 50%) around the deployment cable 1802. In some cases, the sleeve 506 may not be centered around the deployment cable as long as an edge of the sleeve 506 can come into contact with an edge of the spindle 102. The spindle 102 can contact the sleeve 506 and align the sleeve 506 around the spindle 102. For example, the spindle 102 can be guided by an edge portion of the sleeve 506 towards the center of the sleeve 506.

The system 4100 can include at least one sensor 4302. The sensor 4302 can include a proximity sensor, a motion sensor, a transducer, a location sensor, ambient light sensor, image sensor, camera, receiver, or acoustic sensor. The sensor 4302 can receive or detect information or environmental parameters. The sensor 4302 can obtain alignment information or alignment data. The robotic arm 4202 can use or interface with the sensor 4302 to facilitate deploying the seismic data acquisition unit 2212, or retrieving the seismic data acquisition unit 2252. The sensor 4302 can provide alignment data to a processor. The processor can use the alignment data to provide instructions to the robotic arm 4202. The processor can use the alignment data to instruct the robotic arm to align the connector 104 (e.g., connector 104 including the sleeve 506) of the tether 4102 such that the cable is centered in the connector 104 (e.g., or sleeve 506 coupled to the connector 104).

The system 4100 can include at least one line-centering device 4304 configured to hold the cable 1802 steady as the spindle 102 couples to the connector 104 of the tether 4102. The line-centering device 4304 can include one or more members 4308 that contact the cable 1802 and hold the cable 1802. The line-centering device 4304 can prevent the cable 1802 from moving in a certain axis. For example, the line-centering device 4304 can hold the cable 1802 such that the cable 1802 cannot move in a horizontal plan or vertical plane. The line-centering device 4304 can be disposed adjacent to the cable 1802. The line-centering device 4304 can be coupled to a portion of the deployment block 4210. The line-centering device 4304 can be disposed in a first position to hold the cable 1802, and then withdrawn into a second position to allow the spindle 102 without blocking the spindle 102. For example, the line-centering device 4304 can be coupled to a surface of the deployment block 4210 or another fixture on the deployment block 4210. The line-centering device 4304 can be coupled with a hinge 4306, spring 4306, or other flexible pivot point such that a force excited on the line-centering device in a direction corresponding to an predetermined axis can cause the line-centering device to pivot said allow the spindle 102, or other object, to pass through.

Figure 44:
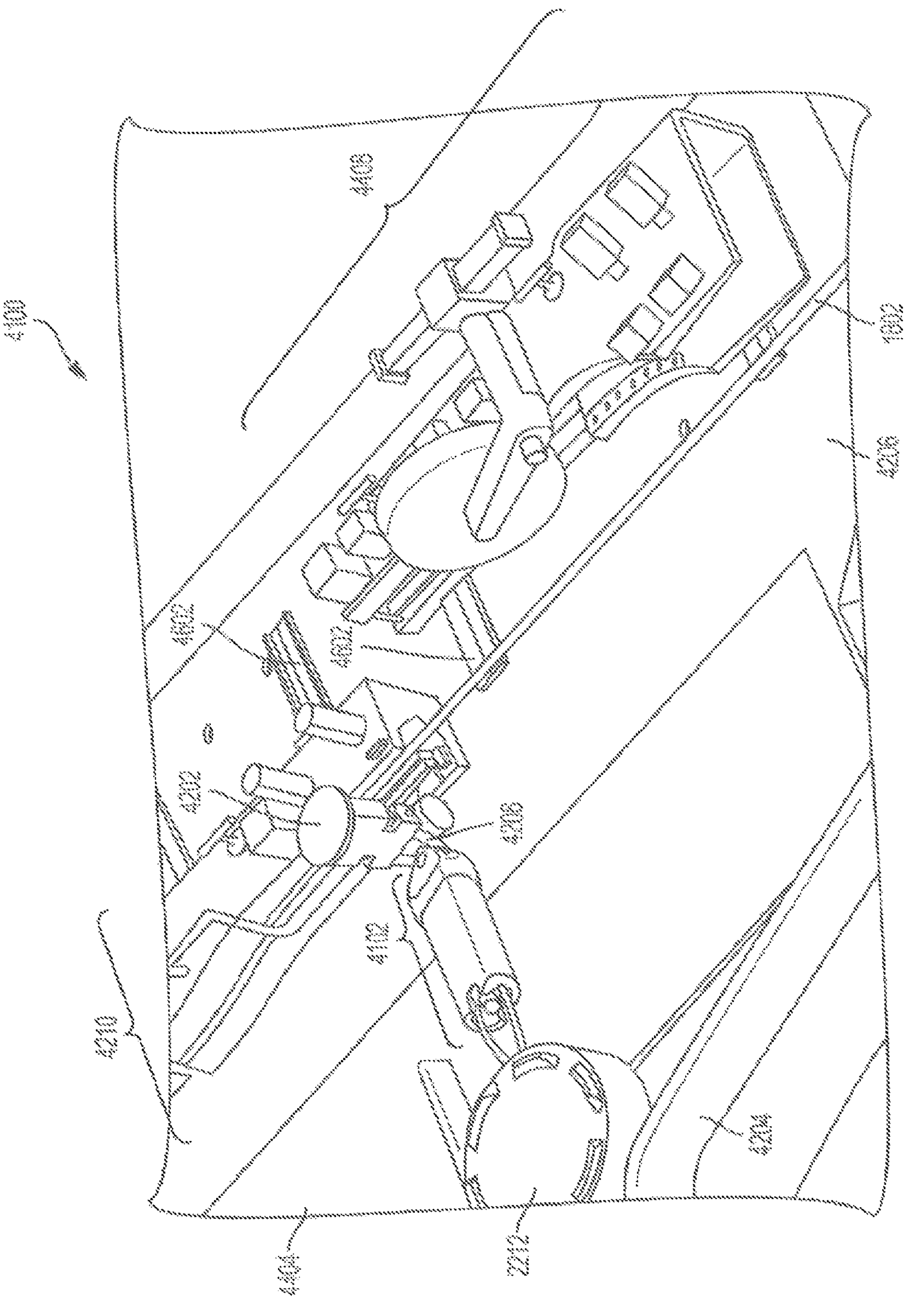

FIG. 44 depicts a system to mount seismic data acquisition units for deployment from a marine vessel. The system 4100 can include a table 4206. A deployment block 4210 and a retrieval block 4408 can be provided on the table 4206. Depending on the mode of operation (e.g., deployment operation or retrieval operation), the deployment block 4210 or the retrieval block 4408 can be disposed adjacent the cable 1802. The deployment block 4210 or the retrieval block 4408 can be positioned to receive the cable 1802. As illustrated in FIG. 44, the system 4100 can include a friction pad 4404. The friction pad 4404 can be configured to have a surface with a coefficient of friction that facilitates connecting the tether 4102 to the spindle 102. The friction pad 4404 can prevent the seismic data acquisition unit 2212 from sliding down the table 4206 while the tether 4102 is held in place by the robotic hand 4208 in order to couple the tether 4102 to the spindle 102.

Figure 45:
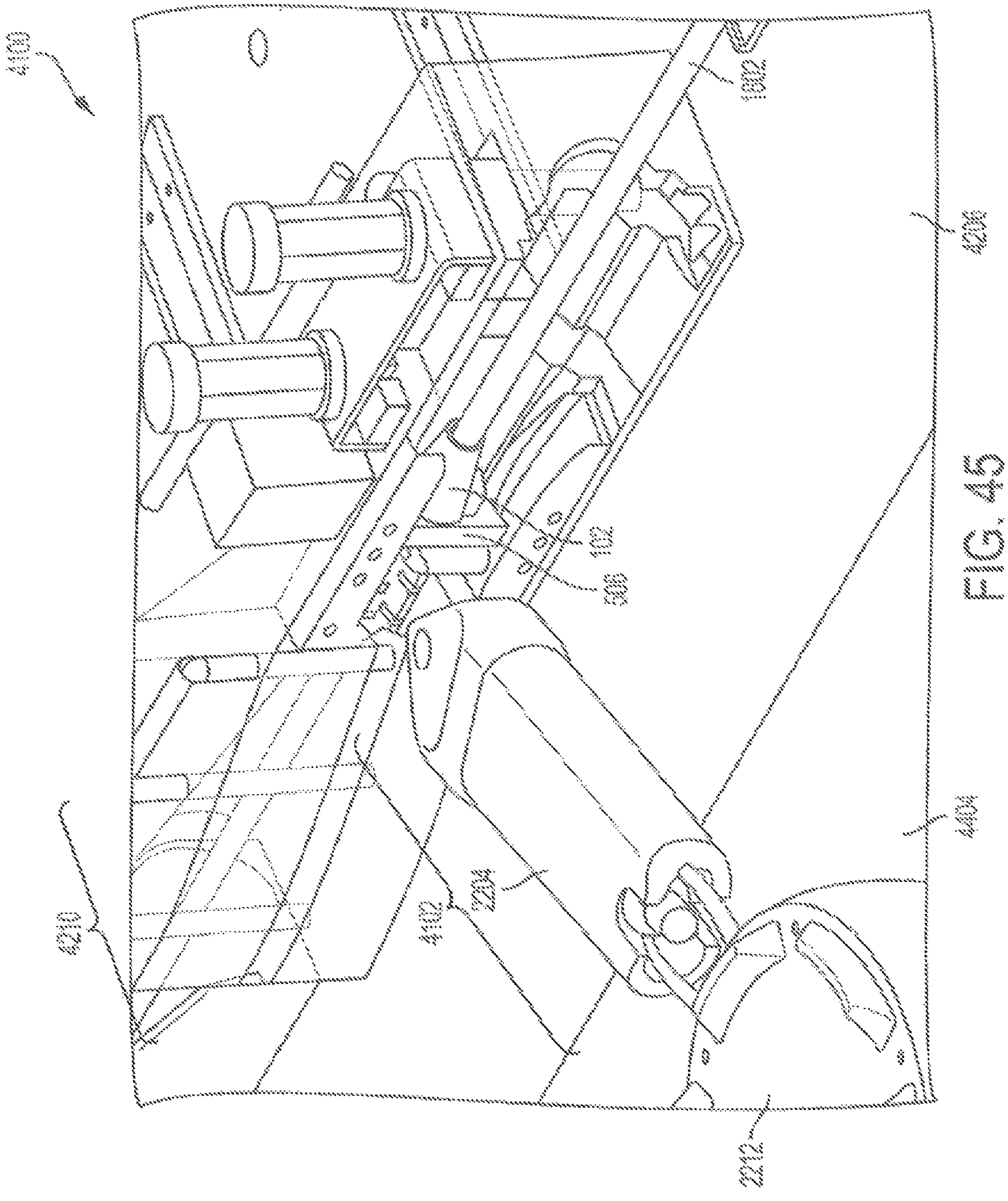

FIG. 45 depicts a system to mount seismic data acquisition units for deployment from a marine vessel. The system 4100 can include the deployment block 4210 and the tether assembly 4102. As illustrated in FIG. 45, the spindle 106 is inserted into the sleeve 506 of the tether assembly 4102. The seismic data acquisition unit 2212 can be held in place by the friction pad 4404 while the spindle 102 is coupled to the sleeve 506.

Figure 46:
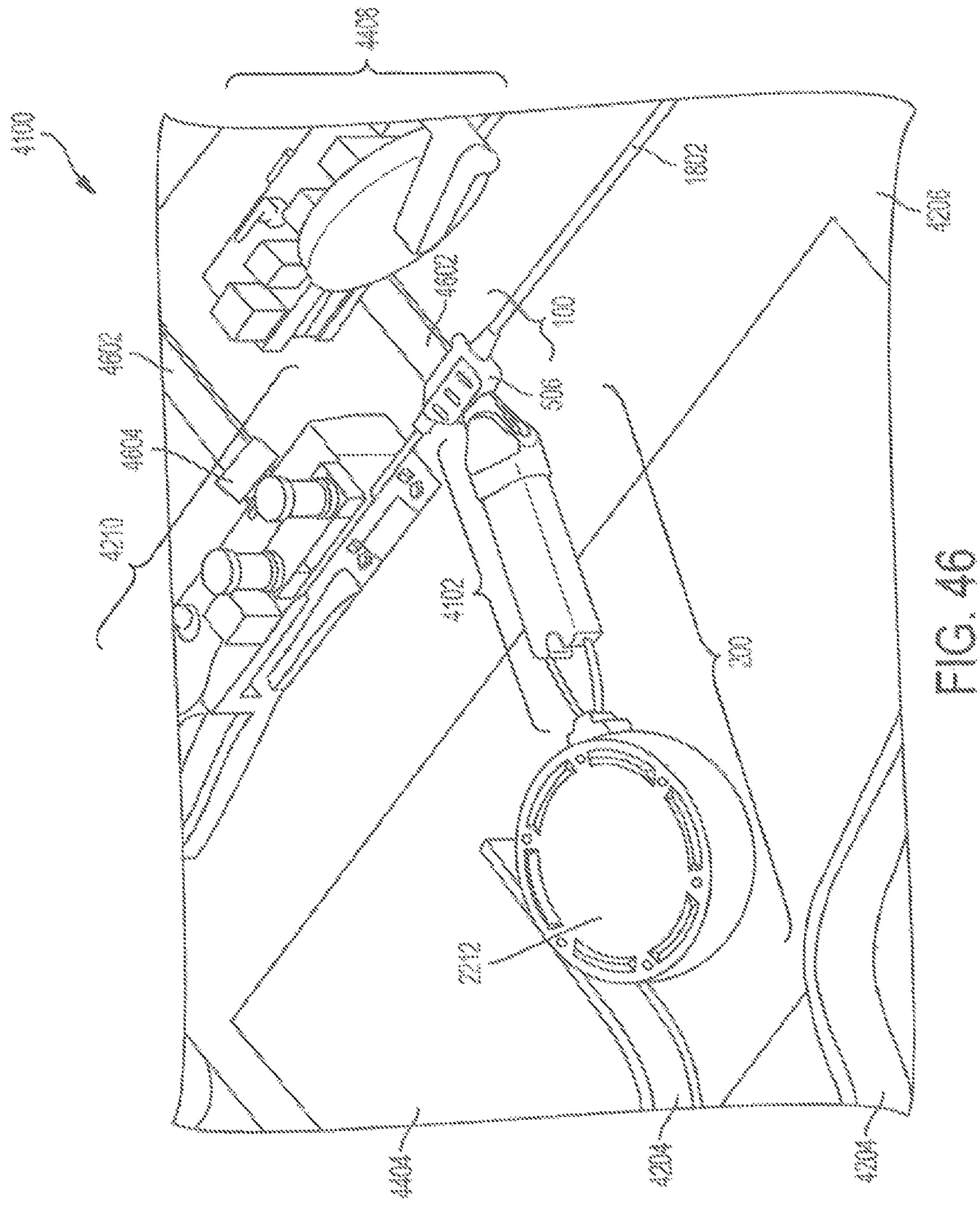

FIG. 46 depicts a system to mount seismic data acquisition units for deployment from a marine vessel. The system 4100 can include the deployment block 4210. The deployment block 4210 can be disposed on a track 4602 that can guide or move the deployment block 4210 from a first position to a second position. The first position can include a deployment position where the deployment block 4210 is adjacent the cable 1802. The second position can refer to a stowed or storage position where the deployment block 4210 is positioned away from the cable 1802 so as not to interfere with the retrieval process performed by the retrieval block 4408.

The guide 4204 can include two guide rails that are parallel during a first portion of the guide, and then become oblique during a second portion of the guide 4204 towards an end of the guide 4204. The seismic data acquisition unit 2212 can be released from the guide 4204 at the oblique end of the guide 4204.

As illustrated in FIG. 46, the tether assembly 4102 is coupled to the seismic data acquisition unit 2212. The tether assembly 4102 is coupled to the spindle 102. The tether assembly 4102 can include one or more component of functionality of system 200 and system 100.

Figure 47:
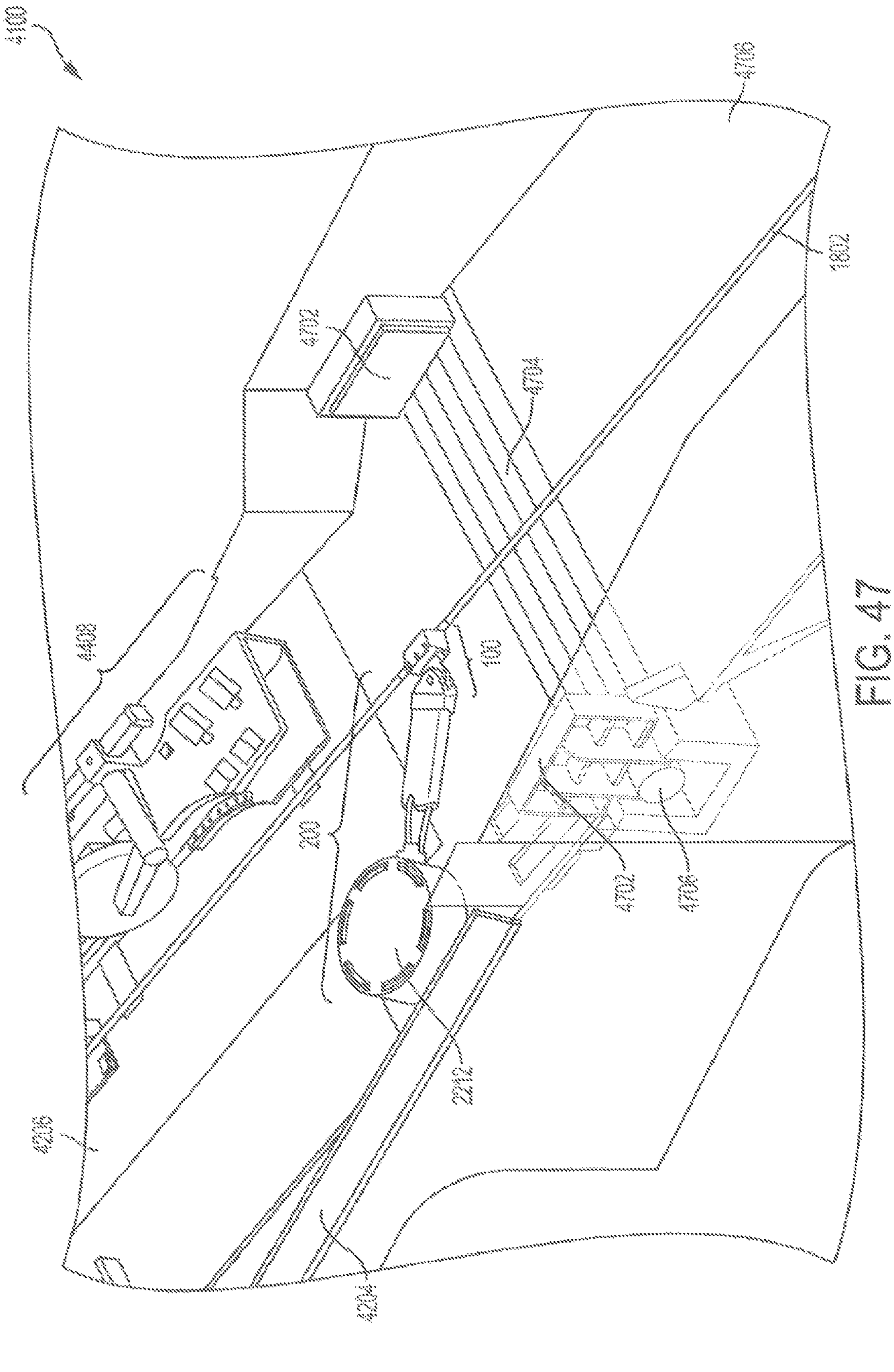

FIG. 47 depicts a system to mount seismic data acquisition units for deployment from a marine vessel. As illustrated in FIG. 47, the assembled systems 100 and 200 are transported via the deployment cable 1802. The seismic data acquisition unit 2212 can slide down the table 4206 alongside rail of the guide 4204 towards a deployment slide 4706 of deployment ramp 4706. The system 4100 can include the deployment slide 4706. The system 4100 can include a coupling mechanism 4704 that couples the deployment slide 4706 to the table 4206. The coupling mechanism 4704 can include a hinge, fastener, hook, or other mechanical configuration to attach the deployment slide 4706 to the table 4206. In some cases, the coupling mechanism 4704 can include a pivot point and be configured to lower or raise the deployment slide 4706.

The seismic data acquisition unit 2212 can be released from the guide 4204 at the oblique end of the guide 4204. If, however, the spindle 102 is not coupled to the connector 104, the deployment block 4210 can block the spindle 102 from deployment. For example, the system 4100 can include a locking ramp 4702 configured to block a spindle 102 disengaged from a connector 104 from deployment. The locking ramp 4702 can include opposing members 4702 configured to close and hold the spindle 102 to prevent the spindle from being deployed off the slide 4706. The opposing members 4702 can be controlled or moved by a conveyance mechanism 4706. The conveyance mechanism 4706 can include, for example, an actuator, a hydraulic cylinder, hydraulic press, pneumatic cylinder, pneumatic press, magnetic actuator, gears, motor-driven gears, or a pulley system.

Figure 48:
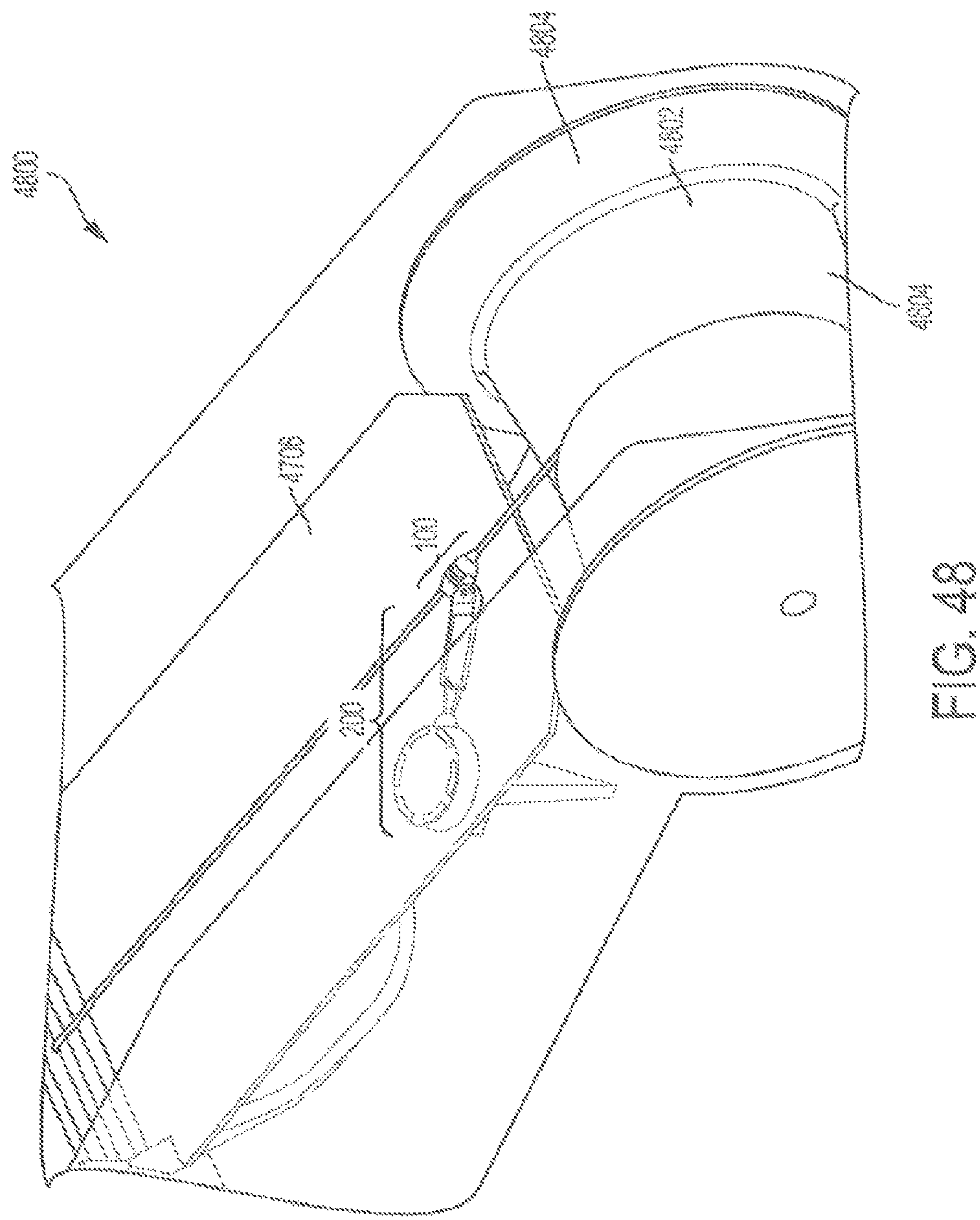

FIG. 48 depicts a system to deploy seismic data acquisition units from a marine vessel. The system 4800 can include the deployment slide 4706 and a deployment portion 4802. The deployment portion 4802 can include a drum, reel, flanged spool or other device configured to allow the seismic data acquisition unit 2212 to exit the deck of the vessel and enter the aqueous medium. The deployment portion 4802 can include flanged ends 4804 or guides 4804 that facilitate controlling, directing or otherwise aligning the cable 1802.

Figure 49:
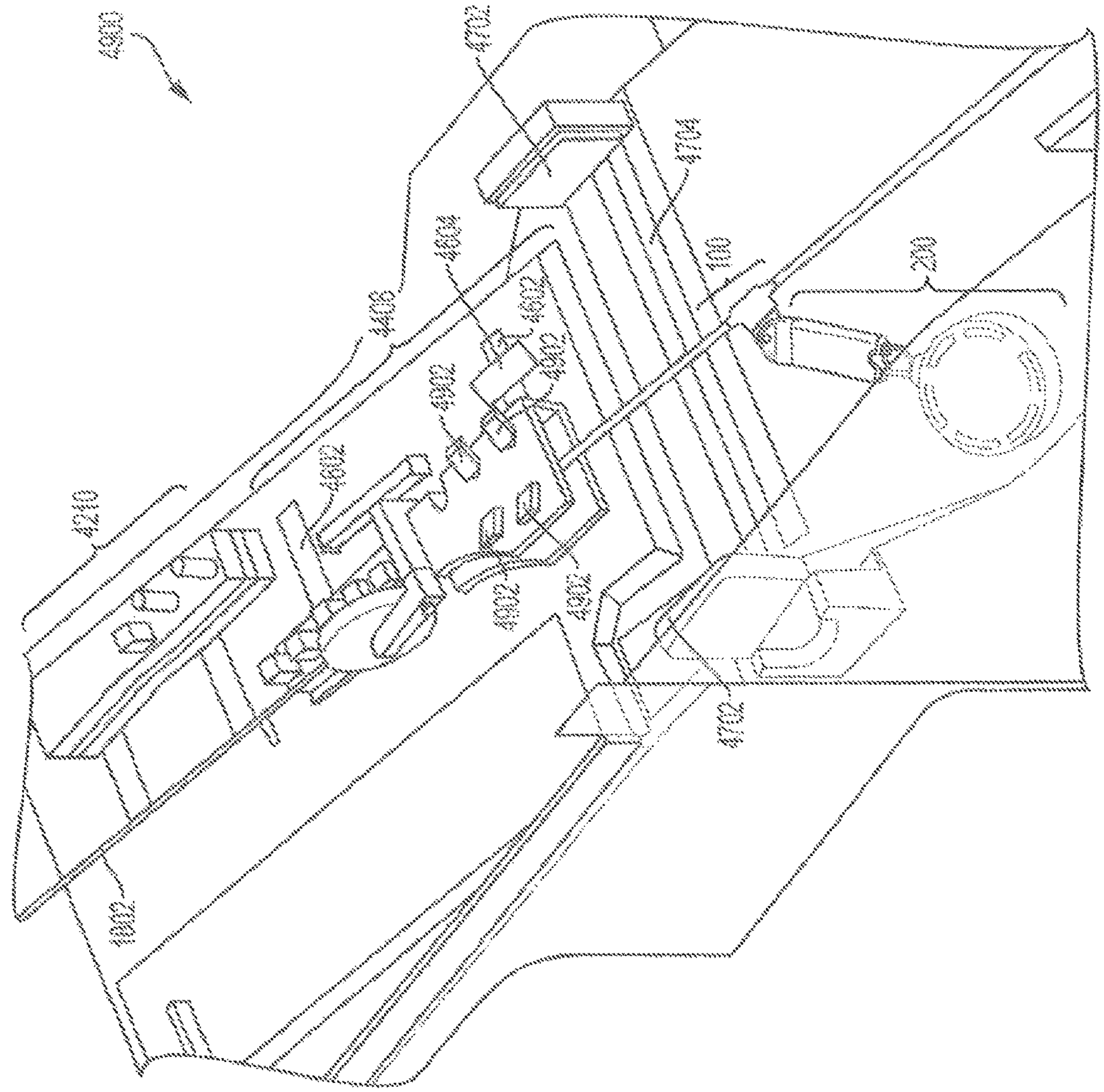
FIGS. 49-52 depict a system used to retrieve seismic data acquisition units from an aqueous medium, in accordance with some implementations.

FIG. 49 depicts a system to retrieve seismic data acquisition units from an aqueous medium. The system 4900 can include the retrieval block 4408. During the retrieval process, the retrieval block 4408 can be disposed in a retrieval position that is adjacent the cable 1802. However, during the retrieval process, the deployment block 4210 can be disposed in a position away from the deployment cable 1802 so as not to interfere with the retrieval process. The retrieval block 4408 can be disposed on at least one conveyor or track 4602 to transport the retrieval block 4408 from a first position (e.g., a stowed position) away from the cable 1802 to a second position adjacent the cable 1802. For example, a conveyor motor can move the retrieval block 4408 from the first position to the second position. A locking mechanism 4604 can lock or hold the retrieval block in the second position (e.g., retrieval position).

Figure 50:
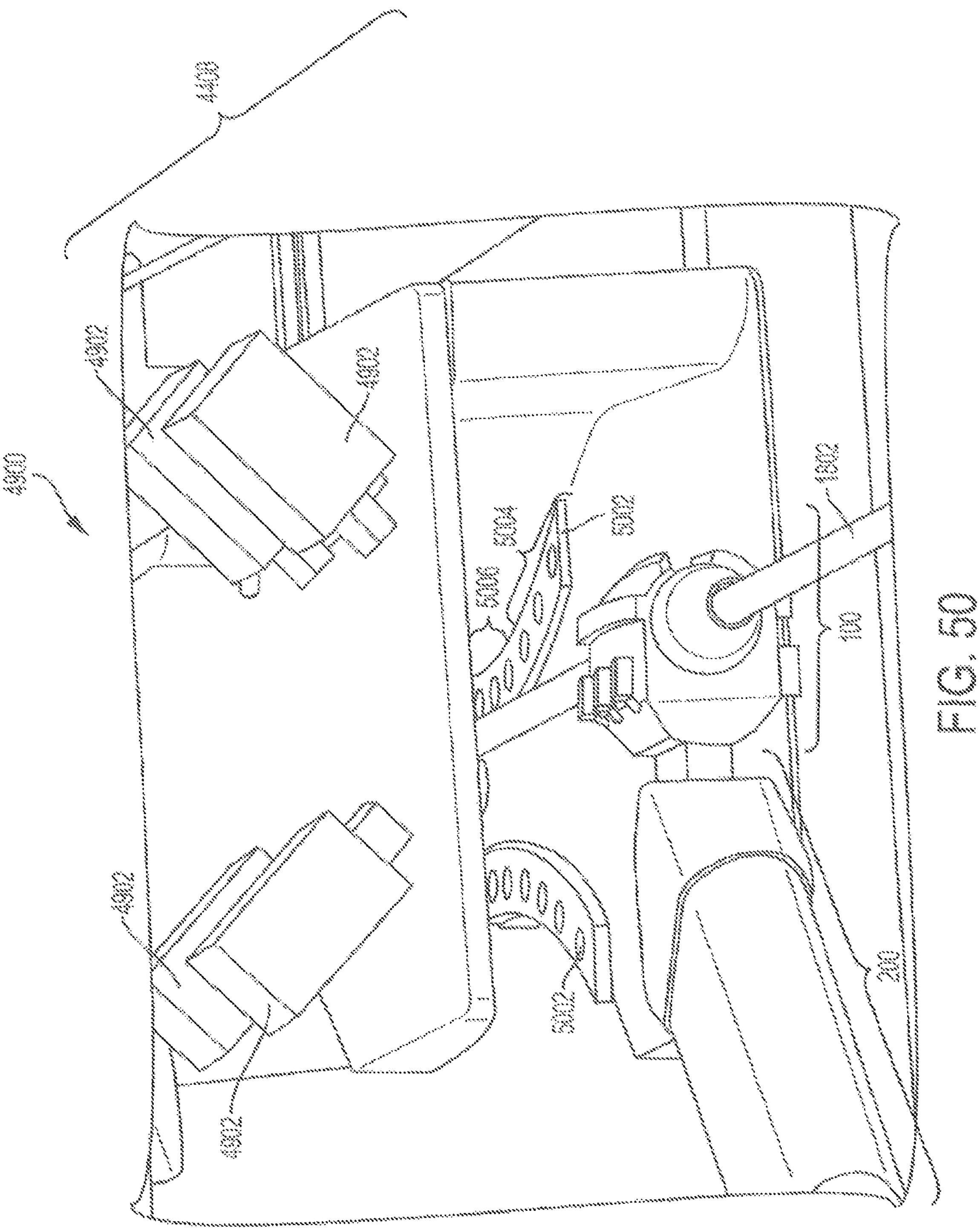

The system 4900 can include at least one debris removal device 4902 configured remove debris, seabed residue, salt water, sand or other materials from the system 100 or system 200. For example, the debris removal devices 4902 can clean or wash the spindle 102, the sleeve 506, the connector 104, the tether 4102, or the seismic data acquisition unit 2212. The system 4900 can include multiple debris removal devices 4902 positioned in a line, array, grid, or other configuration. For example, the system 4900 can include one or more pairs of pair of opposing debris removal devices as depicted in FIG. 49 or FIG. 50. The debris removal device 4902 can include at least one of a liquid spray jet, an airjet, brush, a blower, a nozzle, sponge, foam, or other material or device that can remove debris or salt water without damaging a component of the system. The debris removal device 4902 can removes debris from the spindle 102 prior to, during, or after disengagement from the connector 104.

FIG. 50 depicts a system to retrieve seismic data acquisition units from an aqueous medium. The system 4900 can include the retrieval block 4408. The system 4900 can include retrieval guide rails 5002 to guide system 100, including the spindle 102 and connector 104, into the retrieval block 4408. The one or more guides 5002 can include a guide entrance 5004 or opening where the spindle 102 enters the guide. The guide entrance 5004 can be wider then a second portion 5006 or main portion of the guide beyond the entrance. For example, the guide entrance 5004 can be wider than a main portion 5006 of the guide rails 5002, where the spindle 102 encounters the main portion 5006 of the guide rails 5002 after entering the guide entrance 5004.

Figure 53:
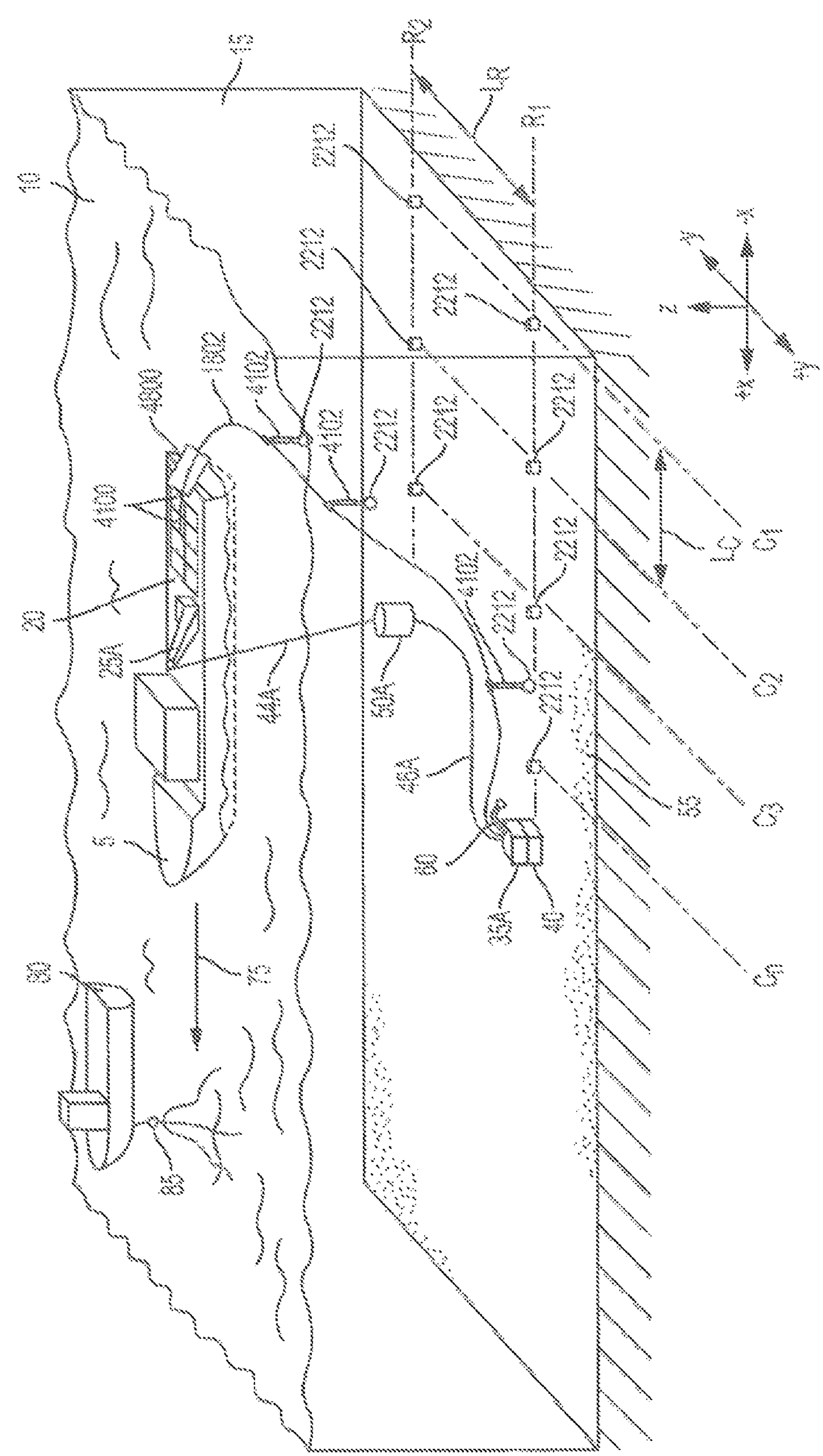
FIG. 53 depicts an isometric schematic view of an implementation of a seismic operation in deep water.

For example, the retrieval block 4408 can be disposed in a retrieval position on a deck (e.g., deck 20 illustrated in FIG. 53) of a marine vessel (e.g., marine vessel 5 illustrated in FIG. 53). The retrieval block 4408 can be disposed in the retrieval position adjacent to the cable 1802 for deployment of seismic data acquisition units 2212 from the marine vessel 5 into the aqueous medium (e.g., below the surface 10 of the water or into the water column 15 illustrated in FIG. 53). The system can include retrieval guide rails 5002 disposed in the retrieval block 4408 to guide a spindle 102 coupled to the cable 1802 into the retrieval block 4408. The spindle 102 coupled to a connector 104 as part of system 100. The connector 104 can be coupled to a tether as part of system 200. And the tether assembly 200 can be coupled to a seismic data acquisition unit 2212. The system can include a decoupler system 5102 to disengage the spindle 102 from the connector 104. The cable 1802 and the spindle 104 can be reeled in through the guide rails 5002 of the retrieval block 4408. For example, a spool engine, reel engine, driver, motorized wheel, pulley or other system can pull or reel in the cable 1802. A robotic arm 4202 can remove the connector 104 from the guide rails 5002 on the retrieval block 4408. The connector 104 can be coupled to the tether assembly 200 and the seismic data acquisition unit 2212.

Figure 51:
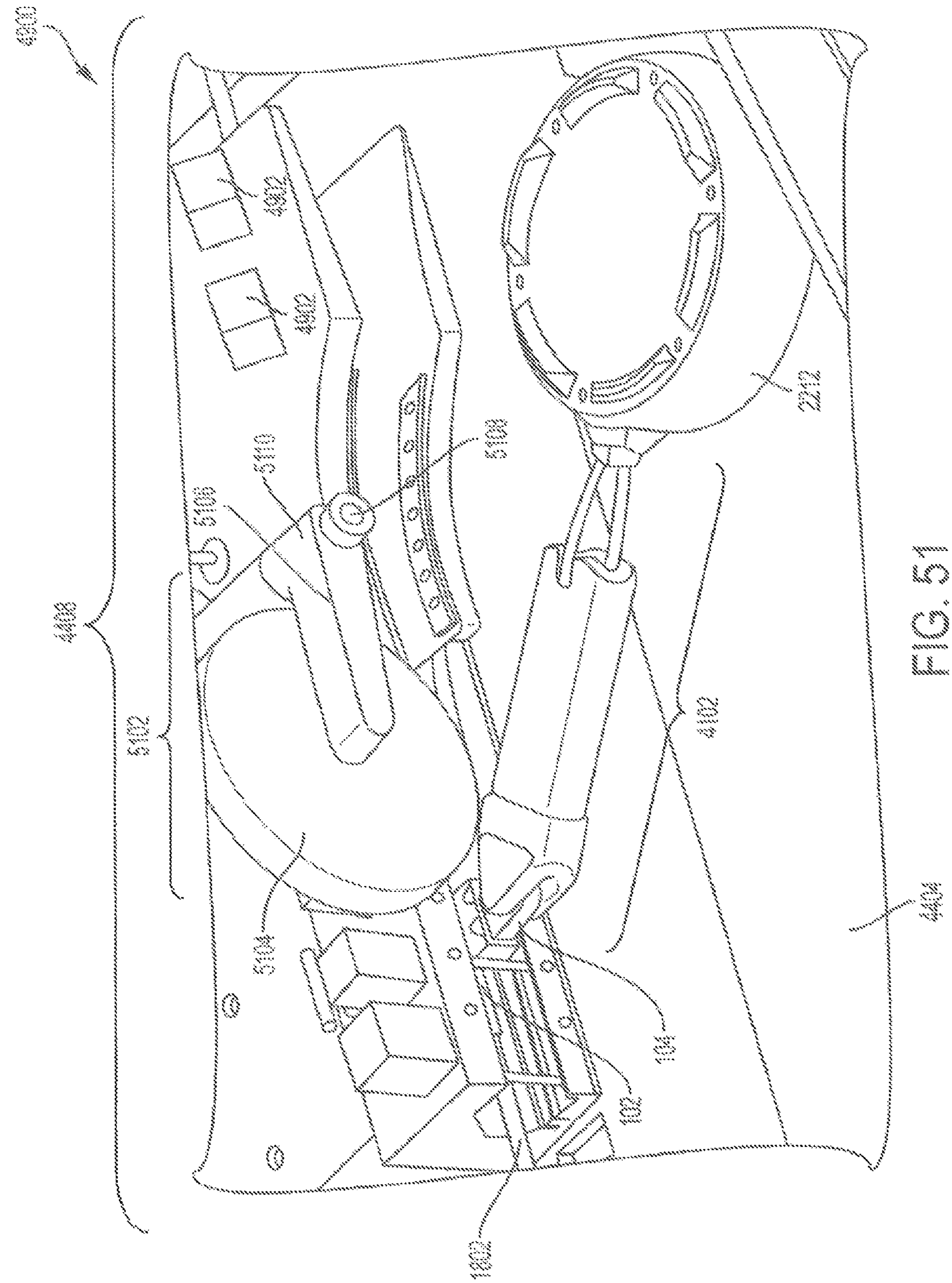

FIG. 51 depicts a system to retrieve seismic data acquisition units from an aqueous medium. The system 4900 can include the retrieval block 4408. The retrieval block 4408 can include a decoupler 5102. The decoupler 5102 can disengage, decouple, detach, or release the spindle 102 from the connector 104. In some cases, the connector 104 can include the sleeve 506. The decoupler 5102 can detach the spindle 102 from the sleeve 506 and the connector 104.

The decoupler 5102 can include a disk 5104, wheel 5104, or rotating device 5104. In some cases, the object 5104 can include a blunt object, blunt material, a hammer, or a weight. The decoupler 5102 can include a lever arm 5106. The decoupler can include a pin 5108 that defines a pivot point about which the lever arm 5106 can articulate. The pin 5108 can couple the lever arm 5106 to a base 5110.

The disk 5104 can be lowered by the lever arm 5106 articulating about pivot point 5108. The disk 5104 can be lowered onto the tumblers 132 of the connector 104 or sleeve 506. To detach the connector 104 from the spindle 102, the decoupler 5104 can release the tumblers 132 of the connector 104 such that the tumblers 132 disengage from the grooves on the spindle 102. When the tumblers 132 are released, the spindle 102 can separate from the connector 104 or sleeve 506. The spindle 102 can continue to be coupled to the cable 1802 and travel along with the cable 1802. However, the tether 4102 and seismic data acquisition unit 2212 may stop moving. The seismic data acquisition unit 2212 can be positioned in contact with the friction pad 4404, which may slow or stop the movement of the seismic data acquisition unit 2212.

Figure 52:
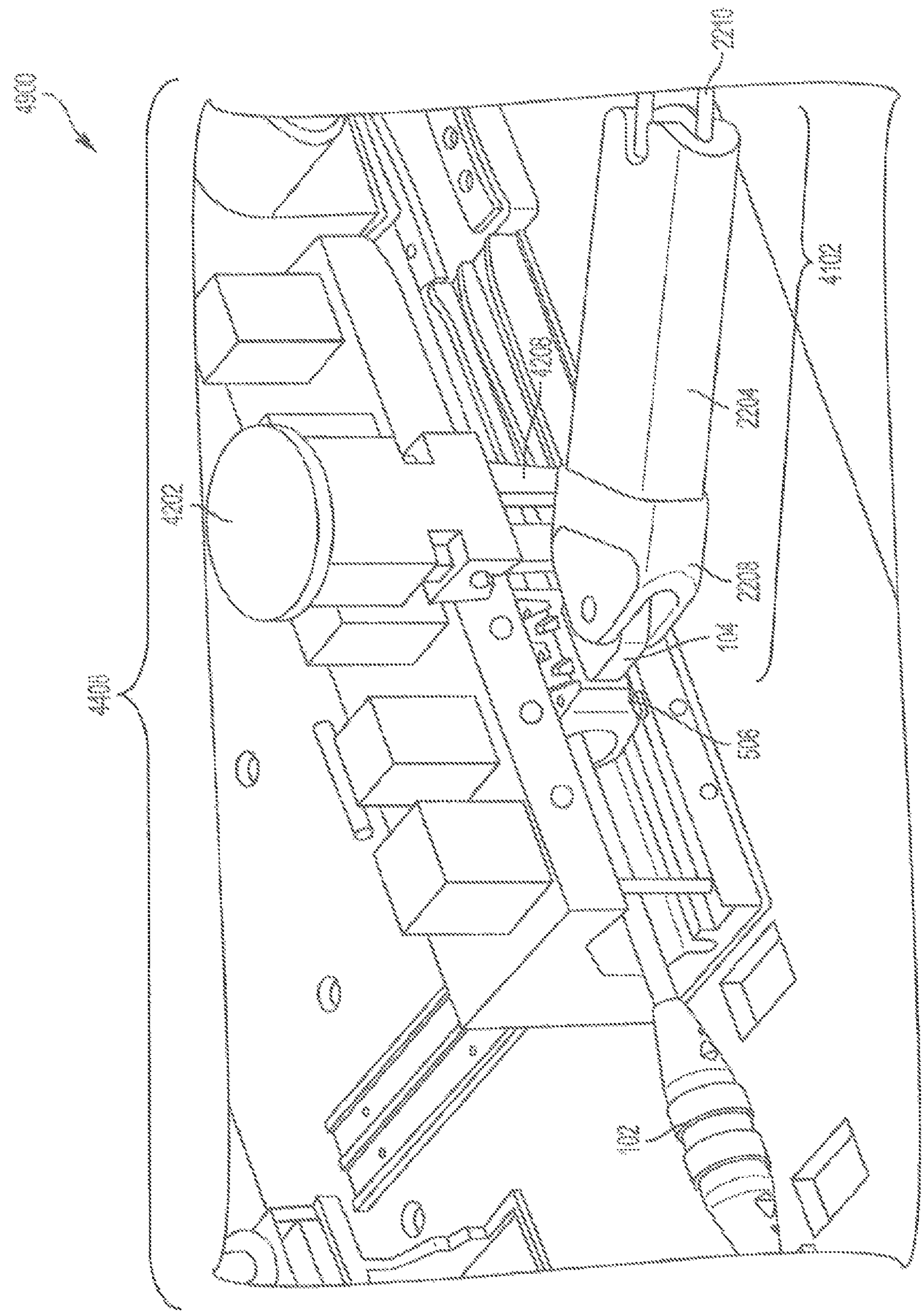

FIG. 52 depicts a system to retrieve seismic data acquisition units from an aqueous medium. The system 4900 can include the deployment block 4408. As illustrated in FIG. 52, the spindle 102 is detached or separated from the connector 104 or sleeve 506. The spindle 102 can travel with the cable 1802 that is reeled in. The robotic arm 4202 and robotic hand 4208 can approach the disconnected tether 4302. The robotic hand 4208 can grab or hold the tether 4102 (e.g., at the connector 104). The robotic arm 4202 can then move the tether 4102 back to a storage position. In some cases, the robotic arm 4202 can connect the tether 4102 back to the overhead coupling mechanism 4106 and the overhead conveyor 4104. When the robotic arm 4202 connects the tether 4102 back to the overhead conveyor 4104, the seismic data acquisition unit 2212 can still be coupled to the tether 4102. The seismic data acquisition unit 2212 can be placed on a lower conveyor 4108 as depicted in FIG. 41.

FIG. 53 is an isometric schematic view of an implementation of a seismic operation in deep water facilitated by a first marine vessel 5. FIG. 53 is a non-limiting illustrative example of a marine environment in which the systems and methods of the present disclosure can deploy or retrieve seismic data acquisition units.

By way of example, FIG. 53 illustrates a first vessel 5 positioned on a surface 10 of a water column 15 and includes a deck 20 which supports operational equipment. At least a portion of the deck 20 includes space for the deployment system 4100, a plurality of sensor device racks, the table 4206, an overhead conveyor 4104, a second conveyor 4108, a robotic arm 4202, the system 100, the system 200, the system 300, the system 4800, the system 4900, or one or more component depicted in FIGS. 1-52. The sensor device racks may also include data retrieval devices or sensor recharging devices.

The deck 20 also includes one or more cranes 25A attached thereto to facilitate transfer of at least a portion of the operational equipment, such as an ROV, from the deck 20 to the water column 15. For example, a crane 25A coupled to the deck 20 is configured to lower and raise an ROV 35A, which transfers and positions one or more sensor devices 2212 on a seabed 55. The seabed 55 can include a lakebed 55, ocean floor 55, or earth 55. The ROV 35A is coupled to the first vessel 5 by a tether 46A and an umbilical cable 44A that provides power, communications, and control to the ROV 35A. A tether management system (TMS) 50A is also coupled between the umbilical cable 44A and the tether 46A. The TMS 50A may be utilized as an intermediary, subsurface platform from which to operate the ROV 35A. For most ROV 35A operations at or near the seabed 55, the TMS 50A can be positioned approximately 50 feet above seabed 55 and can pay out tether 46A as needed for ROV 35A to move freely above seabed 55 in order to position and transfer seismic sensor devices 2212 thereon.

A crane 25B may be coupled (e.g., via a latch, anchor, nuts and bolts, screw, suction cup, magnet, or other fastener) to a stem of the first vessel 5, or other locations on the first vessel 5. Each of the cranes 25A, 25B may be any lifting device or launch and recovery system (LARS) adapted to operate in a marine environment. The cable 1802 can be an umbilical, a tether, a cord, a wire, a rope, and the like, that is configured to supply, support, transfer, convey, transport or retrieve seismic data acquisition units 2212.

The ROV 35A can include a seismic sensor device storage compartment 40 that is configured to store one or more seismic sensor devices 2212 therein for a deployment or retrieval operation. The storage compartment 40 may include a magazine, a rack, or a container configured to store the seismic sensor devices. The storage compartment 40 may also include a conveyer, such as a movable platform having the seismic sensor devices thereon, such as a carousel or linear platform configured to support and move the seismic sensor devices 2212 therein. In one implementation, the seismic sensor devices 2212 may be deployed on the seabed 55 and retrieved therefrom by operation of the movable platform. The ROV 35A may be positioned at a predetermined location above or on the seabed 55 and seismic sensor devices 2212 are rolled, conveyed, or otherwise moved out of the storage compartment 40 at the predetermined location. The seismic sensor devices 2212 may be deployed and retrieved from the storage compartment 40 by a robotic device 60, such as a robotic arm, an end effector or a manipulator, disposed on the ROV 35A.

The seismic sensor device 2212 may be referred to as seismic data acquisition unit 2212 or node 2212. The seismic data acquisition unit 2212 can record seismic data. The seismic data acquisition unit 2212 may include one or more of at least one geophone, at least one hydrophone, at least can power source (e.g., a battery, external solar panel), at least one clock, at least one tilt meter, at least one environmental sensor, at least one seismic data recorder, at least global positioning system sensor, at least one wireless or wired transmitter, at least one wireless or wired receiver, at least one wireless or wired transceiver, or at least one processor. The seismic sensor device 2212 may be a self-contained unit such that all electronic connections are within the unit, or one or more components can be external to the seismic sensor device 2212. During recording, the seismic sensor device 2212 may operate in a self-contained manner such that the node does not require external communication or control. The seismic sensor device 2212 may include several geophones and hydrophones configured to detect acoustic waves that are reflected by subsurface lithological formation or hydrocarbon deposits. The seismic sensor device 2212 may further include one or more geophones that are configured to vibrate the seismic sensor device 2212 or a portion of the seismic sensor device 2212 in order to detect a degree of coupling between a surface of the seismic sensor device 2212 and a ground surface. One or more component of the seismic sensor device 2212 may attach to a gimbaled platform having multiple degrees of freedom. For example, the clock may be attached to the gimbaled platform to minimize the effects of gravity on the clock.

Using the cable 1802 to transfer seismic sensor devices 2212 to the ROV 35A at a subsurface location reduces the time required to place the seismic sensor devices 2212 on the seabed 55, or "planting" time, as the ROV 35A is not raised end lowered to the surface 10 for seismic sensor device reloading. Further, mechanical stresses pieced on equipment utilized to lift and lower the ROV 35A are minimized as the ROV 35A may be operated below the surface 10 for longer periods. The reduced lifting and lowering of the ROV 35A may be particularly advantageous in foul weather or rough sea conditions. Thus, the lifetime of equipment may be enhanced as the ROV 35A and related equipment are not raised above surface 10, which may cause the ROV 35A and related equipments to be damaged, or pose a risk of injury to the vessel personnel.

Likewise, in a retrieval operation, the ROV 35A can utilize commands from personnel on the first vessel 5 to retrieve each seismic sensor device 2212 that was previously placed on seabed 55. The retrieved seismic sensor devices 2212 are placed into the storage compartment 40 of the ROV 35A. The ROV 35A can be sequentially positioned adjacent each seismic sensor device 2212 on the seabed 55 and the seismic sensor devices 2212 are rolled, conveyed, or otherwise moved from the seabed 55 to the storage compartment 40. The seismic sensor devices 2212 can be retrieved from the seabed 55 try a robotic device 60 disposed on the ROV 35A.

The first vessel 5 can travel in a first direction 75, such as in the +X direction, which may be a compass heading or other linear or predetermined direction. The first direction 75 may also account for or include drift caused by wave action, current(s) or wind speed and direction. The plurality of seismic sensor devices 2212 can be placed on the seabed 55 in selected locations, such as a plurality of rows Rn in the X direction (R1 and R2 are shown) or columns Cn in the Y direction (C1-Cn are shown), wherein n equals an integer. The rows Rn and columns Cn can define a grid or array, wherein each row Rn (e.g., R1-R2) comprises a receiver line in the width of a sensor array (X direction) or each column Cn comprises a receiver line in a length of the sensor array (Y direction). The distance between adjacent sensor devices 2212 in the rows is shown as distance LR and the distance between adjacent sensor devices 2212 in the columns is shown as distance LC. While a substantially square pattern is shown, other patterns may be formed on the seabed 55. Other patterns include non-linear receiver lines or non-square patterns. The patter(s) may be predetermined or result from other factors, such as topography of the seabed 55. The distances LR and LC can be substantially equal and may include dimensions between about 60 meters to about 400 meters, or greater. The distance between adjacent seismic sensor devices 2212 may be predetermined or result from topography of the seabed 55 as described above.

The first vessel 5 is operated at a speed, such as an allowable or safe speed for operation of the first vessel 5 and any equipment being towed by the first vessel 5. The speed may take into account any weather conditions, such as wind speed and wave action, as well as currents in the water column 15. The speed of the vessel may also be determined by any operations equipment that is suspended by, attached to, or otherwise being towed by the first vessel 5. For example, the speed can be limited by the drag coefficients of components of the ROV 35A, such as the TMS 50A and umbilical cable 44A, as well as any weather conditions or currents in the water column 15. As the components of the ROV 35A are subject to drag that is dependent on the depth of the components in the water column 15, the first vessel speed may operate in a range of leas than about 1 knot. When two receiver lines (rows R1 and R2) are being laid, for example, the first vessel includes a first speed of between about 0.2 knots and about 0.6 knots. The first speed can include an overage speed of between about 0.25 knots, which includes intermittent speeds of less than 0.25 knots and speeds greater than about 1 knot, depending on weather conditions, such as wave action, wind speeds, or currents in the water column 15.

During a seismic survey, one receiver line, such as row R1 may be deployed. When the single receiver line is completed a second vessel 80 can be used to provide a source signal. In some cases, the first vessel or other device can provide the source signal. The second vessel 80 is provided with a source device or acoustic source device 85, which may be a device capable of producing acoustical signals or vibrational signals suitable for obtaining the survey data. The source signal propagates to the seabed 55 and a portion of the signal is reflected back to the seismic sensor devices 2212. The second vessel 80 may be required to make multiple passes, for example at least four passes, per a single receiver line (row R1 in this example). During the time the second vessel 80 is making the passes, the first vessel 5 continues deployment of a second receiver line. However, the time involved in making the passes by the second vessel 80 is much shorter than the deployment time of the second receiver line. This causes a lag time in the seismic survey as the second vessel 80 sits idle white the first vessel 5 is complying the second receiver line.

The first vessel 5 can use one ROV 35A to lay sensor devices to form a first set of two receiver lines (rows R1 and R2) in any number of columns, which may produce a length of each receiver line of up to and including several miles. The two receiver lines (rows R1 and R2) can be substantially (e.g., +/−10%) parallel. When a single directional pass of the first vessel 5 is completed and the first set (rows R1, R2) of seismic sensor devices 2212 are laid to a predetermined length, the second vessel 80, provided with the source device 85, is utilized to provide the source signal. The second vessel 80 can make eight or more passes along the two receiver lines to complete the seismic survey of the two rows R1 and R2.

While the second vessel 80 is shooting along the two rows R1 and R2, the first vessel 5 may turn 180 degrees and travel in the X direction in order to lay seismic sensor devices 2212 in another two rows adjacent the rows R1 and R2, thereby forming a second set of two receiver lines. The second vessel 80 may them make another series of passes along the second set of receiver lines while the first vessel 5 turns 180 degrees to travel in the +X direction to lay another set of receiver lines. The process may repeat until a specified area of the seabed 55 has been surveyed. Thus, the idle time of the second vessel 80 is minimized as the deployment time for laying receiver lines is cut approximately in half by deploying two rows in one pass of the vessel 5.

Although only two rows R1 and R2 are shown, the sensor device 2212 layout is not limited to this configuration as the ROV 35A may be adapted to layout more than two rows of sensor devices in a single directional tow. For example, the ROV 35A may be controlled to lay out between three and six rows of sensor devices 2212, or an even greater number of rows in a single directional tow. The width of a "one pass" run of the first vessel 5 to layout the width of the sensor array can be limited by the length of the tether 46A or the spacing (distance LR) between sensor devices 2212.

Figure 54:
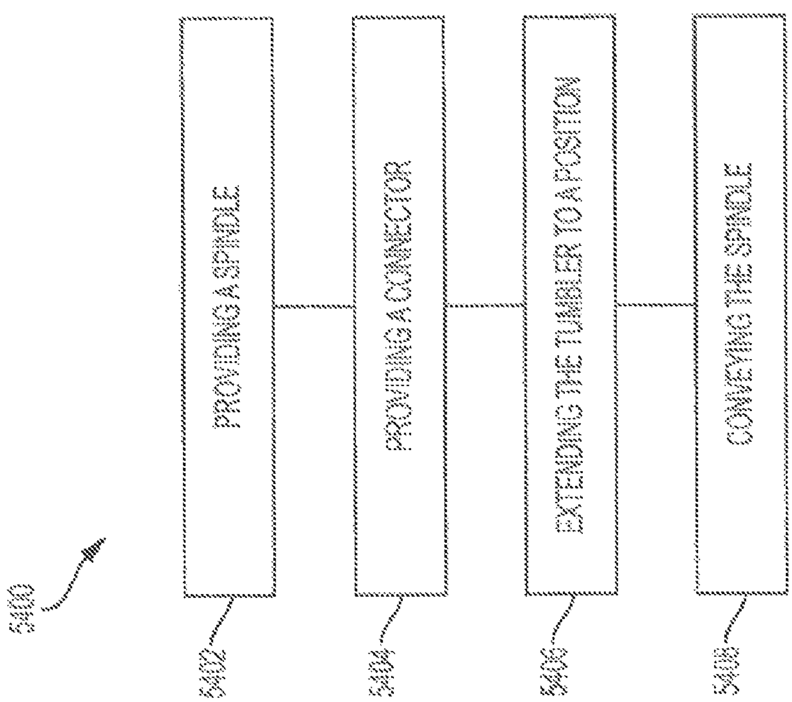
FIG. 54 is a flow diagram of a method of deploying seismic data acquisition units from a marine vessel, in accordance with an implementation.

FIG. 54 is a flow diagram of a method of deploying seismic data acquisition units from a marine vessel. The method 5400 can be performed or utilize one or more system, component, element, module, or device depicted in FIGS. 1-53 including, for example, deployment system 4100, system 100, system 200, system 300, system 4800, or system 4900. At 5402, the method 5400 can include providing a spindle. At 5404, the method 5400 can include providing a connector. At 5406, the method 5400 can include extending a tumbler to a position. At 5408, the method can include conveying the spindle.

Still referring to FIG. 54, and in further detail, the method 5400 can include providing a spindle at 5402. The spindle can include a first protrusion attending from the spindle. The spindle can include a second protrusion extending from the spindle. The first protrusion and the second protrusion can form at least a portion of an opening between the first protrusion and the second protrusion. The first protrusion and the second protrusion can extend radially from the spindle. The first protrusion and the second protrusion can extend radially to form a first band and a second band that surround the spindle.

At 5404, the method 5460 can include providing a connector. The connector can include a tumbler disposed in a cavity of the connector. The tumbler can be disposed in the cavity in a first position.

At 5406, the method 5400 can include extending a tumbler to a position. A mechanical force device that is contact with the tumbler can extend the tumbler from the first position to a second position. The mechanical force device can extend the tumbler to the second position to enter the opening formed by the first protrusion and the second protrusion. The mechanical force device can include at least one of a resilient flexible plastic, a spring, and a foam. The tumbler can contact the spindle responsive to being extended by the mechanical force device. For example, the mechanical force device can direct the tumbler towards the opening.

The connector can include at least two tumblers and spindle can include at least two openings. The mechanical force device can position the at least two tumblers into the at least two openings.

For example, as the spindle moves towards the connector, a locking mechanism can be triggered responsive to the spindle contacting at a least a portion of the connector. The locking mechanism, in response to the trigger, can disengage the mechanical force device to dispose the tumbler in the second position to contact the spindle.

At 5408, the method can include conveying the spindle. A seismic data acquisition unit deployment cable can extend through the spindle. For example, the spindle can include a first opening at a first end of the spindle and a second opening at a second end of the spindle. The seismic data acquisition unit deployment cable can be inserted into the first opening and exit through the second opening. The seismic data acquisition unit deployment cable can extend from a spool on the marine vessel. The spool can be rotated or driving by a spool engine. The spindle can engage with the connector via the tumbler that is disposed in the second position. The seismic data acquisition unit deployment cable can convey the spindle that is engaged with the connector.

Figure 55:
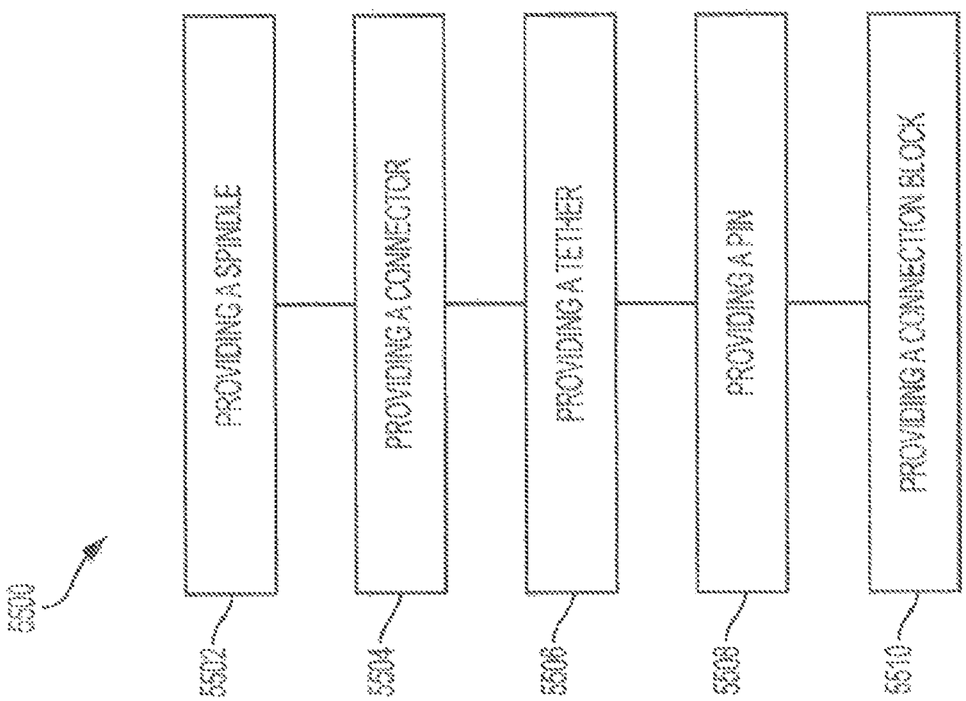
FIG. 55 is a flow diagram of a method of mounting seismic data acquisition units for deployment from a marine vessel, in accordance with an implementation.

FIG. 55 is a flow diagram of a method of mounting seismic data acquisition units for deployment from a marine vessel. The method 5500 can be performed or utilize one or more system, component, element, module, or device depicted in FIGS. 1-53 including, for example, deployment system 4100, system 100, system 200, system 300, system 4800, or system 4900. At 5502, the method 5500 can include providing a spindle. At 5504, the method 5500 can include providing a connector. At 5506, the method 5500 can include providing a tether. At 5508, the method 5500 can include providing a pin. At 5510, the method 5500 can include providing a connection block.

At 5502, the method 5500 can include providing a spindle. The spindle can include a find protrusion extending from the spindle and a second protrusion extending from the spindle. The first protrusion and the second protrusion can form at least a portion of an opening between the first protrusion and the second protrusion.

At 5504, the method 5500 can include providing a connector. The connector can include a tumbler disposed in a cavity of the connector. The tumbler can be disposed in a first position. In the first position, the tumbler can be entirely within the cavity or at least partially within the cavity. The tumbler can be disposed in a second position to extend at least partially from the cavity to enter the opening formed by the first protrusion and the second protrusion. In the second position, the tumbler can extent out of the cavity to a greater extent than in the first position. The tumbler, when in the second position, can contact the spindle. The connector can include an end or end region that includes or forms an opening.

At 5506, the method 5500 can include providing a tether. The tether can include an end or end region that forms another opening. At 5508, the method can include providing a pin. The pin can be disposed in the opening formed by the end of the connector and the opening formed by the end of the tether. The pin can define a pivot point about which the tether pivots. The pin can facilitate coupling the tether to the connector.

In some cases, the tether can include an internal compartment. The method can include screwing a transponder at least partially within the internal compartment of the tether to secure the transponder to the tether. The tether can include an enclosure or housing in which the transponder can be housed.

At 5510, the method 5500 can include providing a connection block. The connection block can be attached to a second end of the tether via a cable. The connection block can include a protrusion to engage a seismic data acquisition unit. The cable can include a first portion that extends from a first side of the second end of the tether. The cable can include a second portion that extends from a second side of the second end of the tether. The first aide and the second side can be separated by a first predetermined distance. For example, the first portion and the second portion can form two sides of a triangular shape, where the base of the triangle corresponds to the first predetermined distance.

Figure 56:
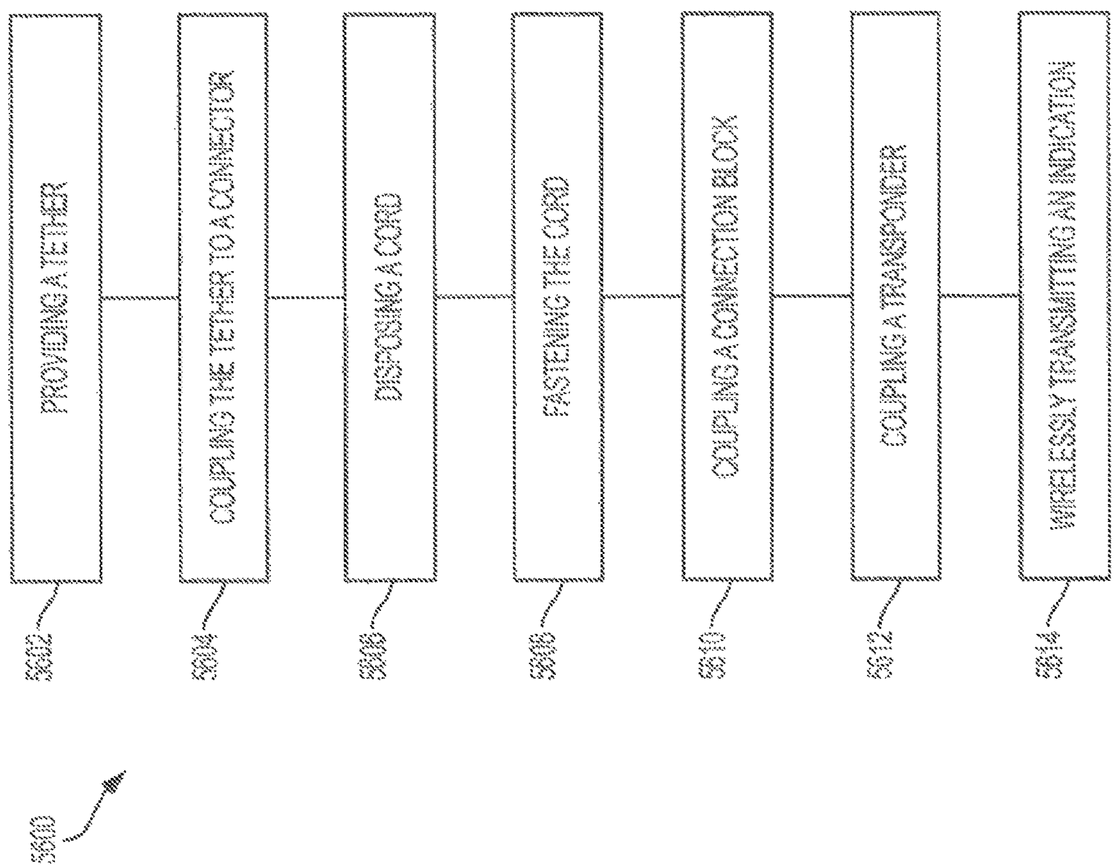
FIG. 56 is a flow diagram of a method of deploying seismic data acquisition units from a marine vessel, in accordance with an implementation.

FIG. 56 is a flow diagram of a method of deploying seismic data acquisition units from a marine vessel, in accordance with an implementation. The method 5600 can be performed or utilize one or more system, component, element, module, or device depicted in FIGS. 1-53 including, for example, deployment system 4100, system 100, system 200, system 300, system 4800, or system 4900. At 5602, the method 5600 can include providing a tether. At 5604, the method 5600 can include coupling the tether to a connector. At 5606, the method 5600 can include disposing a cord. At 5608, foe method 5600 can include fastening the cord. At 5610, the method 5600 can include coupling a connection block. At 5612, the method 5600 can include coupling a transponder. At 5614, the method 5600 can include tirelessly transmitting an indication.

At 5602, the method 5600 can include providing a tether. The tether can include a cavity and a tether cap. The cavity can be internal to the tether. For example, the tether can include a housing and the cavity can be within the housing. The housing can form a portion of the cavity. The tether cap can be positioned on the tether. The tether cap can be integrated with the tether. The tether cap can be part of the tether. The tether cap can be a separate component that is affixed to the tether.

At 5604, the method 5600 can include coupling the tether to a connector. The tether can be coupled to the connector via the tether cap. For example, the method can include coupling the tether cap to the connector. At the coupling point, the tether cap and the connector can form a pivot point. The pivot point can be outside or external to the cavity within the tether. The tether can pivot or articulate about the pivot point. The pivot point can be formed by a pin that couples the tether cap or the tether to the connector. At 5606, the method 5600 can include, disposing at least one cord. The at least one cord can be disposed at least partially within the cavity of the tether. The at least one cord can include a rope or cable.

At 5608, the method 5600 can include fastening the cord. The cord can be fastened to the tether. The cord can be fastened to the tether cap. The cord can be fastened to a portion of the tether. The cord can be fastened to an internal portion of the tether or tether cap. The cord can be fastened to an external portion of the tether or the tether cap. The cord can be at least partially fastened via the cavity of the tether housing or of the tether cap.

At 5610, the method 5600 can include coupling a connection block. The connection block can be coupled to a portion of the card that is external to the cavity of the tether. At 5612, the method 5600 can include coupling a transponder housing. The transponder housing car, be coupled, to at least can of the connector and the tether. For example, the transponder housing can be clamped to the connector. The transponder housing can include the transponder. The transponder can be placed at least partially within the cavity of the tether. The transponder can be fastened to the tether cap of the tether. At 5614, the method 5600 can include wirelessly transmitting an indication. The transponder can wirelessly transmit the indication of at least one of a location of the transponder and a status of the transponder.

Figure 57:
FIG. 57 is a flow diagram of a method of mounting seismic data acquisition units for deployment from a marine vessel, in accordance with an implementation.

FIG. 57 is a flow diagram of a method of mounting seismic data acquisition units for deployment from a marine vessel, in accordance with an implementation. The method 5700 can be performed or utilize one or more system, component, element module, or device depicted in FIGS. 1-53 including, for example, deployment system 4100, system 100, system 200, system 300, system 4800, or system 4900. At 5702, the method 5700 can include transporting a tether. At 5704, the method 5700 can include transporting a seismic data acquisition unit. At 5706, the method 5700 can include controlling a speed of deployment of a cable. At 5708, the method 5700 can include disengaging a connector. At 5710, the method 5700 can include inserting the connector. At 5712, the method 5700 can include aligning the connector with the cable. At 5714, the method 5700 can include deploying the cable. At 5716, the method 5700 can include positioning a tumbler to engage the spindle.

At 5702, the method 5700 can include transporting a tether. A first conveyor having a conveyor coupler can transport the tether. The tether can be coupled to the conveyor coupler via a connector. For example, the connector can include at least one tumbler disposed in a cavity of the connector that engages with the conveyor coupler. The first conveyor can transport the tether coupled to the seismic data acquisition unit towards a robotic arm.

At 5704, the method 5700 can include transporting a seismic data acquisition unit. A second conveyor can transport the seismic data acquisition unit. The seismic date acquisition unit can include a tether receiver. The second conveyor can facilitate aligning the tether receiver of the seismic data acquisition unit with a connection block of the tether. The tether receiver can receive the connection block to couple the tether to the seismic data acquisition unit responsive to insertion of the connection block in the tether receiver.

The second conveyor can include a rotation station, such as a carousel. The rotation station can facilitate aligning the seismic data acquisition unit to the connection block of the tether. For example, the rotation station can align the tether receiver of the seismic data acquisition unit to the connection block of the tether. At 5706, the method 5700 can include controlling a speed of deployment of a cable. A deployment regulator device can control the speed of deployment of the cable. The cable can be coupled to a spindle. For example, the cable can extend through the spindle. The spindle can include a first protrusion extending from the spindle and a second protrusion extending from the spindle to form an opening, cavity or groove between the protrusions. The spindle can include a first end that forms a first aperture. The spindle can include a second end that forms a second aperture. The cable can extend through the first aperture at the first end and exit through the second aperture at the second end.

At 5708, the method 5700 can include disengaging a connector. A robotic arm can disengage the connector of the tether from the conveyor coupler. At 5710, the method 5700 can include inserting toe connector. The robotic arm can insert the connector into the deployment block dial is on a table 4206. The table can be on a deck of a marine vessel. The robotic arm can trigger a disengagement mechanism of the connector of the tether. Responsive to triggering the disengagement mechanism, the robotic arm can remove the tether from the conveyor coupler. The robotic arm can insert the connector in the deployment block.

At 5712, the method 5700 can include aligning the connector with the cable. The robotic arm can align the connector of the tether with the cable that extends through the deployment block. At 5714, the method 5700 can include deploying the cable. The deployment regulator device can deploy the cable to direct the spindle towards the connector of the tether. At 5716, the method 5700 can include positioning a tumbler to engage the spindle. For example, a mechanical force device can position the tumbler responsive to an interaction between the spindle and the connector. The mechanical force device can position the tumbler in the opening or groove in the spindle to facilitate engaging the spindle.

Figure 58:
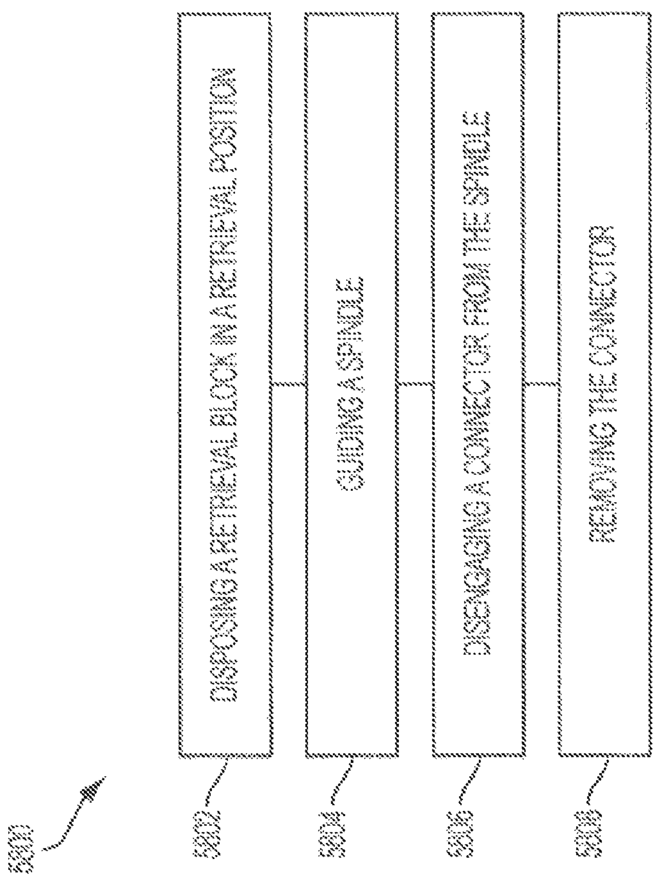
FIG. 58 is a flow diagram of a method of retrieving seismic data acquisition units from an aqueous medium, in accordance with an implementation.

FIG. 58 is a flow diagram of a method of retrieving seismic data acquisition units from an aqueous medium. The method 5800 can be performed or utilize one or more system, component, element, module, or device depicted in FIGS. 1-53 including, for example, deployment system 4100, system 100, system 200, system 300, system 4800, or system 4900. At 5802, the method 5800 can include disposing a retrieval block in a retrieval position. At 5804, the method 5800 can include guiding a spindle. At 5806, the method 5800 cart include disengaging a connector from the spindle. At 5808, the method can include removing the connector.

At 5802, the method 5800 can include disposing a retrieval block in a retrieval position. The retrieval position can refer to a position in which the retrieval block is adjacent to a deployment cable. The retrieval position can refer to a position in which the cable is inside a cavity or opening of the retrieval block. The retrieval block can be placed on a table on a deck of the marine vessel. The cable can be used for deploying seismic data acquisition units and retrieval seismic data acquisition units.

The retrieval block can be guided from a stowed position into the retrieval position via a track. The track can be coupled to a table on the marine vessel. The track can include a powered conveyor that moves the retrieval block. In some cases, the retrieval block can include wheels configured to move the retrieval block from the stowed position to the retrieval position. When the retrieval block approaches the retrieval position, a locking mechanism can lock the retrieval block in the retrieval position. The locking mechanism can be enabled responsive to sensor data indicating that the retrieval block is a predetermined distance from the cable. For example, the sensor data can indicate a proximity of the sensor to the cable. The sensor can detect that the cable is positioned within a cavity of the retrieval block and instruct or cause the locking mechanism to lock the position of the retrieval block. The sensor can detect that the cable is positioned within, or at a desired position relative to, the guide rails that are configured to receive the spindle.

At 5804, the method 5800 can include guiding a spindle. The retrieval block can guide toe spindle. The retrieval block can include guide rails disposed in the retrieval block. The guide rails can guide the spindle into the retrieval block. An entrance of the guide rails can be wider than a middle portion of the guide rails to facilitate receiving the spindle. The spindle can be coupled to the cable. The spindle can also be coupled to a connector. The connector can be coupled to a tether that is coupled to the seismic data acquisition unit.

The retrieval block can include a debris removal device that removes debris from the spindle, connector, tether, or seismic data acquisition unit. The debris removal device car, remove the debris as the cable and spindle are reeled in through the guide rails. The debris removal device can include a liquid spray jet, an airjet, or a brush. The debris removal device can remove the debris prior to the spindle being disengaged from the connector.

At 5806, the method 5800 can include disengaging a connector from the spindle. The retrieval block can include a decoupler that disengages the spindle from the connector. The cable and the spindle can be reeled in through the guide rails of the retrieval block.

At 5808, the method can include removing the connector. A robotic arm can remove the connector from the guide rails on the retrieval block. The connector can be coupled to the tether and the seismic data acquisition unit. For example, the decoupler can include a lever arm that articulates about a pivot point. The lever arm can lower a disk onto tumblers. The tumblers can couple the spindle to the connector. The tumblers can engage with the spindle. When the disk contacts the tumblers, the tumblers can move or disengage from the spindle. Responsive to the disk contacting the tumblers, the tumblers can retract or exit grooves in the spindle in which the tumblers were engaged.

A robotic arm can grab the connector once the connector is disengaged from the spindle. In some cases, the robotic arm can grab the connector while it is being disengaged from the spindle or prior to disengagement from the spindle. In some cases, the robotic arm can include a robotic band that disengages the tumblers from the grooves in the spindle. For example, the robotic hand can disengage the tumblers in addition to, or instead of, the decoupler. The robotic hand can include the decoupler.

The robotic arm can connect the connector to an overhead conveyor on the deck of the marine vessel. The connector can be coupled to the tether and the seismic data acquisition unit. The overhead conveyor can transport the connector, tether and seismic data acquisition unit.

Figure 59:
FIG. 59 is a flow diagram of a method of performing a seismic survey in an aqueous medium via a marine vessel, in accordance with an implementation.

FIG. 59 is a flow diagram of a method of performing a seismic survey in an aqueous medium via a marine vessel, in accordance with an implementation. The method 5900 can be performed or utilize one or more system, component, element, module, or device depicted in FIGS. 1-53 including, for example, deployment system 4109, system 100, system 200, system 300, system 4800, or system 4900. At 5902, the method 5900 can include providing a table. At 5904, the method 5900 can include disposing a deployment block in a deployment position. At 5906, the method 5900 can include disposing a retrieval block in a stowed position. At 5908, the method 5900 can include inserting a connector into the deployment block. At 5912, the method 5900 can include disposing the deployment block in a stowed position. At 5914, the method 5900 can include disposing the retrieval block in a retrieval position. At 5916, the method 5900 can include receiving the spindle. At 5918, the method 5900 can include disengaging the connector.

At 5902, the method 5900 can include providing a table. The table can be provided on the deck of a marine vessel. The deck of the marine vessel can include the table. The table can be coupled to or integrated on the deck of the marine vessel. The table can include any dimensions that facilitate supporting a deployment block, retrieval block, a friction pad, and one or more seismic data acquisition units. The table can be fixed to the deck, or can move about the deck.

At 5904, the method 5900 cart include disposing a deployment block in a deployment position. The deployment block can be disused on the table in the deployment position. The deployment position can refer to a position in which the deployment block is adjacent to the deployment cable. In the deployment position, the deployment cable can be positioned within a cavity or opening of the deployment block. In the deployment position, the deployment block can facilitate deploying seismic data acquisition units from the marine vessel into the aqueous medium.

A track placed on the table can guide the deployment block from the stowed position to the deployment position responsive to initiation of the deployment operation. The track can be coupled to of a part of the table. The track can include a powered or automated conveyor that stoves the deployment block from one position to another position. The table can include guide rail that receives, during the deployment operation, the seismic data acquisition unit from a lower conveyor and transports, guides, or otherwise directs the seismic data acquisition unit towards the deployment block.

At 5906, the method 5900 can include disposing a retrieval block in a stowed position. The retrieval block can be provided on the table and placed in a storage or offline position, such as a stowed position. In the stowed position, the retrieval block can be a predetermined distance away from the cable such as not to interfere with the deployment operation. For example, the predetermined distance can be 2 feet away from the cable, 3 feet away from the cable, 4 feet away from the cable, 5 foot, away from the cable, 6 feet away from the cable, 7 feet away from the cable or more.

At 5908, the method 5900 can include inserting a connector into the deployment block. A robotic arm can insert the connector into the deployment block. The robotic arm can insert the connector into the deployment block to couple the connector to the spindle, which can be coupled to the cable. The connector can be further coupled to a seismic data acquisition unit. The connector can be coupled to the seismic data acquisition prior to the connector being coupled to the spindle.

Upon coupling the connector to the spindle on the cable, the deployment cable can carry the spindle along with the seismic data acquisition unit towards the edge of the marine vessel and deploy the seismic data acquisition into the aqueous medium. In some cases, a sensor on the table or deck of the marine vessel can determine that the spindle and the connector are disengaged. The sensor can include a magnetic sensor, electronic sensor, camera, proximity sensor, motion sensor, other type of sensor configured to detect that two components are disengaged. Responsive to determining that the spindle and the connector or seismic data acquisition unit are disengaged from one another, a locking ramp on the table can block the spindle or seismic data acquisition unit from being deployed. For example, the locking ramp can include opposing members that can come together to catch, capture, hold, or otherwise block the spindle or the seismic data acquisition unit to prevent the spindle or the seismic data acquisition unit from being released into the aqueous medium.

At 5912, the method 5900 can include disposing the deployment block in a stowed position. The deployment block can be placed in the stowed position upon completion of deploying one or more seismic data acquisition units. The deployment block can be placed in the stowed position after the connector is coupled to the spindle. The deployment block can be placed in the stowed position responsive to an indication that deployment is complete, responsive to initiation of a retrieval operation, responsive to an instruction for stowing, or responsive to another time interval or event.

In some cases, while the deployment block is in the deployment position, the retrieval block can be in a stowed position. The retrieval block can be moved to the stowed position responsive to the deployment block being moved to the deployment position. The deployment block can be moved to the stowed position responsive to the retrieval block moved to the retrieval position. The retrieval block and the deployment block can be moved to opposite positions. In some cases, both the retrieval block and the deployment block can be in the stowed position.

The deployment block can be provided on the table and placed in a storage or offline position, such as a stowed position. In the stowed position, the deployment block can be a predetermined distance away from the cable such as not to interfere with the retrieval operation. For example, the predetermined distance can be 2 feet away from the cable, 3 feet away from the cable, 4 feet away from the cable, 5 feet away from the cable, 6 feet away from the cable, 7 feet away from the cable or more.

At 5914, the method 5900 can include disposing the retrieval block in a retrieval position. The retrieval block can be disposed in the retrieval position to receive the cable. The cable can be positioned within a cavity or opening of the retrieval block. A track placed on or coupled to the table can guide the retrieval block from the stowed position to the retrieval position responsive to initiation of the retrieval operation.

The retrieval block can be placed in the retrieval position after the deployment block completes deploying one or more seismic data acquisition units. The retrieval block can be placed in the retrieval position responsive to an indication that the retrieval operation is commencing or has commenced, or responsive to another time interval or event.

At 5916, the method 5900 can include receiving the spindle. The retrieval block can receive the spindle. The retrieval block can receive the spindle which is coupled to the connector. The connector can be coupled to the tether, which is coupled to the seismic data acquisition unit.

At 5918, the method 5900 can include disengaging the connector. The retrieval block, or a component thereof, can disengage the connector from the spindle to separate the seismic data acquisition unit from the cable. As the retrieval block receives the spindle, or after the retrieval block disengages the spindle, an oblique end of the guide rails can receive the seismic data acquisition unit and direct the seismic data acquisition unit back towards the lower conveyor. For example, a robotic arm can facilitate moving, directly or indirectly, the seismic data acquisition along the guide rails and towards the conveyor on the deck of the marine vessel.

The table can include a friction pad provided on the table. The friction pad can be a separate component that is placed on or coupled to the table. The friction pad can refer to a coating, spray, or material on the table. The friction pad can have a coefficient of friction that facilitates holding the seismic data acquisition unit in a fixed position or otherwise providing resistance to minimize or slow down movement of the seismic data acquisition unit. For example, the friction pad can hold, slow down, stop, or otherwise provide inertia to the seismic data acquisition unit to allow the robotic arm to couple the connector to the spindle within the deployment block. Similarly, the friction pad can hold the seismic data acquisition while the robotic arm disengages the connector from the spindle.

To control, monitor, manage, or otherwise manipulate one or more component module or aspect of the systems and methods depicted in FIGS. 1-59, including, for example, the robotic arm, conveyor, movement of the cable, movement of the deployment block or retrieval block, a computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

To control, monitor, manage, or otherwise manipulate one or more component, module or aspect of the systems and methods depicted in FIGS. 1-59, including, far example, the robotic arm, conveyor, movement of the cable, movement of the deployment block or retrieval block, one or more processors suitable for the execution of the computer program include, by way of example, both general and special purpose microprocessors, and any one or more processors of any kind of digital computer. The processor can receive instructions and data from a read only memory or a random access memory or both. The elements of a computer are a processor for performing actions in accordance with instructions and one or more memory devices for storing instructions and data. A computer can include, or be operatively coupled to receive date from or transfer data to, or both, one or more mass storage devices for storing date, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. Reference to any act or element being based on any information, set or element may include implementations where the act or element is based at least in part on any information, act, or element.

Any implementation disclosed herein may be combined with any other implementation or implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Additional elements other than 'A' and 'B' can also be present.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

The invention claimed is:

1. A system for selectively attaching a hardware module to a cable having a longitudinal axis, comprising:

(a) a spindle attached to said cable;

(b) a first protrusion extending from an exterior surface of said spindle in a direction that is perpendicular to said longitudinal axis of said cable and a second protrusion extending from said exterior surface of said spindle in a direction that is perpendicular to said longitudinal axis of said cable;

(c) an opening between said first protrusion and said second protrusion;

(d) a connector, including, (i) a longitudinal cavity configured to slide over said first and second protrusions as said connector is moved in a direction that is parallel to said longitudinal axis of said cable, (ii) a tumbler disposed in a first position at least in part in said longitudinal cavity of said connector, said tumbler constructed to extend inward towards said spindle to enter said opening on said exterior surface of said spindle formed between said first and said second protrusions;

(e) a mechanical force device in contact with said tumbler configured to bias said tumbler laterally towards said spindle from said first position to a second position in said opening formed between said first and second protrusions thereby preventing movement of said connector in a direction that is parallel to said longitudinal axis of said cable and thereby locking said connector to said spindle; and (f) a hardware module attached to said connector.

2. The system of claim 1, wherein said first protrusion and said second protrusion extend radially from said spindle.

3. The system of claim 1, wherein said hardware module is a seismic data acquisition module.

4. The system of claim 1, further comprising a tether attaching said hardware module to said connector.

5. The system of claim 3, further comprising a tether attaching said hardware module to said connector.

6. The system of claim 1, further comprising a locking mechanism on said connector in contact with said tumbler; said locking mechanism having a first state in which said locking mechanism releases said tumbler to cause said mechanical force device to dispose said tumbler in said second position to enter said opening and contact said spindle, wherein said locking mechanism enters said first state in response to contact with at least a portion of said spindle.

7. The system of claim 1, wherein said connector is configured for on-the-fly coupling with said spindle.

8. The system of claim 4, wherein said connector is configured for on-the-fly coupling with said spindle.

9. The system of claim 6, wherein said connector is configured for on-the-fly coupling with said spindle.

10. A system for selectively attaching a hardware module to a cable, comprising:

(a) a cable having a longitudinal axis;

(b) a spindle attached to said cable;

(c) a first protrusion extending from an exterior surface of said spindle in a direction that is perpendicular to said longitudinal axis of said cable and a second protrusion extending from said exterior surface of said spindle in a direction that is perpendicular to said longitudinal axis of said cable;

(d) an opening between said first protrusion and said second protrusion;

(e) a connector, including, (i) a longitudinal cavity configured to slide over said first and second protrusions as said connector is moved in a direction that is parallel to said longitudinal axis of said cable, (ii) a tumbler disposed in a first position at least in part in said longitudinal cavity of said connector, said tumbler constructed to extend inward towards said spindle to enter said opening on said exterior surface of said spindle formed between said first and said second protrusions;

(f) a mechanical force device in contact with said tumbler configured to bias said tumbler laterally towards said spindle from said first position to a second position in said opening formed between said first and second protrusions thereby preventing movement of said connector in a direction that is parallel to said longitudinal axis of said cable and thereby locking said connector to said spindle; and (g) a hardware module attached to said connector.

11. The system of claim 10, wherein said first protrusion and said second protrusion extend radially from said spindle.

12. The system of claim 10, wherein said hardware module is a seismic data acquisition module.

13. The system of claim 10, further comprising a tether attaching said hardware module to said connector.

14. The system of claim 12, further comprising a tether attaching said hardware module to said connector.

15. The system of claim 10, further comprising a locking mechanism on said connector in contact with said tumbler; said locking mechanism having a first state in which said locking mechanism releases said tumbler to cause said mechanical force device to dispose said tumbler in said second position to enter said opening and contact said spindle, wherein said locking mechanism enters said first state in response to contact with at least a portion of said spindle.

16. The system of claim 10, wherein said connector is configured for on-the-fly coupling with said spindle.

17. The system of claim 13, wherein said connector is configured for on-the-fly coupling with said spindle.

18. The system of claim 15, wherein said connector is configured for on-the-fly coupling with said spindle.

* * * * *